United States Patent
Lin

(10) Patent No.: US 11,863,854 B2
(45) Date of Patent: *Jan. 2, 2024

(54) LENS DEVICE CAPABLE OF OPERATION OF MULTI-MAGNIFICATIONS, OPTICAL ZOOM IN HIGH MAGNIFICATION, AND MINIATURIZATION OF THE LENS MODULE THEREOF

(71) Applicants: Sintai Optical (Shenzhen) Co., Ltd., ShenZhen (CN); Asia Optical Co., Inc., Taichung (TW)

(72) Inventor: Guo-Quan Lin, ShenZhen (CN)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/976,226

(22) Filed: Oct. 28, 2022

(65) Prior Publication Data
US 2023/0047206 A1 Feb. 16, 2023

Related U.S. Application Data

(63) Continuation of application No. 17/035,977, filed on Sep. 29, 2020, now Pat. No. 11,528,396.

(30) Foreign Application Priority Data

Oct. 8, 2019 (CN) .......................... 201921676433.3
Nov. 29, 2019 (CN) .......................... 201922145167.8
(Continued)

(51) Int. Cl.
*H04N 23/55* (2023.01)
*G02B 7/02* (2021.01)
(Continued)

(52) U.S. Cl.
CPC ............ *H04N 23/55* (2023.01); *G02B 5/045* (2013.01); *G02B 7/023* (2013.01); *G02B 17/023* (2013.01); *H04N 23/54* (2023.01)

(58) Field of Classification Search
CPC ........ H04N 23/55; H04N 23/54; G02B 5/045; G02B 7/023; G02B 17/023; G02B 17/04; G02B 17/06; G02B 7/102; H02K 41/0356
See application file for complete search history.

(56) References Cited

U.S. PATENT DOCUMENTS 7,515,194 B2   4/2009   Nagata et al.
7,646,418 B2   1/2010   Nanjo
(Continued)

FOREIGN PATENT DOCUMENTS

CN   100451717 C   1/2009
CN   206421098 U   8/2017
(Continued)

*Primary Examiner* — Padma Haliyur
(74) *Attorney, Agent, or Firm* — McClure, Qualey & Rodack, LLP

(57) ABSTRACT

A lens device includes a first lens module, an image sensor and a first light path turning module. The first lens module includes plurality of lenses. The first light path turning module is configured to transmit a light beam passing through the first lens module to the image sensor by exactly three or four reflections. The first light path turning module includes three or four reflecting surfaces on which the reflections occur. All the reflecting surfaces are plane surfaces. The first light path turning module includes no free form surface. All the surfaces on which the light beam is reflected are plane surfaces, wherein the plane surfaces are flat and are different from freeform surfaces.

14 Claims, 62 Drawing Sheets

(30) Foreign Application Priority Data

| Dec. 18, 2019 | (CN) | 201922291971.7 |
| Dec. 25, 2019 | (CN) | 201922387683.1 |
| Feb. 24, 2020 | (CN) | 202020206031.3 |
| Mar. 10, 2020 | (CN) | 202020291929.5 |
| Aug. 19, 2020 | (TW) | 109128237 |

(51) Int. Cl.
*G02B 5/04* (2006.01)
*G02B 17/02* (2006.01)
*H04N 23/54* (2023.01)

(56) References Cited

U.S. PATENT DOCUMENTS

| 10,761,403 B2 | 9/2020 | Wang et al. |
| 2019/0212632 A1 | 7/2019 | Miller |
| 2019/0361323 A1 | 11/2019 | Jerby |
| 2021/0044729 A1 | 2/2021 | Wang et al. |
| 2021/0096338 A1 | 4/2021 | Saiga |
| 2022/0091373 A1* | 3/2022 | Saiga ................... G02B 13/007 |

FOREIGN PATENT DOCUMENTS

| CN | 107783243 B | 10/2019 |
| CN | 110398872 A | 11/2019 |
| CN | 209590407 U | 11/2019 |
| TW | 201939151 A | 10/2019 |

\* cited by examiner

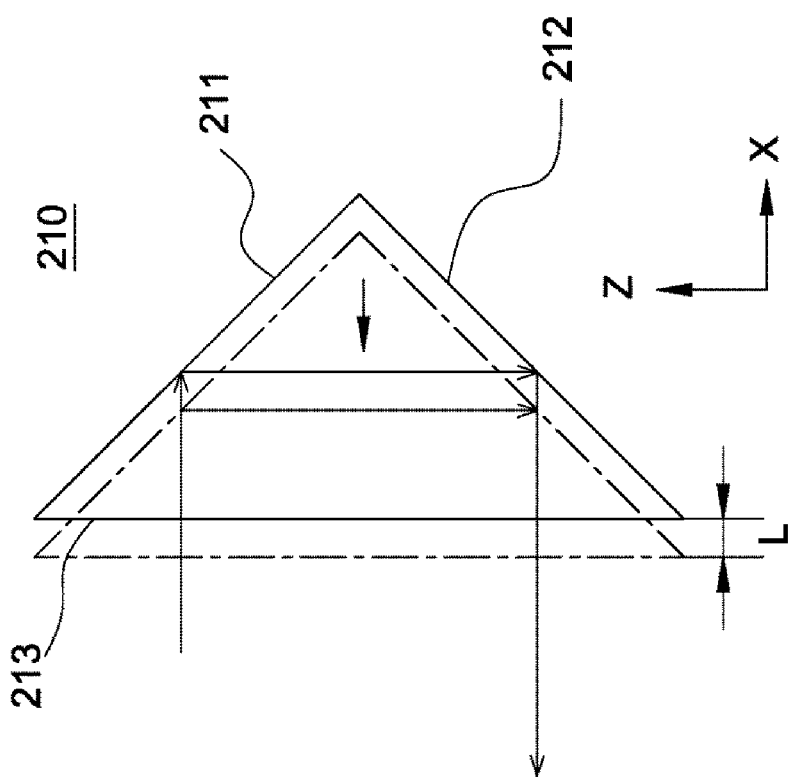
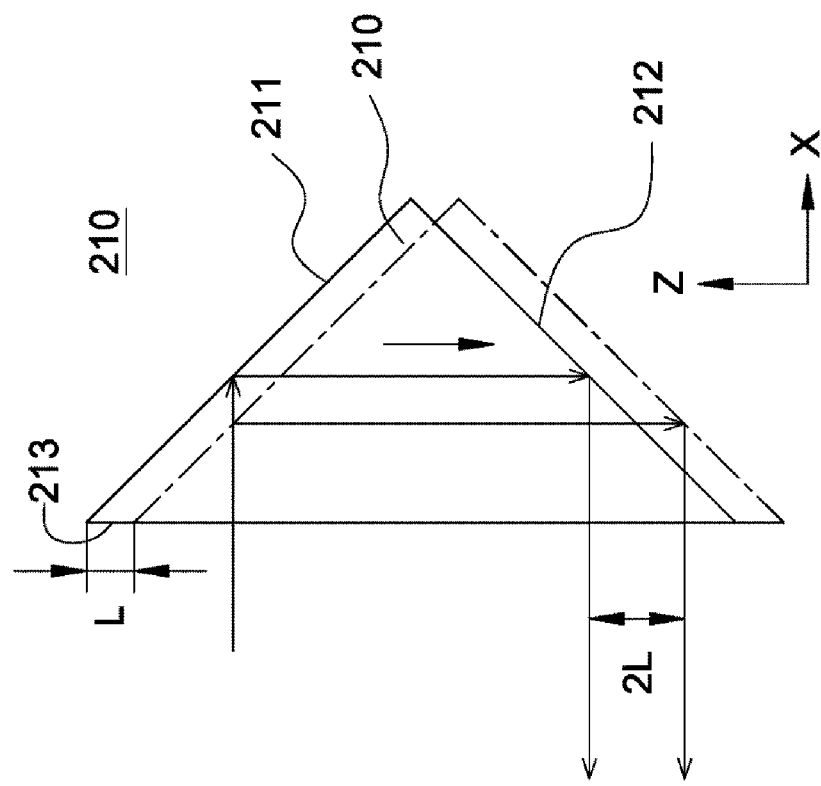
Fig. 11B
Fig. 11A

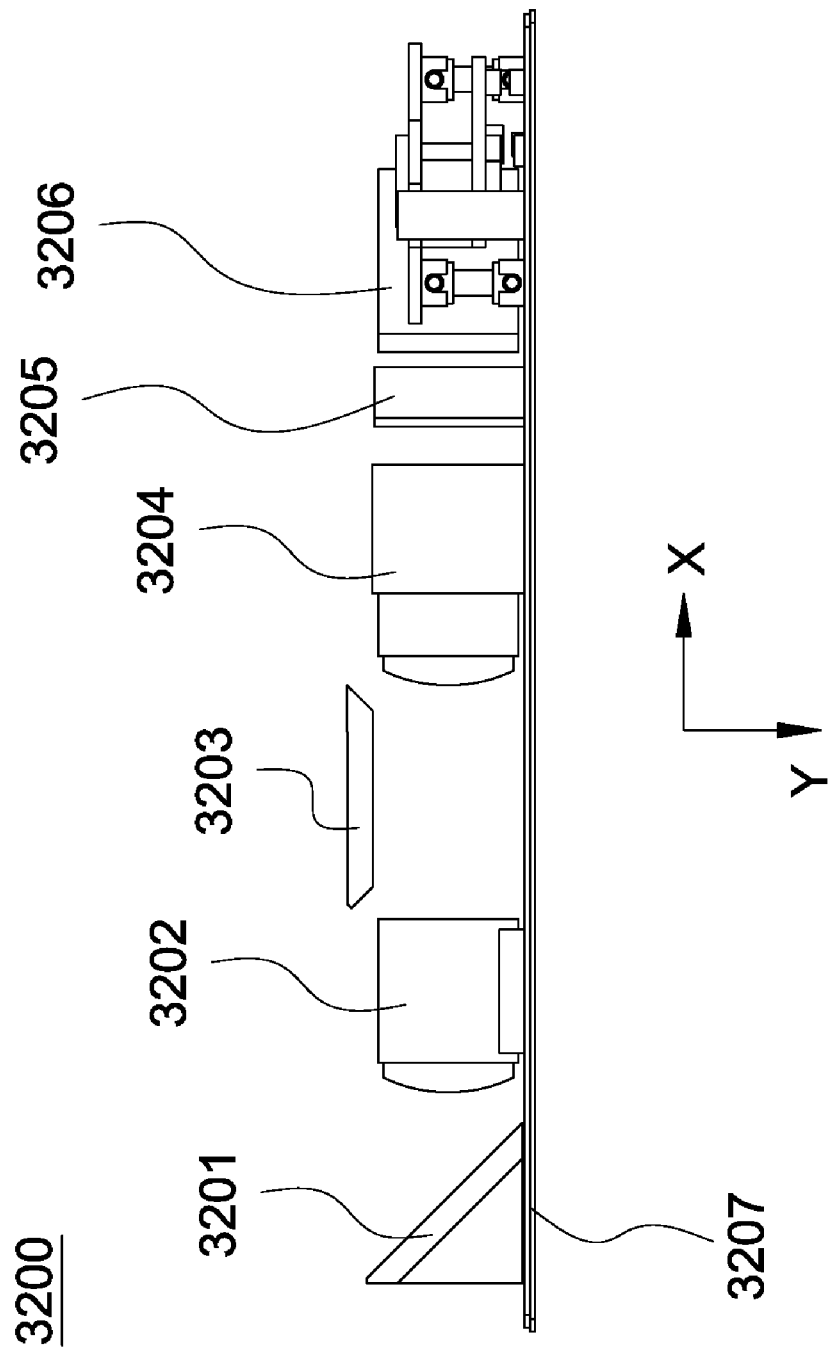

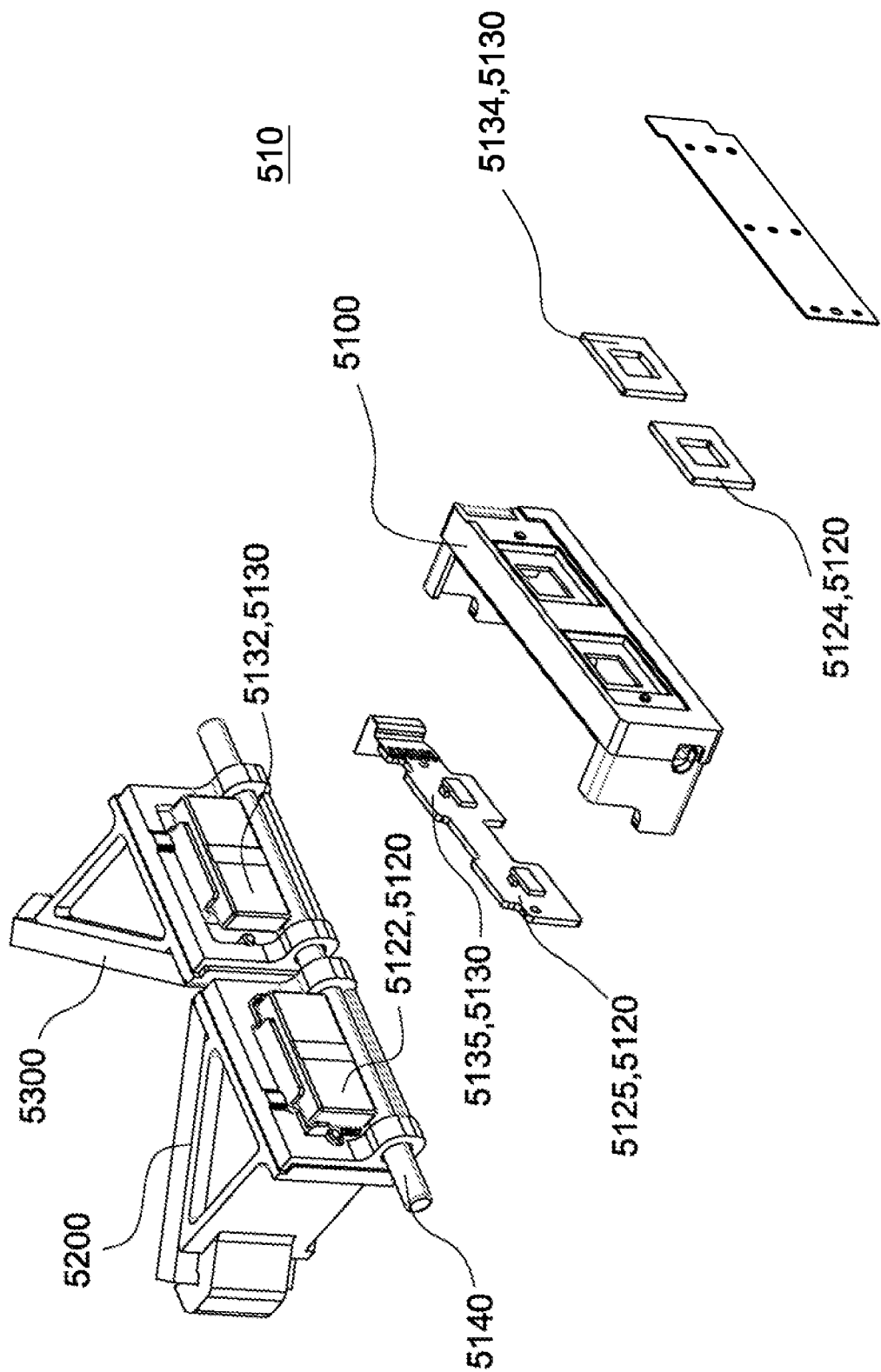

LENS DEVICE CAPABLE OF OPERATION OF MULTI-MAGNIFICATIONS, OPTICAL ZOOM IN HIGH MAGNIFICATION, AND MINIATURIZATION OF THE LENS MODULE THEREOF

CROSS REFERENCE TO RELATED APPLICATIONS

This application is a continuation of U.S. patent application Ser. No. 17/035,977, filed Sep. 29, 2020 and entitled "LENS DEVICE", now U.S. Pat. No. 11,528,396.

BACKGROUND OF THE INVENTION

Field of the Invention

The invention relates to a lens device, and more particularly to a lens device and a voice coil motor thereof.

Description of the Related Art

Currently many portable electronic devices are provided with lens devices. FIG. 1 is a schematic diagram showing a lens device 1100 of the prior art. As shown in FIG. 1, the lens device 1100 includes a light path turning module 1101, a lens module 1102 and an image sensor 1103. The lens module 1102 includes a plurality of lens units (not shown) and an optical axis extending in a first direction X. The light path turning module 1101, the lens module 1102 and the image sensor 1103 are arranged in the first direction X. In operation, a light beam propagates in a second direction Y, enters the light path turning module 1101, is reflected by the light path turning module 1101 to propagate in the first direction X, and reaches the image sensor 1103 to form an image. The second direction Y is perpendicular to the first direction X.

The lens device 1100 has the following drawbacks: the light path turning module 1101, the lens module 1102 and the image sensor 1103 are arranged in the first direction X. When the optical zoom in high magnification is required, the effective focal length (EFL) of the lens device must be large so that the length of the lens device 1100 is large. That is disadvantageous to miniaturization of the portable electronic devices. With the development of portable electronic devices, the lens device 1100 requires a new layout in internal structure to suit the portable electronic devices.

FIG. 2 is a schematic diagram showing another lens device 2500 of the prior art. As shown in FIG. 2, the lens device 2500 includes a base (not shown), a prism module 2501, a lens module 2502 and an image sensor 2503. The prism module 2501 is configured to change the direction of propagation of a light beam from the direction Y to the direction X by reflection. The lens module 2502 is configured to receive the light beam from the prism module 2501. The light beam exits from the lens module 2502 and reaches the image sensor 2503 to form an image.

The lens device 2500 has the following drawbacks: due to the trend of increment of the effective focal length of the lens unit of the lens module 2502, the image sensor 2503 needs to be disposed farther from the lens module 2502 so that the lens device 2500 will be too long.

FIG. 3 is a schematic diagram showing anther lens device 3100 of the prior art. As shown in FIG. 3, the lens device 3100 includes a light path turning module 3101, a lens module 3102 and an image sensor 3103. The light path turning module 3101 is configured to change the direction of propagation of a light beam from the direction Y to the direction X by reflection. The lens module 3102 includes a plurality of lens units and an optical axis extending in the direction X. The light beam exits from the lens units 3102 and reaches the image sensor 3103 to form an image.

The lens device 3100 is only suitable for an electronic device with low magnification and fails to provide an operation of multi-magnifications.

A voice coil motor (VCM) is a device for converting electrical energy into mechanical energy and for outputting a linear motion and a limited oscillation. A known lens device (e.g. periscope lens) generally includes a prism module, a lens module and an image sensor. When the optical zoom in high magnification is required, the effective focal length must be large so that the length of the lens module is large. That is disadvantageous to miniaturization of the electronic device.

BRIEF SUMMARY OF THE INVENTION

An object of the invention is to provide a lens device with a new layout in structure to effectively reduce the length of the lens device.

Another object of the invention is to provide a lens device capable of an operation of multi-magnifications, an optical zoom in high magnification, and miniaturization of the lens module.

Another object of the invention is to provide a lens device and a miniaturized voice coil motor capable of an optical zoom in high magnification and stabilization of structure.

Another object of the invention is to provide a lens device without the technical problem of impacts and the frictional forces required to be overcome, arising from the slider used in a known voice coil motor.

The lens device in accordance with an exemplary embodiment of the invention includes a first lens module, an image sensor and a first light path turning module. The first light path turning module is configured to transmit a light beam passing through the first lens module to the image sensor by exactly three or four reflections. The first light path turning module includes three or four reflecting surfaces on which the reflections occur. All the reflecting surfaces are plane surfaces.

In another exemplary embodiment, the first light path turning module includes no free form surface.

In yet another exemplary embodiment, the first light path turning module consists of two reflecting optical elements reflecting the light beam three times.

In another exemplary embodiment, the first light path turning module consists of one reflecting optical element reflecting the light beam three times.

In yet another exemplary embodiment, the first lens module has an optical axis oriented in a first direction. The first light path turning module further includes a first reflecting part, a second reflecting part and a third reflecting part. The first reflecting part is configured to receive and reflect the light beam passing through the first lens module. The first reflecting part is disposed between the first lens module and the image sensor and is movable in the first direction. The second reflecting part is configured to reflect the light beam coming from the first reflecting part. The second reflecting part is disposed between the first lens module and the image sensor and is movable along with the first reflecting part in same or opposite direction. The third reflecting part is configured to reflect the light beam, coming from the first lens module, to the first reflecting part. The third reflecting part is disposed between the first lens module and the image sensor.

In another exemplary embodiment, the second reflecting part is disposed opposite to the first reflecting part in the first direction. The third reflecting part reflects the light beam from the first lens module to the first reflecting part and reflects the light beam from the second reflecting part to the image sensor.

In yet another exemplary embodiment, the first reflecting part has a first reflecting surface and the second reflecting part has a second reflecting surface. The first reflecting surface is at 450 from the first direction. The first reflecting surface and the second reflecting surface are perpendicular to each other. The first reflecting surface and the second reflecting surface are disposed opposite to each other in the first direction. The third reflecting part has a third reflecting surface and a fourth reflecting surface, the third reflecting surface is disposed opposite to the first lens module in the first direction and opposite to the first reflecting surface in a third direction, the fourth reflecting surface is disposed opposite to the second reflecting surface in the third direction. The third reflecting surface is parallel to the first reflecting surface and the fourth reflecting surface is parallel to the second reflecting surface.

In another exemplary embodiment, the first lens module has an optical axis oriented in a first direction. The first light path turning module further includes a first reflecting part and a second reflecting part. The first reflecting part includes a first reflecting cathetus surface, a second reflecting cathetus surface, and a first hypotenuse surface. The second reflecting part includes a third reflecting cathetus surface, a fourth reflecting cathetus surface, and a second hypotenuse surface. A light beam passes through the first lens module, is reflected on the third reflecting cathetus surface of the second reflecting part, enters the first reflecting part through the first hypotenuse surface, is reflected on the first reflecting cathetus surface, is reflected on the second reflecting cathetus surface, leaves the first reflecting part through the first hypotenuse surface, and is reflected on the fourth reflecting cathetus surface of the second reflecting part to form an image on the image sensor.

In yet another exemplary embodiment, the first reflecting part can move along the first direction parallel to the first hypotenuse surface; and/or the first reflecting part can move perpendicular to the first hypotenuse surface.

In another exemplary embodiment, the lens device further includes a first reflecting module, a second reflecting module, a rolling unit and a first mount. The first reflecting module includes a first reflecting part and a first carrier, and the first reflecting part is disposed on the first carrier. The second reflecting module includes a second reflecting part and a second carrier, and the second reflecting part is disposed on the second carrier. The rolling unit includes a roller. Either the first carrier or the first mount has a first receiving groove for positioning the roller, the first carrier further has a first guide groove extending in a direction of movement of the first carrier when the first mount has the first receiving groove, or the first mount further has the first guide groove extending in the direction of movement of the first carrier when the first carrier has the first receiving groove. Either the second carrier or the first mount has a second receiving groove for positioning the roller, the second carrier further has a second guide groove extending in a direction of movement of the second carrier and corresponding to the second receiving groove when the first mount has the second receiving groove, or the first mount further has the second guide groove extending in the direction of movement of the second carrier and corresponding to the second receiving groove when the second carrier has the second receiving groove.

In yet another exemplary embodiment, the first light path turning module further includes a first reflecting part and a second reflecting part. The first reflecting part is disposed between the first lens module and the image sensor. The first reflecting part includes a first reflecting cathetus surface, a second reflecting cathetus surface and a first hypotenuse surface. The second reflecting part is disposed between the first reflecting part and the first lens module. The second reflecting part includes a third reflecting cathetus surface, a fourth reflecting cathetus surface and a second hypotenuse surface. The second reflecting part is configured to move parallel to the second hypotenuse surface for compensation for hand wobbling. The second reflecting part is configured to move perpendicular to the second hypotenuse surface for adjustment of focal length of the lens device.

In another exemplary embodiment, the first light path turning module includes a first prism unit. The first prism unit includes a first surface, a second surface and a third surface. The light beam enters the first prism unit through the first surface, is totally reflected in the first prism unit at least three times, and leaves the first prism unit from the second surface and perpendicular to the second surface. The first surface is perpendicular to an optical axis of the first lens module. The first surface meets the second surface at a first angle ranged from 42.75° to 47.25°. The second surface meets the third surface at a second angle ranged from 64.125° to 70.875°. The first surface meets the third surface at a third angle ranged from 64.125° to 70.875°.

In yet another exemplary embodiment, the first light path turning module further includes a first prism unit and a second prism unit. The first prism unit includes a first surface, a second surface and a third surface. The second prism unit includes a fourth surface, a fifth surface and a sixth surface. The fourth surface is disposed opposite to the first lens module. The fifth surface and the first surface are spaced and disposed opposite to each other. The third surface is coated with a reflecting film and is inclined towards the lens module. The light beam passes through the second prism unit and then the first prism unit, is totally reflected in the first prism unit, and leaves the first prism unit from the second surface and perpendicular to the second surface. The second surface meets the third surface at a first angle ranged from 85.5° to 94.5°. The first surface meets the second surface at a second angle ranged from 47.5° to 52.5°. The first surface meets the third surface at a third angle ranged from 38° to 42°. The fourth surface meets the fifth surface at a fourth angle ranged from 28.5° to 31.5°. The fifth surface meets the sixth surface at a fifth angle ranged from 57° to 63°.

In another exemplary embodiment, the lens device includes a first lens module, an image sensor and a first light path turning module. The first light path turning module is configured to transmit a light beam passing through the first lens module to the image sensor by exactly three reflections. The first light path turning module consists of two reflecting optical elements. The light beam propagates along an optical path. Along the optical path, no optical element is disposed between the two reflecting optical elements.

In yet another exemplary embodiment, the first light path turning module consists of two or three reflecting optical elements, all surfaces of which the light beam pass through are plane surfaces.

In another exemplary embodiment, the lens device includes a first lens module, an image sensor and a first light path turning module. The first light path turning module is configured to transmit a light beam passing through the first lens module to the image sensor by exactly three or four reflections. The first light path turning module consists of two or three reflecting optical elements, all surfaces of which the light beam pass through are plane surfaces.

In yet another exemplary embodiment, the first light path turning module includes no free form surface.

BRIEF DESCRIPTION OF THE DRAWINGS

FIG. 11A is a schematic diagram of a reflecting part in accordance with the invention.

FIG. 11B is another schematic diagram of the reflecting part in accordance with the invention.

FIG. 23 is a side view of the periscope lens of FIG. 21.

FIG. 35 is an exploded diagram of a voice coil motor in accordance with a tenth embodiment of the invention, with the frame thereof removed.

DETAILED DESCRIPTION OF THE INVENTION

The invention can be more fully understood by reading the subsequent detailed description and embodiments with references made to the accompanying drawings. However, it is understood that the subsequent detailed description and embodiments are only used for explaining the invention. The invention is not limited thereto.

Figure 1:
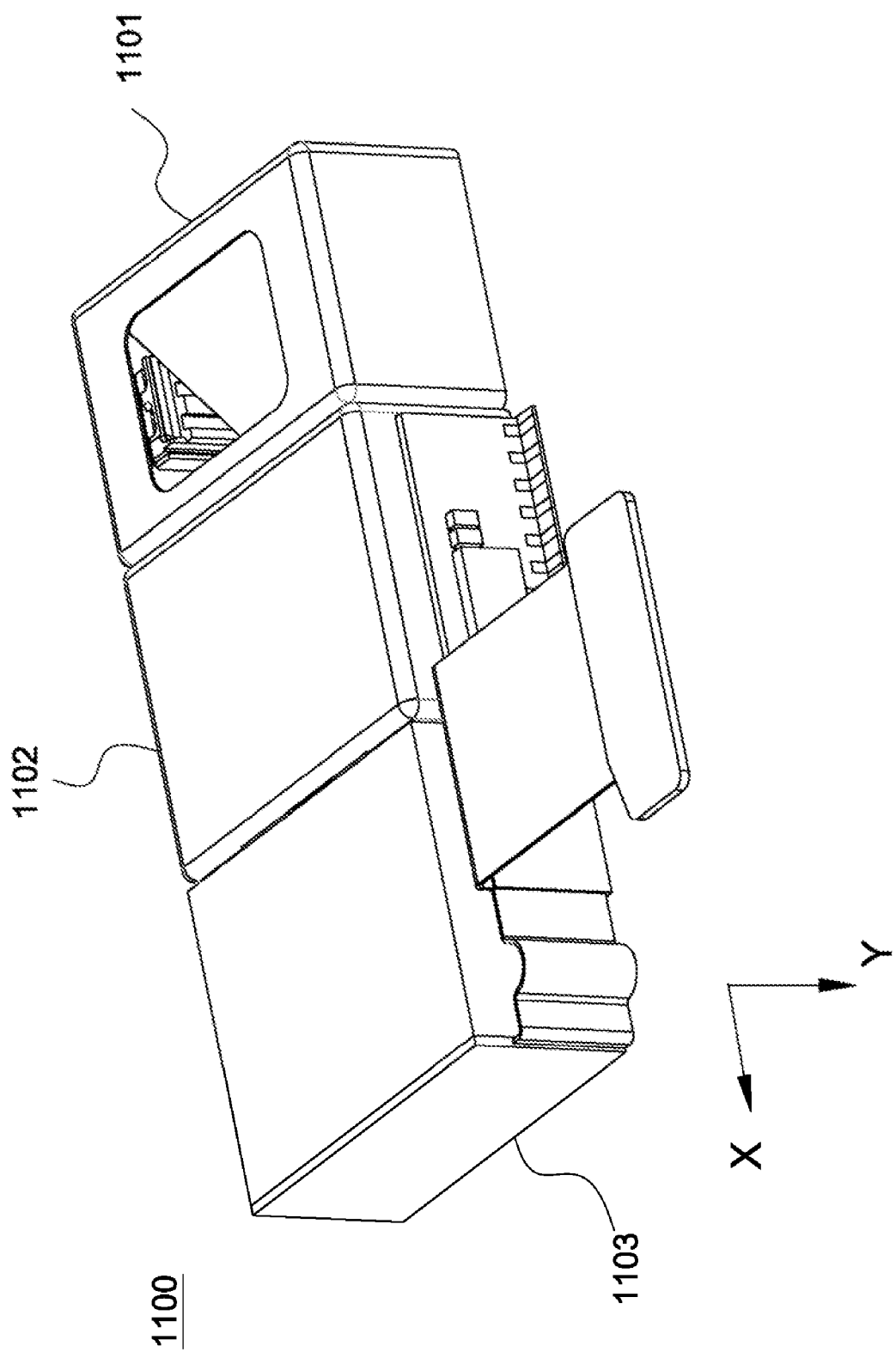
FIG. 1 is a schematic diagram showing a lens device of the prior art.
Figure 2:
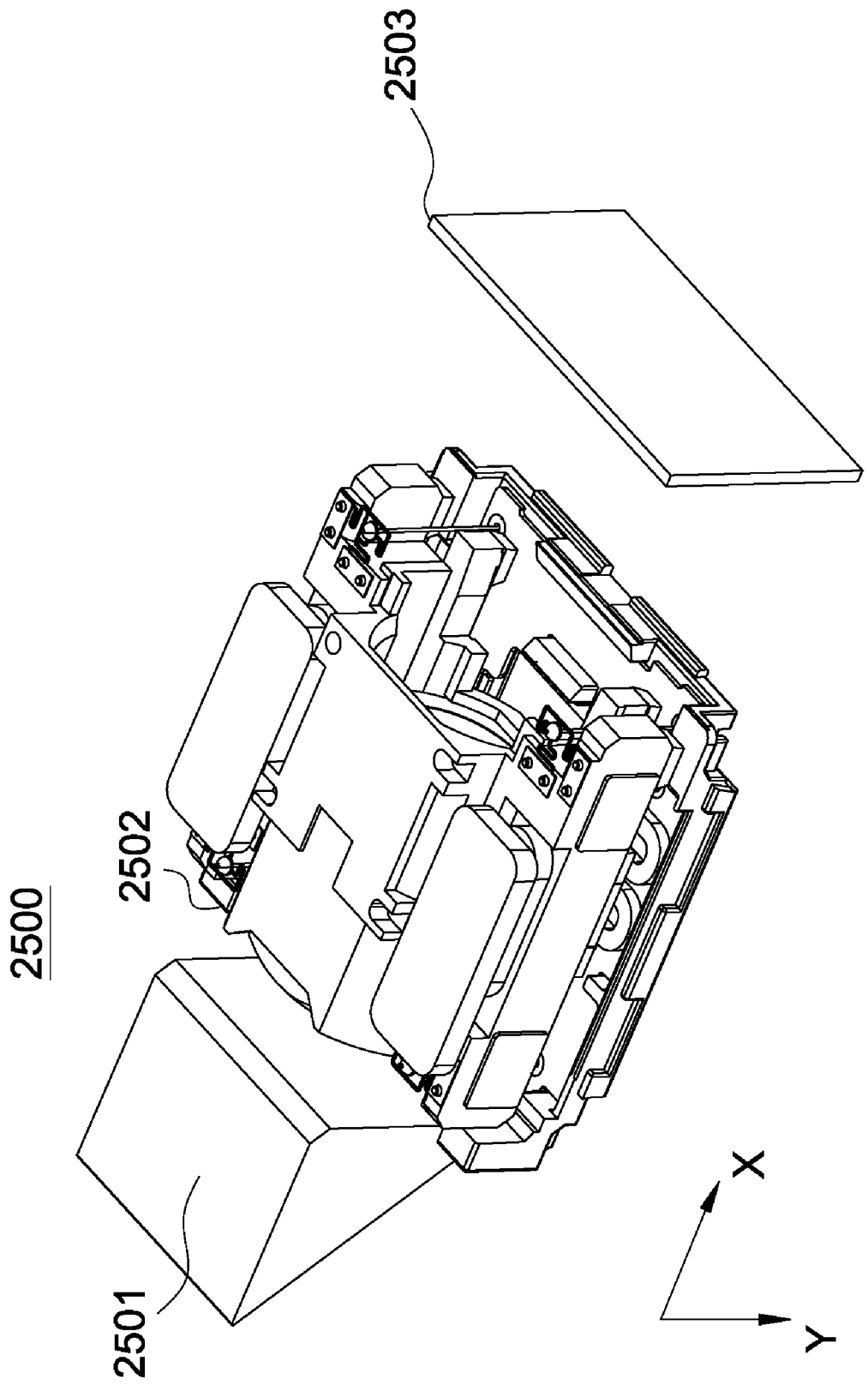
FIG. 2 is a schematic diagram showing another lens device of the prior art.
Figure 3:
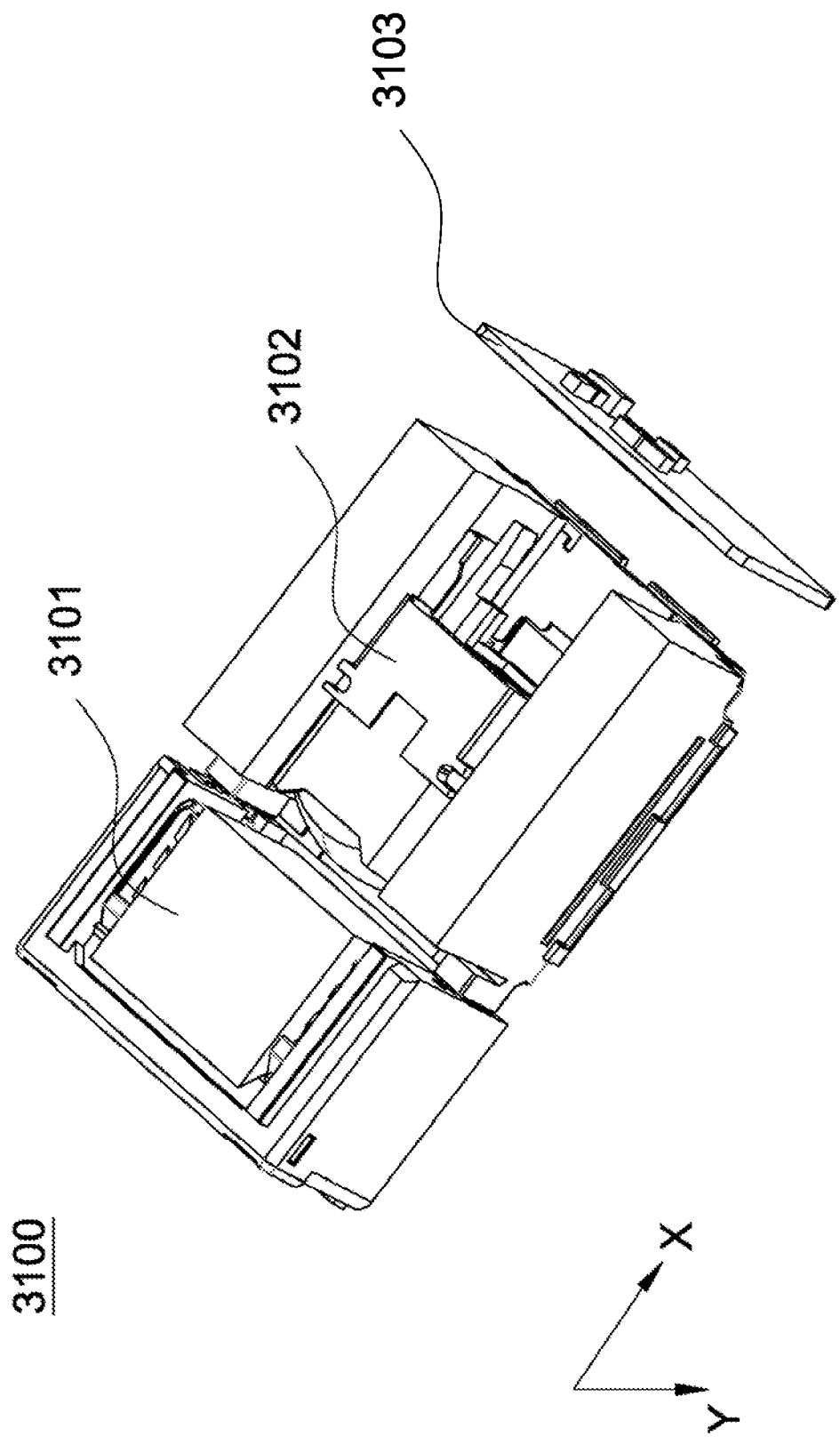
FIG. 3 is a schematic diagram showing a periscope lens of the prior art.
Figure 4:
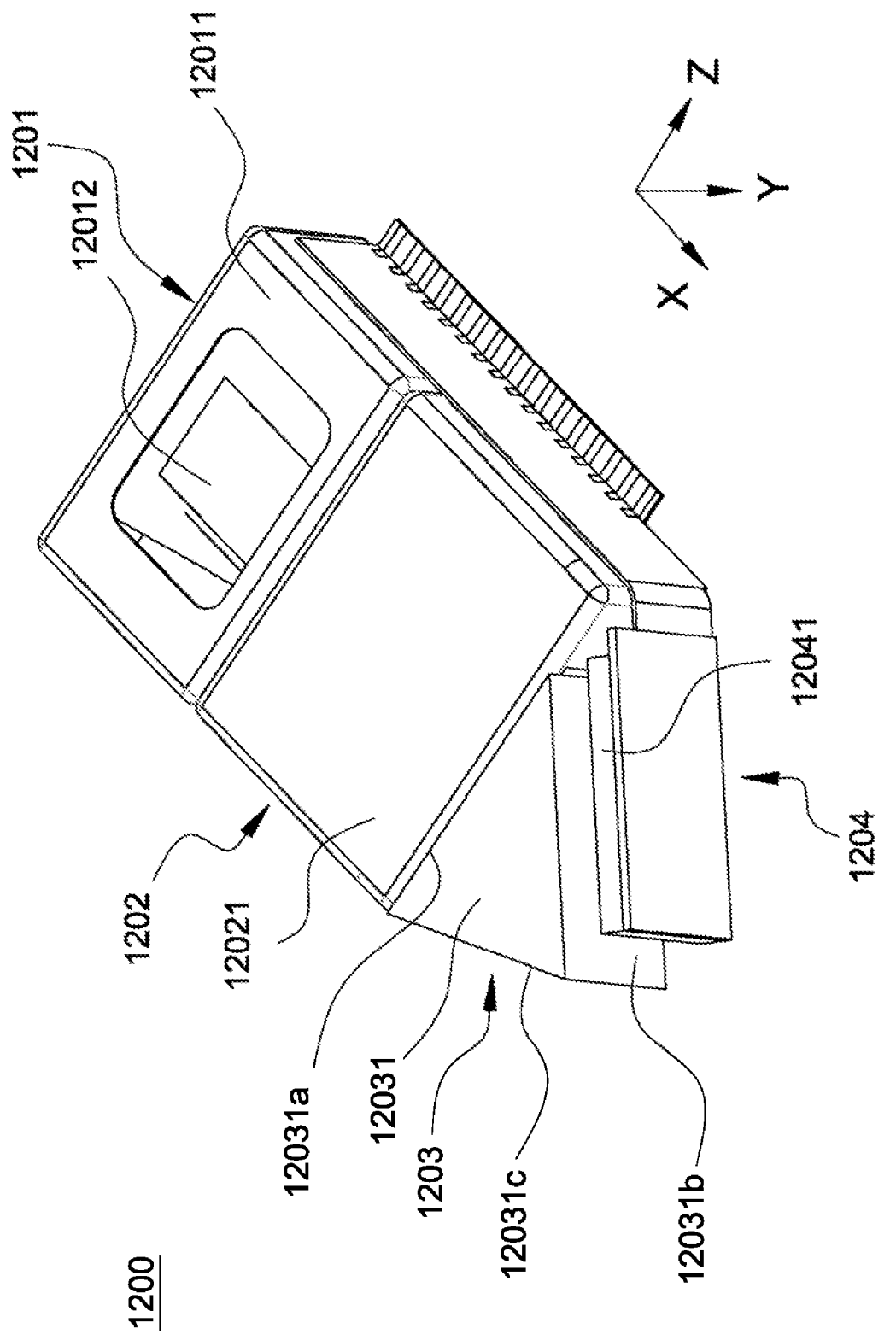
FIG. 4 is a schematic diagram showing the structure of a lens device in accordance with a first embodiment of the invention.
Figure 5:
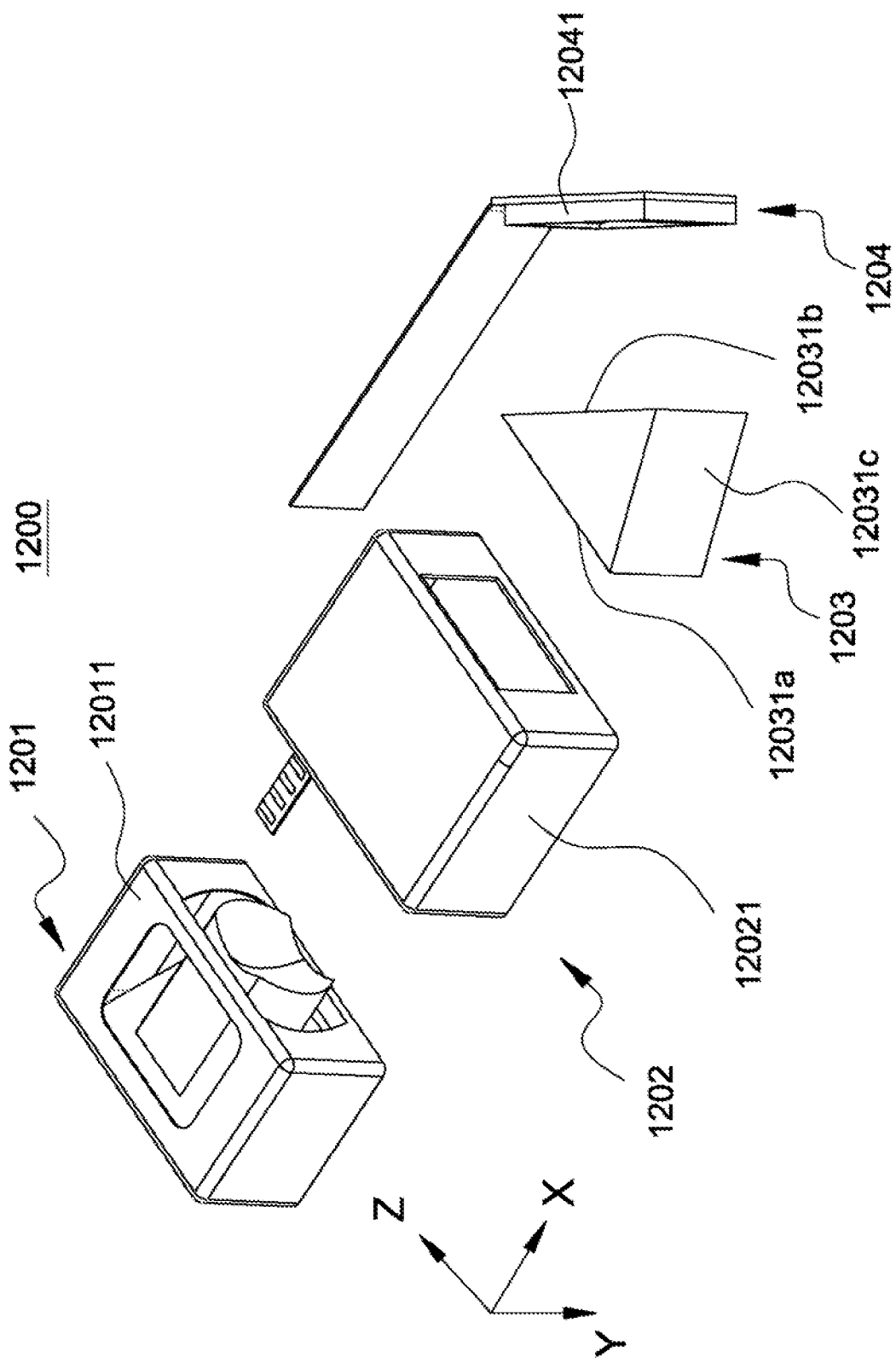
FIG. 5 is an exploded diagram of the lens device of the first embodiment of the invention.
Figure 6:
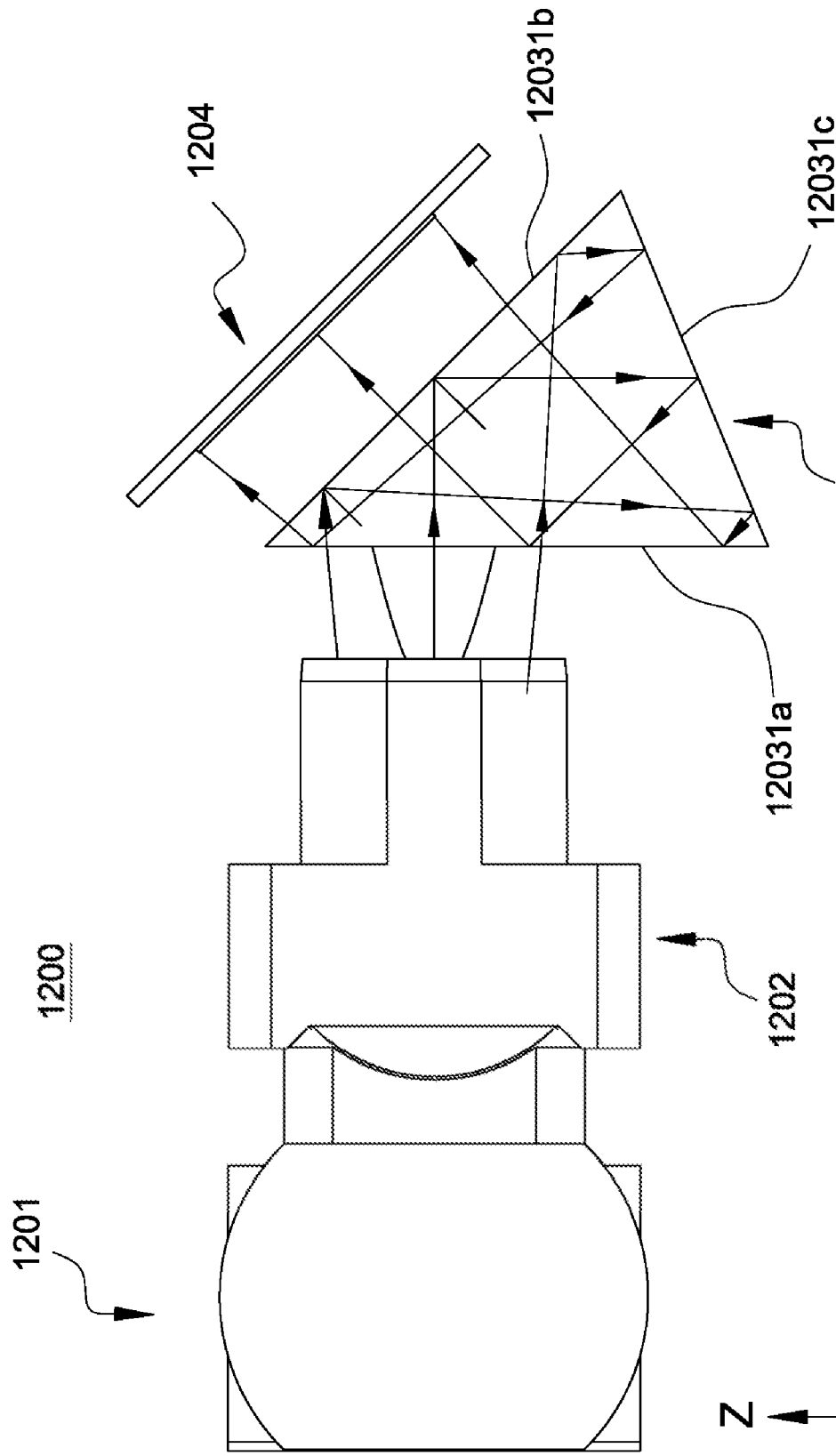
FIG. 6 depicts the optical path of the lens device of the first embodiment of the invention.

FIG. 4 is a schematic diagram showing the structure of a lens device 1200 in accordance with a first embodiment of the invention. FIG. 5 is an exploded diagram of the lens device 1200 of the first embodiment of the invention. FIG. 6 depicts the optical path of the lens device 1200 of the first embodiment of the invention. Referring to FIGS. 4-6, the lens device 1200 in accordance with the first embodiment of the invention includes a second light path turning module 1201, a first lens module 1202, a first light path turning module 1203 and an image sensor 1204. The first lens module 1202 includes a plurality of lens units (not shown) and has an optical axis oriented in a first direction X.

The second light turning module 1201, the first lens module 1202, the first light path turning module 1203 are arranged in the first direction X. In operation, a light beam propagates in a second direction Y, enters the second light path turning module 1201, is reflected by the second light path turning module 1201 to propagate in the first direction X, enters the first lens module 1202, and propagates in the first direction X to reach the first light path turning module 1203. The second direction Y is perpendicular to the first direction X.

The second light path turning module 1201 includes a light path turning unit mount 12011, a light path turning unit carrier (not shown) disposed in the light path turning unit mount 12011, and a light path turning unit 12012 fixed to the interior of the light path turning unit carrier. The light path turning unit 12012 may be a prism unit or a reflecting mirror. The light path turning unit 12012 has a reflecting surface for reflecting the light beam, coming from the second direction Y, to the first lens module 1202.

The first lens module 1202 includes a lens unit mount 12021, a lens unit having an optical axis oriented in the first direction X, a primary lens unit carrier configured to carry the lens unit, and a secondary lens unit carrier configured to receive the primary lens unit carrier and connected to the lens unit mount 12021. The primary lens unit carrier is movable with respect to the secondary lens unit carrier in at least one of the first direction X, the second direction Y and a third direction Z. The secondary lens unit carrier is movable with respect to the lens unit mount 12021 in a direction(s) other than the direction(s) in which the primary lens unit carrier is moved. The first lens module 1202 further includes driving elements for driving the primary lens unit carrier to move with respect to the secondary lens unit carrier and for driving the secondary lens unit carrier to move with respect to the lens unit mount 12021, in order to perform the focusing operation in the first direction X and to compensate for hand wobbling in the second direction Y and the third direction Z. The third direction Z is perpendicular to the first direction X and the second direction Y.

However, the invention is not limited thereto. In another embodiment, the first lens module 1202 is configured to perform the focusing operation in the first direction X and to compensate for hand wobbling in the second direction Y or in the third direction Z. That is, the compensation for hand wobbling can be only performed in a single direction.

The first light path turning module 1203 is disposed between the first lens module 1202 and the image sensor 1204 and includes a first prism unit 12031 and a prism unit mount (not shown) for fixing the first prism unit 12031. The first prism unit 12031 includes a first surface 12031*a*, a second surface 12031*b* and a third surface 12031*c*. The first prism unit 12031 may be a triangular prism. The first surface 12031*a* is opposite to the first lens module 1202, while the second surface 12031*b* is opposite to the image sensor 1204.

The light beam, exiting from the first lens module 1202, enters the first prism unit 12031 through the first surface 12031*a*. Preferably, the first surface 12031*a* is perpendicular to the first direction X. The light beam passes through the first surface 12031*a*. The second surface 12031*b* is inclined towards the first lens module 1202. The light beam, entering the first prism unit 12031, is totally reflected on the second surface 12031*b* due to the incident angle greater than the critical angle, and reaches the third surface 12031*c*. The third surface 12031*c* is coated with a reflecting film to reflect the light beam. The light beam is reflected to the first surface 12031*a* by the third surface 12031*c*, is totally reflected on the first surface 12031*a* due to the incident angle greater than the critical angle, passes through the second surface 12031*b*, and reaches the image sensor 1204 to form an image. Preferably, the light beam, after reflected on the first surface 12031*a*, is perpendicularly incident on the second surface 12031*b*. The first surface 12031*a* and the second surface 12031*b* are arranged in accordance with Snell's law. Refraction is the change in direction of a light beam passing from one medium to another medium, wherein the two media have different refractive indices. If a light beam is incident from a medium of higher refractive index to a medium of lower refractive index and the incident angle is greater than the critical angle, then the light beam will be totally reflected back to the medium of higher refractive index without any refraction. That is, there is no refracted light beam but reflected light beam, which is named the total reflection. The critical angle is the smallest angle of incidence that yields total reflection. According to the above-mentioned optical phenomenon, the light beam entering the first prism unit 12031 in the first direction X and being reflected on the third surface 12031*c* to the first surface 12031*a* is totally reflected rather than passes through the first surface 12031*a*. The first prism unit 12031 may be a total reflection prism.

The first surface 12031*a* is perpendicular to the optical axis of the first lens module 1202 (or the first direction X). The first surface 12031*a* meets the second surface 12031*b* at an angle ranged from 42.75° to 47.25°. The second surface 12031*b* meets the third surface 12031*c* at an angle ranged from 64.125° to 70.875°. The third surface 12031*c* meets the first surface 12031*a* at an angle ranged from 64.125° to 70.875°. Preferably, the first surface 12031*a* is perpendicular to the first direction X. The first surface 12031*a* meets the second surface 12031*b* at 45°. The second surface 12031*b* meets the third surface 12031*c* at 67.5°. The third surface 12031*c* meets the first surface 12031*a* at 67.5°. Such arrangement ensures that the light beam propagates in accordance with the above-mentioned path. However, the invention is not limited thereto. Other proper angles may be used in the invention.

The image sensor 1204 includes an image forming unit 12041 which is parallel to the second surface 12031*b*.

Figure 7:
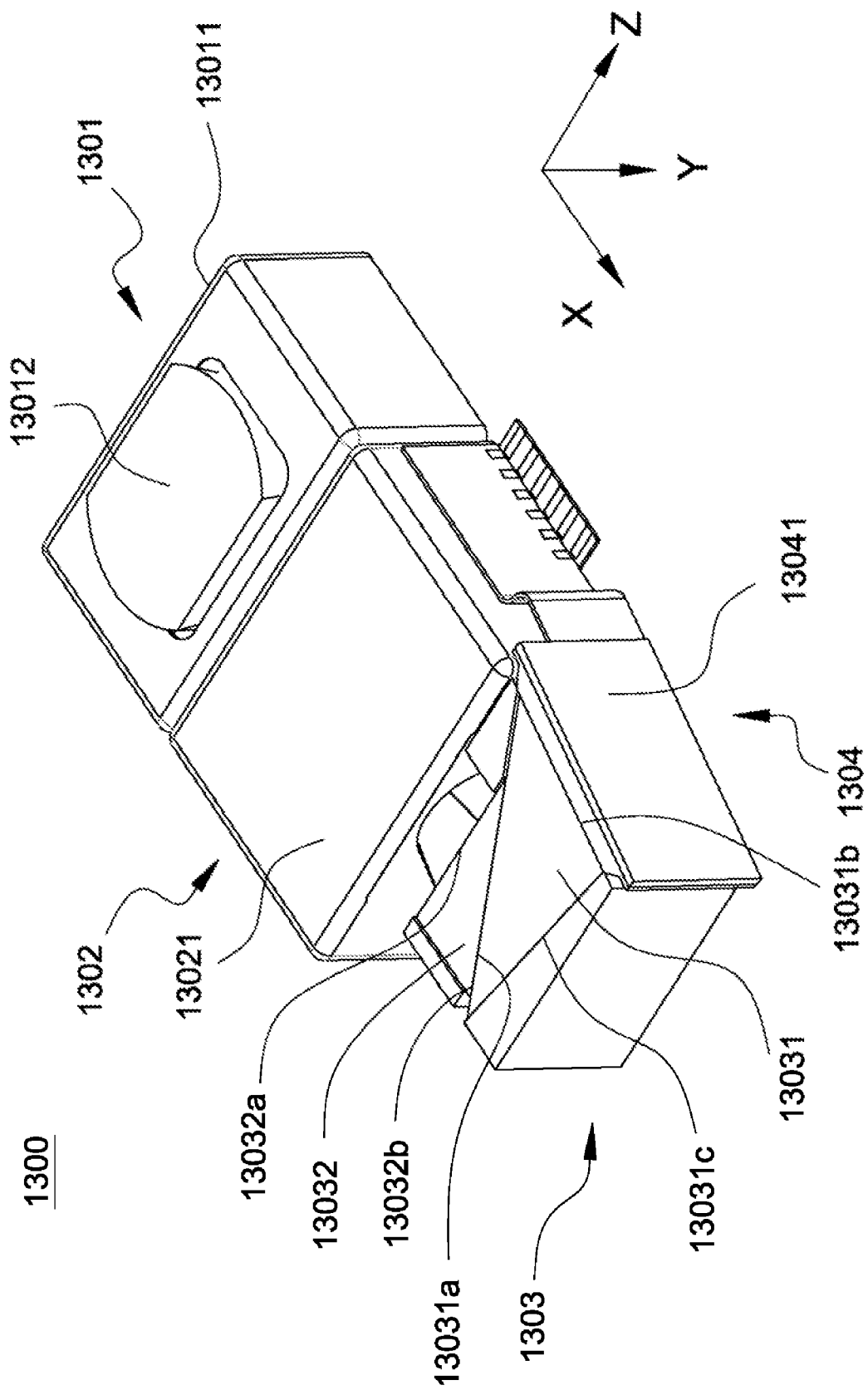
FIG. 7 is a schematic diagram showing the structure of a lens device in accordance with a second embodiment of the invention.
Figure 8:
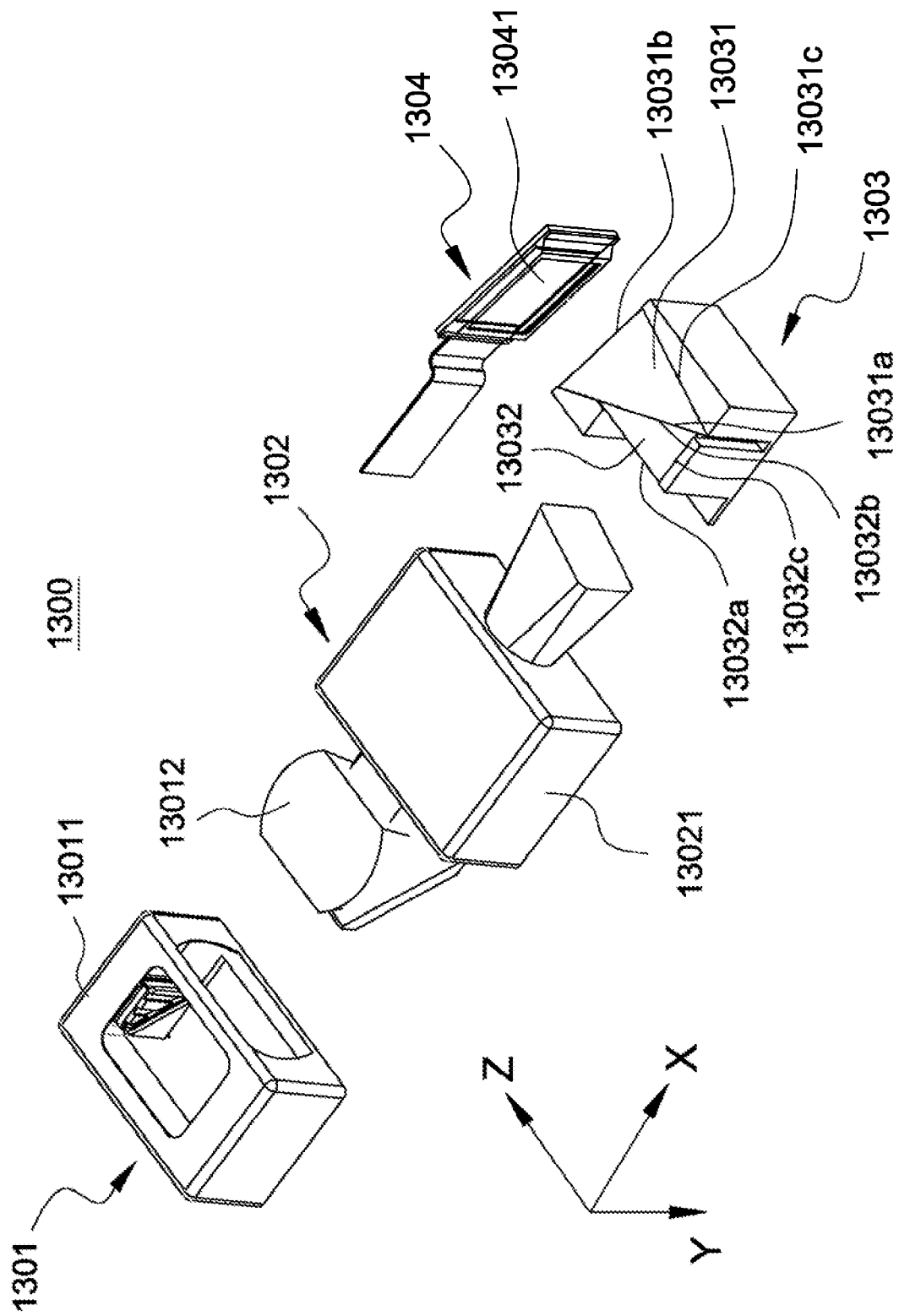
FIG. 8 is an exploded diagram of the lens device of the second embodiment of the invention.
Figure 9:
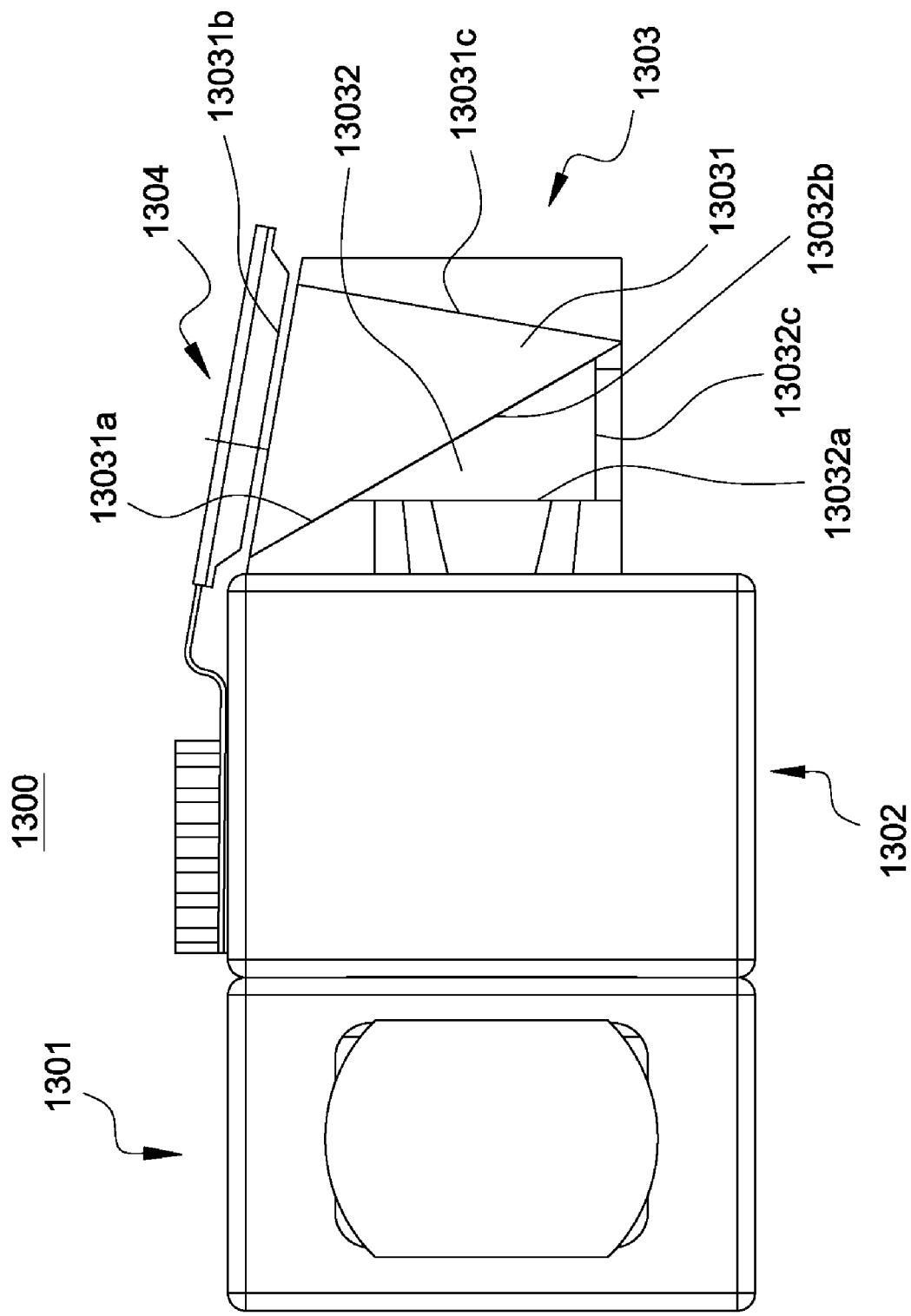
FIG. 9 is a top view of the lens device of the second embodiment of the invention.
Figure 10:
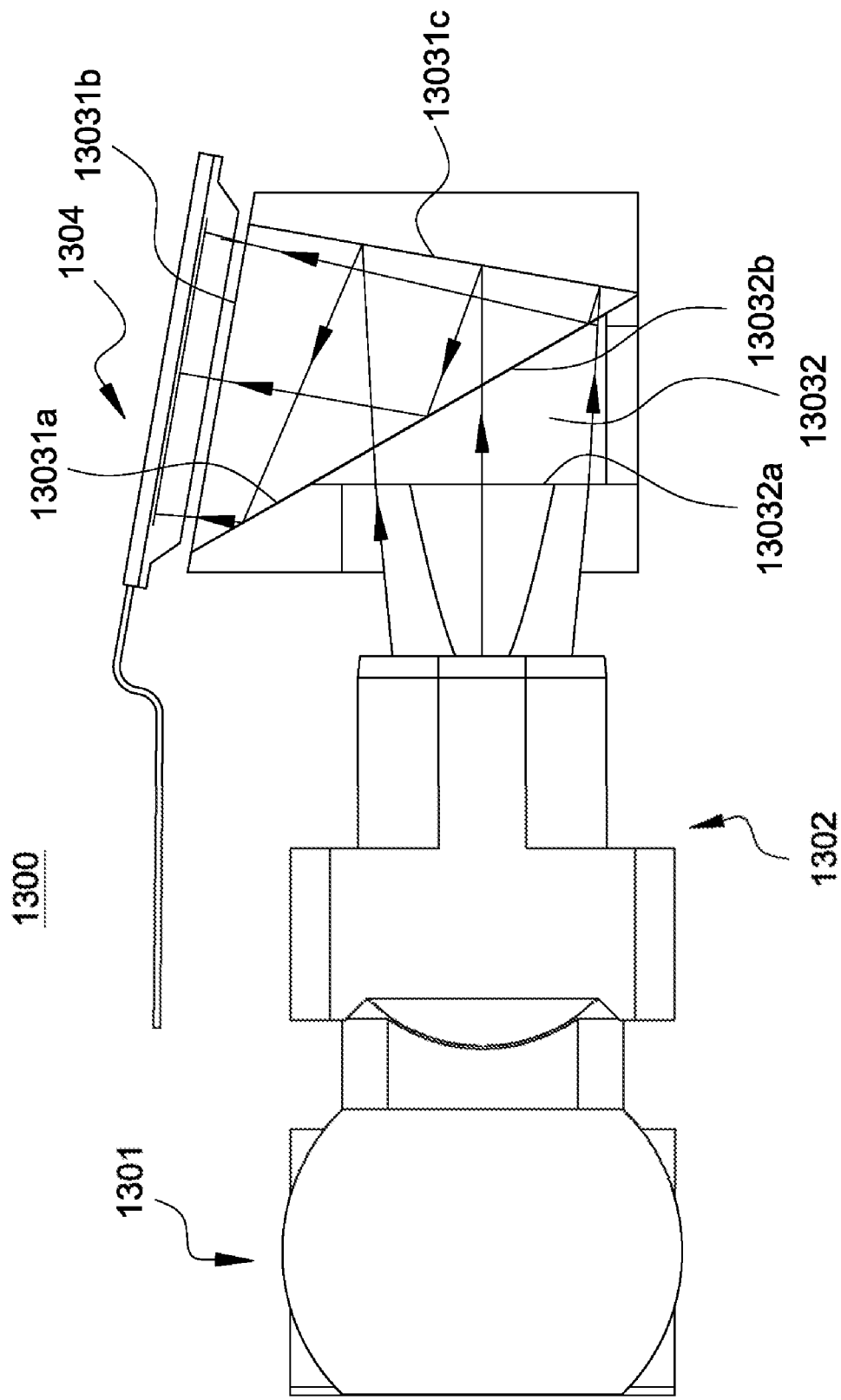
FIG. 10 depicts the optical path of the lens device of the second embodiment of the invention.

FIG. 7 is a schematic diagram showing the structure of a lens device 1300 in accordance with a second embodiment of the invention. FIG. 8 is an exploded diagram of the lens device 1300 of the second embodiment of the invention. FIG. 9 is a top view of the lens device 1300 of the second embodiment of the invention. FIG. 10 depicts the optical path of the lens device 1300 of the second embodiment of the invention. Referring to FIGS. 7-10, the lens device 1300 in accordance with the second embodiment of the invention includes a second light path turning module 1301, a first lens module 1302, a first light path turning module 1303 and an image sensor 1304. The first lens module 1302 includes a plurality of lens units (not shown) and has an optical axis oriented in a first direction X.

From the above embodiments, it is understood that the lens device of the invention has a layout different from the prior art. Therefore, application of the lens device of the invention for various electronic equipments which are in rapid development is more flexible.

Referring to FIG. 11A, the lens device of the invention includes a first reflecting part 210. The first reflecting part 210 has a first reflecting cathetus surface 211, a second reflecting cathetus surface 212 and a hypotenuse surface 213, wherein the first reflecting cathetus surface 211 and the second reflecting cathetus surface 212 are perpendicular to each other. The hypotenuse surface 213 is configured for allowing light beams to pass through. In FIG. 11A, the first reflecting cathetus surface 211, the second reflecting cathetus surface 212 and the hypotenuse surface 213 are shown in solid lines when the first reflecting part 210 is in an initial position. The first reflecting cathetus surface 211, the second reflecting cathetus surface 212 and the hypotenuse surface 213 are shown in broken lines when the first reflecting part 210 is moved rightwards (parallel to the hypotenuse surface 213, in a −Z direction) at a distance L to a first position. If the first reflecting part 210 is moved from the initial position to the first position in the −Z direction at a distance of L, then the reflection of a light beam on the first reflecting cathetus surface 211 will be earlier, the reflection of the light beam on the second reflecting cathetus surface 212 will be later, and the light beam exiting from the hypotenuse surface 213 will be shifted in the −Z direction at a distance of 2L. However, if the first reflecting part 210 is moved from the initial position to a second position in the +Z direction at a distance of L, then the reflection of a light beam on the first reflecting cathetus surface 211 will be later, the reflection of the light beam on the second reflecting cathetus surface 212 will be earlier, and the light beam exiting from the hypotenuse surface 213 will be shifted in the +Z direction at a distance of 2L. By repeatedly moving the first reflecting part 210 along the Z axis parallel to the hypotenuse surface 213, the shaking (hand wobbling) along the Z axis can be compensated and the image blurring can be suppressed.

Referring to FIG. 11B, the first reflecting cathetus surface 211, the second reflecting cathetus surface 212 and the hypotenuse surface 213 are shown in solid lines when the first reflecting part 210 is in an initial position. The first reflecting cathetus surface 211, the second reflecting cathetus surface 212 and the hypotenuse surface 213 are shown in broken lines when the first reflecting part 210 is moved downwards (perpendicular to the hypotenuse surface 213, in a −X direction) at a distance L to a first position. If the first reflecting part 210 is moved from the initial position to the first position in the −X direction at a distance of L, then the reflection of a light beam on the first reflecting cathetus surface 211 will be earlier, the reflection of the light beam on the second reflecting cathetus surface 212 will be earlier, and the light beam exiting from the hypotenuse surface 213 will be shifted in the −X direction at a distance of 2L that produces an effect to reduce the focal length. Thus, the focal length of the optical system is reduced. However, if the first reflecting part 210 is moved from the initial position to a second position in the +X direction at a distance of L, then the reflection of a light beam on the first reflecting cathetus surface 211 will be later, the reflection of the light beam on the second reflecting cathetus surface 212 will be later, and the light beam exiting from the hypotenuse surface 213 will be shifted in the +X direction at a distance of 2L that produces an effect to increase the focal length. Thus, the focal length of the optical system is increased. By repeatedly moving the first reflecting part 210 along the X axis perpendicular to the hypotenuse surface 213, the focal length can be adjusted.

Figure 12B:
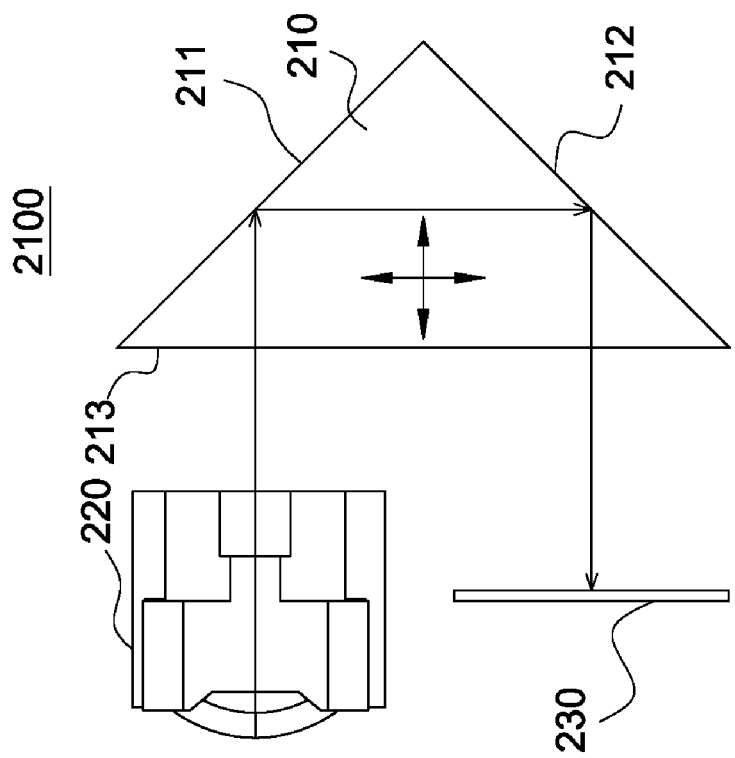
FIG. 12B depicts the optical path of the lens device of the third embodiment of the invention.
Figure 12A:
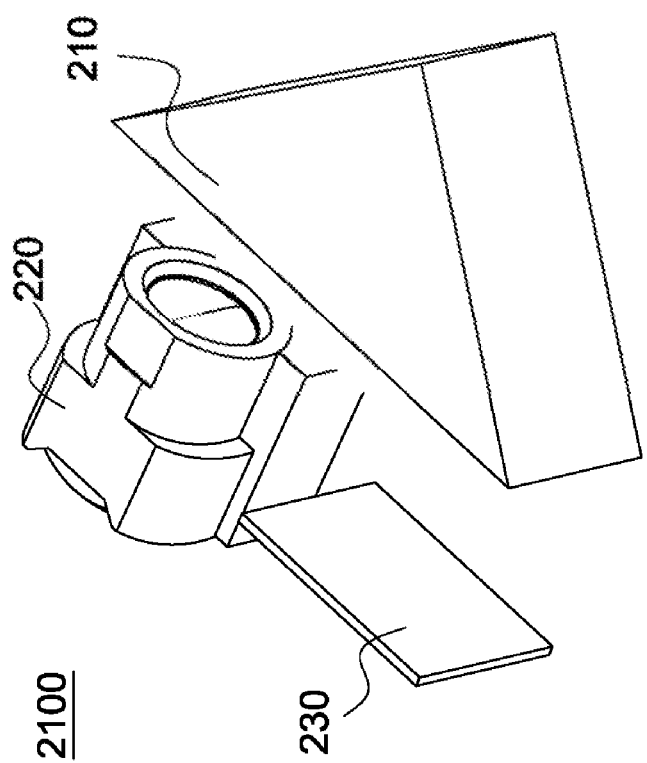
FIG. 12A is a schematic diagram showing a lens device in accordance with a third embodiment of the invention.

Referring to FIGS. 12A and 12B, a lens device 2100 in accordance with a third embodiment of the invention includes a first light path turning module, a first lens module 220 and an image sensor 230. In this embodiment, the first light path turning module includes a first reflecting part 210. In operation, a light beam passes through the first lens module 220, enters the first reflecting part 210 through the hypotenuse surface 213, is reflected on the first reflecting cathetus surface 211, is reflected on the second reflecting cathetus surface 212, and leaves the first reflecting part 210 through the hypotenuse surface 213 to form an image on the image sensor 230.

Figure 12D:
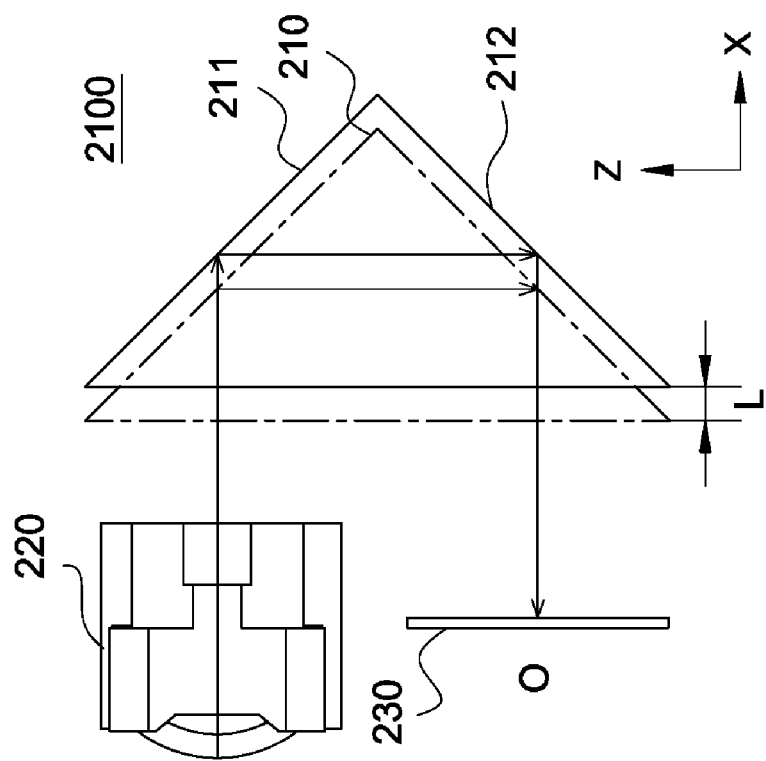
FIG. 12D depicts the optical path of the lens device of the third embodiment of the invention when the reflecting part is moved along a Y-axis.
Figure 12C:
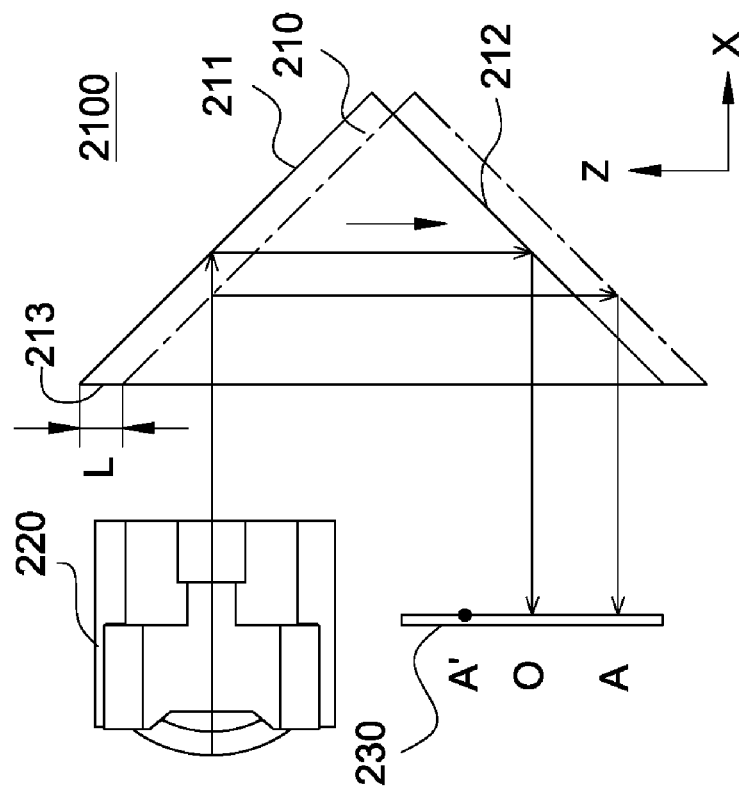
FIG. 12C depicts the optical path of the lens device of the third embodiment of the invention when the reflecting part is moved along an X-axis.

Referring to FIG. 12C, the first reflecting cathetus surface 211, the second reflecting cathetus surface 212 and the hypotenuse surface 213 are shown in solid lines when the first reflecting part 210 is in an initial position. The first reflecting cathetus surface 211, the second reflecting cathetus surface 212 and the hypotenuse surface 213 are shown in broken lines when the first reflecting part 210 is moved rightwards (parallel to the hypotenuse surface 213, in a −Z direction) at a distance L to a first position. If the first reflecting part 210 is moved from the initial position to the first position in the −Z direction at a distance of L, then the reflection of a light beam on the first reflecting cathetus surface 211 will be earlier, the reflection of the light beam on the second reflecting cathetus surface 212 will be later, and the light beam exiting from the hypotenuse surface 213 will be shifted in the −Z direction at a distance of 2L. However, if the first reflecting part 210 is moved from the initial position to a second position in the +Z direction at a distance of L, then the reflection of a light beam on the first reflecting cathetus surface 211 will be later, the reflection of the light beam on the second reflecting cathetus surface 212 will be earlier, and the light beam exiting from the hypotenuse surface 213 will be shifted in the +Z direction at a distance of 2L. By repeatedly moving the first reflecting part 210 along the Z axis parallel to the hypotenuse surface 213, the shaking (hand wobbling) along the Z axis can be compensated and the image blurring can be suppressed.

Referring to FIG. 12D, the first reflecting cathetus surface 211, the second reflecting cathetus surface 212 and the hypotenuse surface 213 are shown in solid lines when the first reflecting part 210 is in an initial position. The first reflecting cathetus surface 211, the second reflecting cathetus surface 212 and the hypotenuse surface 213 are shown in broken lines when the first reflecting part 210 is moved downwards (perpendicular to the hypotenuse surface 213, in a −X direction) at a distance L to a first position. If the first reflecting part 210 is moved from the initial position to the first position in the −X direction at a distance of L, then the reflection of a light beam on the first reflecting cathetus surface 211 will be earlier, the reflection of the light beam on the second reflecting cathetus surface 212 will be earlier, and the light beam exiting from the hypotenuse surface 213 will be shifted in the −X direction at a distance of 2L that produces an effect to reduce the focal length. Thus, the focal length of the lens device is reduced. However, if the first reflecting part 210 is moved from the initial position to a second position in the +X direction at a distance of L, then the reflection of a light beam on the first reflecting cathetus surface 211 will be later, the reflection of the light beam on the second reflecting cathetus surface 212 will be later, and the light beam exiting from the hypotenuse surface 213 will be shifted in the +X direction at a distance of 2L that produces an effect to increase the focal length. Thus, the focal length of the lens device is increased. By repeatedly moving the first reflecting part 210 along the X axis perpendicular to the hypotenuse surface 213, the focal length can be adjusted.

Figure 13B:
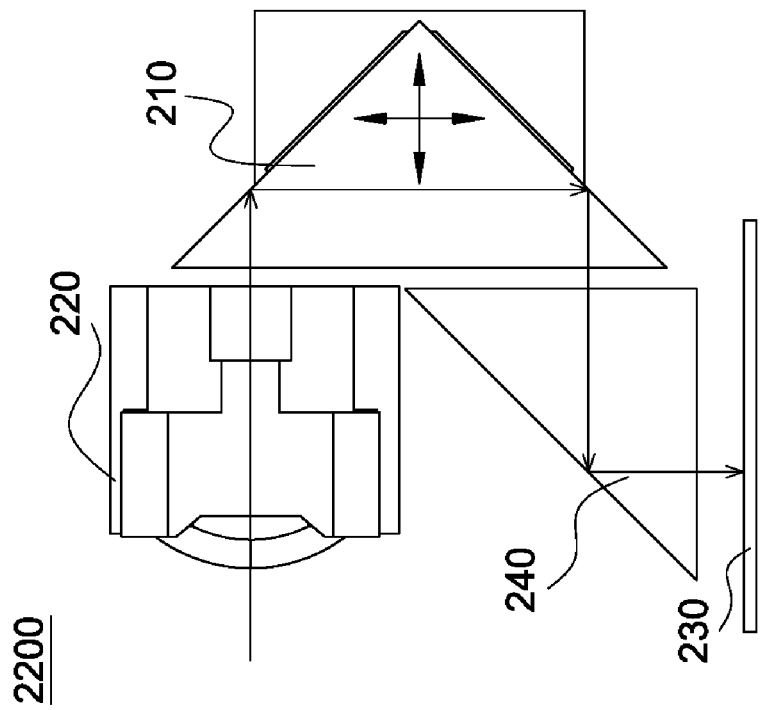
FIG. 13B depicts the optical path of the lens device of the fourth embodiment of the invention.
Figure 13A:
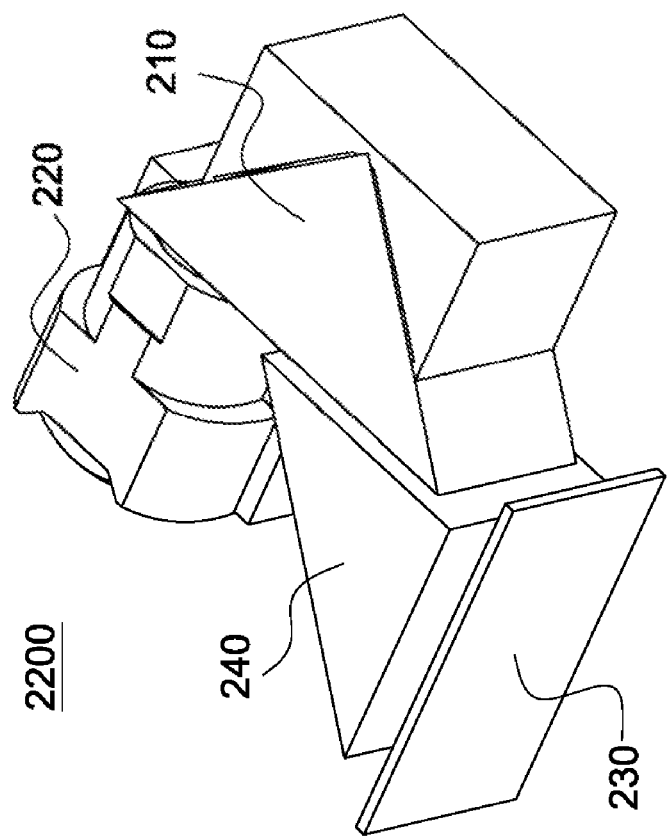
FIG. 13A is a schematic diagram showing a lens device in accordance with a fourth embodiment of the invention.

Referring to FIGS. 13A and 13B, a lens device 2200 in accordance with a fourth embodiment of the invention includes a first light path turning module, a first lens module 220 and an image sensor 230. In this embodiment, the first light path turning module includes a first reflecting part 210 and a second reflecting part 240. In operation, a light beam passes through the first lens module 220, enters the first reflecting part 210 through the hypotenuse surface 213, is reflected on the first reflecting cathetus surface 211, is reflected on the second reflecting cathetus surface 212, leaves the first reflecting part 210 through the hypotenuse surface 213, and is reflected by the second reflecting part 240 to form an image on the image sensor 230.

Figure 13D:
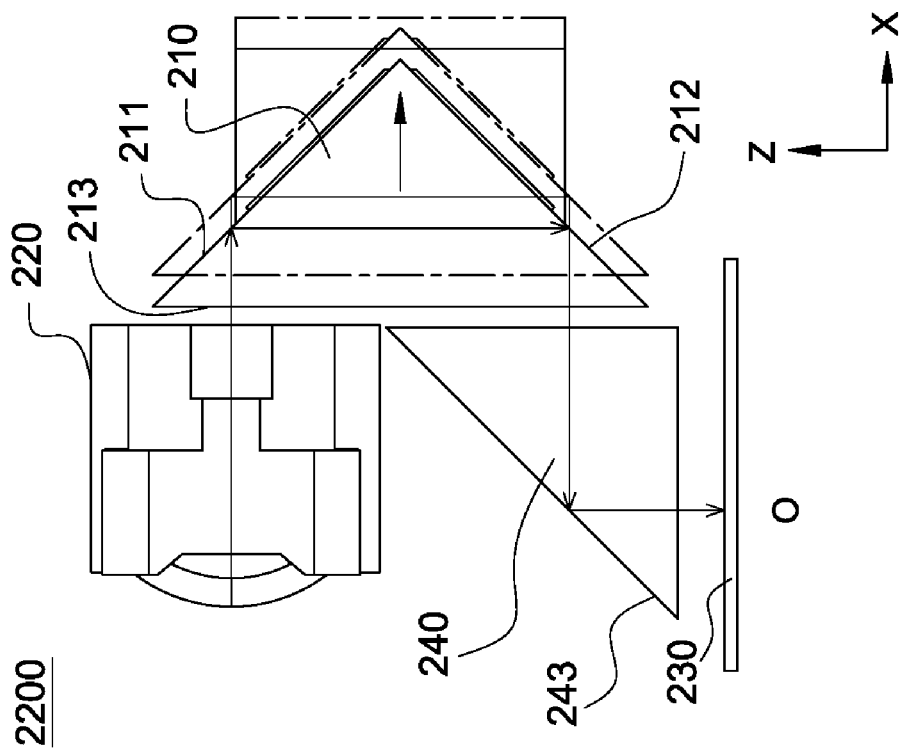
FIG. 13D depicts the optical path of the lens device of the fourth embodiment of the invention when the first reflecting part is moved along a Y-axis.
Figure 13C:
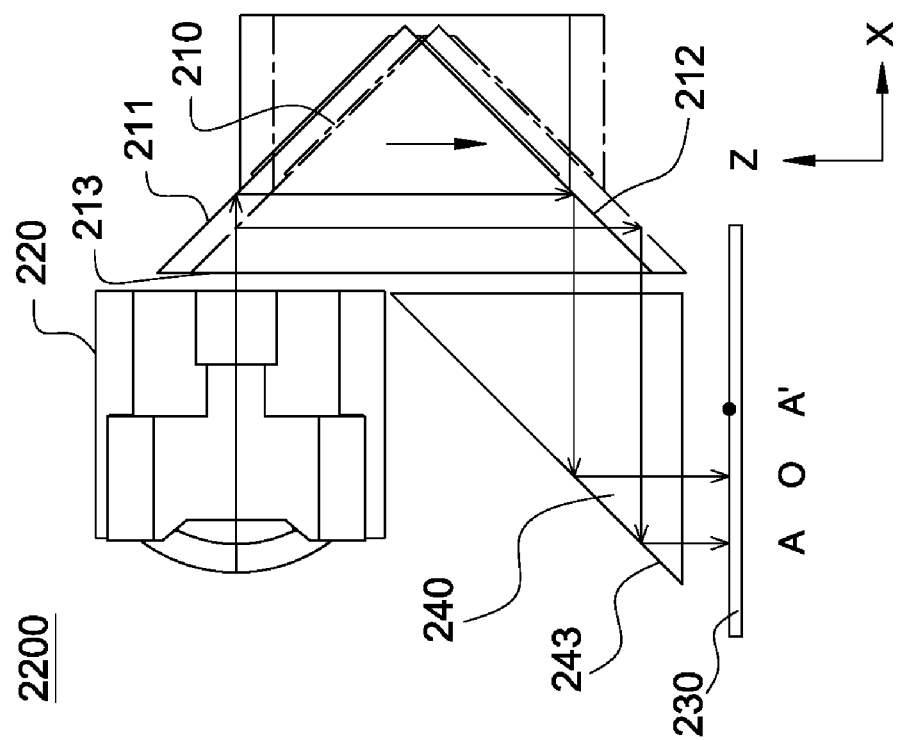
FIG. 13C depicts the optical path of the lens device of the fourth embodiment of the invention when the first reflecting part is moved along an X-axis.

Referring to FIG. 13C, the first reflecting cathetus surface 211, the second reflecting cathetus surface 212 and the hypotenuse surface 213 are shown in solid lines when the first reflecting part 210 is in an initial position. The first reflecting cathetus surface 211, the second reflecting cathetus surface 212 and the hypotenuse surface 213 are shown in broken lines when the first reflecting part 210 is moved rightwards (parallel to the hypotenuse surface 213, in a −Z direction) at a distance L to a first position. If the first reflecting part 210 is moved rightwards from the initial position to the first position in the −Z direction at a distance of L, then the reflection of a light beam on the first reflecting cathetus surface 211 will be earlier, and the reflection of the light beam on the second reflecting cathetus surface 212 will be later. Then, the light beam enters the second reflecting part 240 and is reflected on the second hypotenuse surface 243 of the second reflecting part 240 to the image sensor 230, and the light beam exiting from the second reflecting part 240 is shifted in the −X direction at a distance of 2L. However, if the first reflecting part 210 is moved leftwards from the initial position to a second position in the +Z direction at a distance of L, then the reflection of a light beam on the first reflecting cathetus surface 211 will be later, and the reflection of the light beam on the second reflecting cathetus surface 212 will be earlier. Then, the light beam enters the second reflecting part 240 and is reflected on the second hypotenuse surface 243 of the second reflecting part 240 to the image sensor 230, and the light beam exiting from the second reflecting part 240 is shifted in the +X direction at a distance of 2L. By repeatedly moving the first reflecting part 210 along the Z axis parallel to the hypotenuse surface 213, the shaking (hand wobbling) along the Z axis can be compensated and the image blurring can be suppressed.

Referring to FIG. 13D, the first reflecting cathetus surface 211, the second reflecting cathetus surface 212 and the hypotenuse surface 213 are shown in solid lines when the first reflecting part 210 is in an initial position. The first reflecting cathetus surface 211, the second reflecting cathetus surface 212 and the hypotenuse surface 213 are shown in broken lines when the first reflecting part 210 is moved upwards (perpendicular to the hypotenuse surface 213, in a +X direction) at a distance L to a first position. If the first reflecting part 210 is moved from the initial position to the first position in the +X direction at a distance of L, then the reflection of a light beam on the first reflecting cathetus surface 211 will be later, and the reflection of the light beam on the second reflecting cathetus surface 212 will be later. Then, the light beam enters the second reflecting part 240 and is reflected on the second hypotenuse surface 243 of the second reflecting part 240 to the image sensor 230, and the light beam exiting from the second reflecting part 240 is shifted in the +X direction at a distance of 2L that produces an effect to increase the focal length. Thus, the focal length of the lens device is increased. However, if the first reflecting part 210 is moved from the initial position to a second position in the −X direction at a distance of L, then the reflection of a light beam on the first reflecting cathetus surface 211 is earlier, and the reflection of the light beam on the second reflecting cathetus surface 212 is earlier. Then, the light beam enters the second reflecting part 240 and is reflected on the second hypotenuse surface 243 of the second reflecting part 240 to the image sensor 230, and the light beam exiting from the second reflecting part 240 is shifted in the −X direction at a distance of 2L that produces an effect to reduce the focal length. Thus, the focal length of the lens device 2200 is reduced. By repeatedly moving the first reflecting part 210 along the X axis perpendicular to the hypotenuse surface 213, the focal length can be adjusted.

In the fourth embodiment of the invention, the plane on which the image sensor 230 is disposed is parallel to the optical axis of the first lens module 220. The second reflecting part may be a right angle prism. Further, the second reflecting part may include a reflecting mirror. That is, the hypotenuse surface is a reflecting mirror.

Figure 14A:
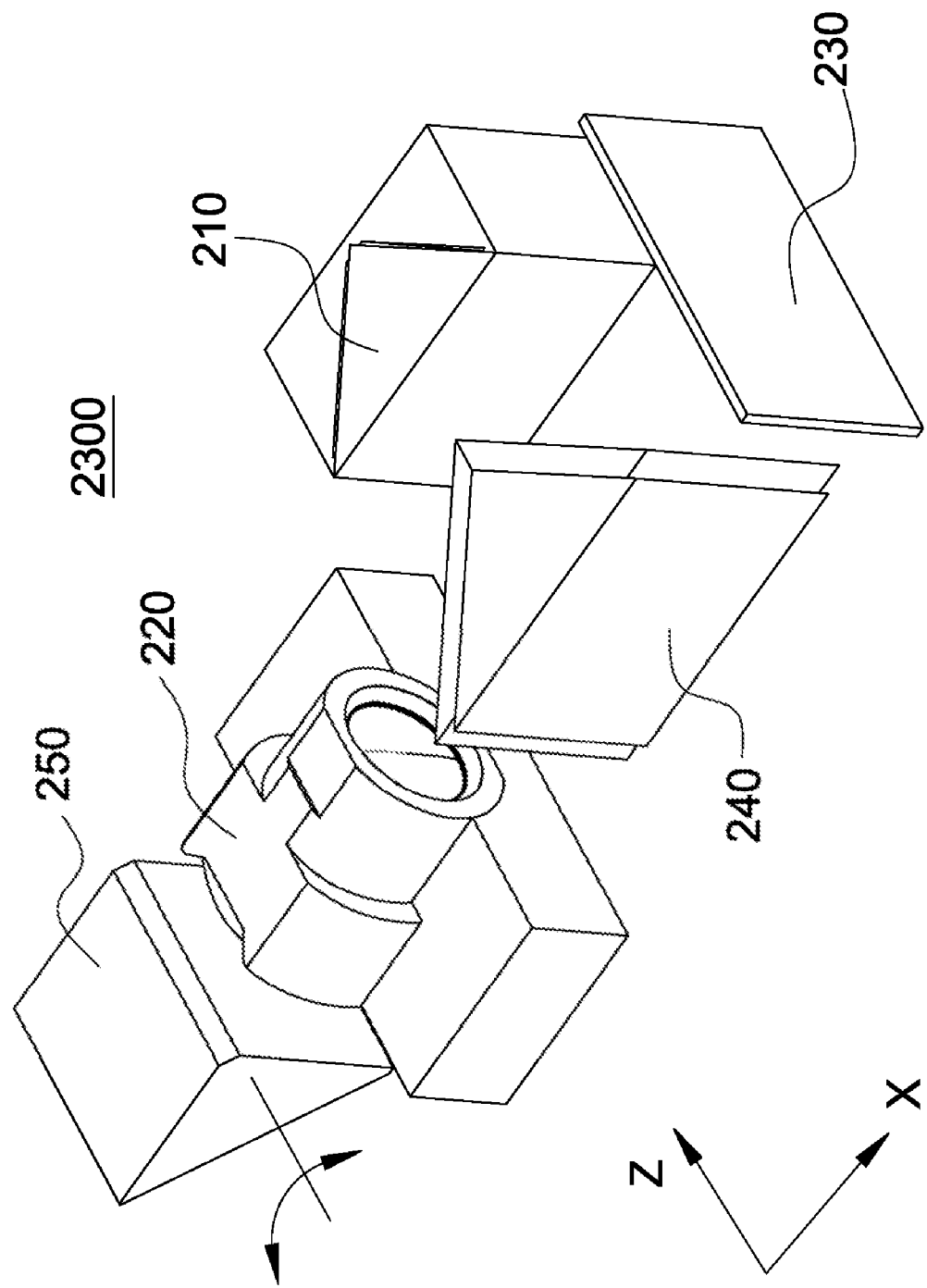
FIG. 14A is a schematic diagram showing a lens device in accordance with a fifth embodiment of the invention.
Figure 14B:
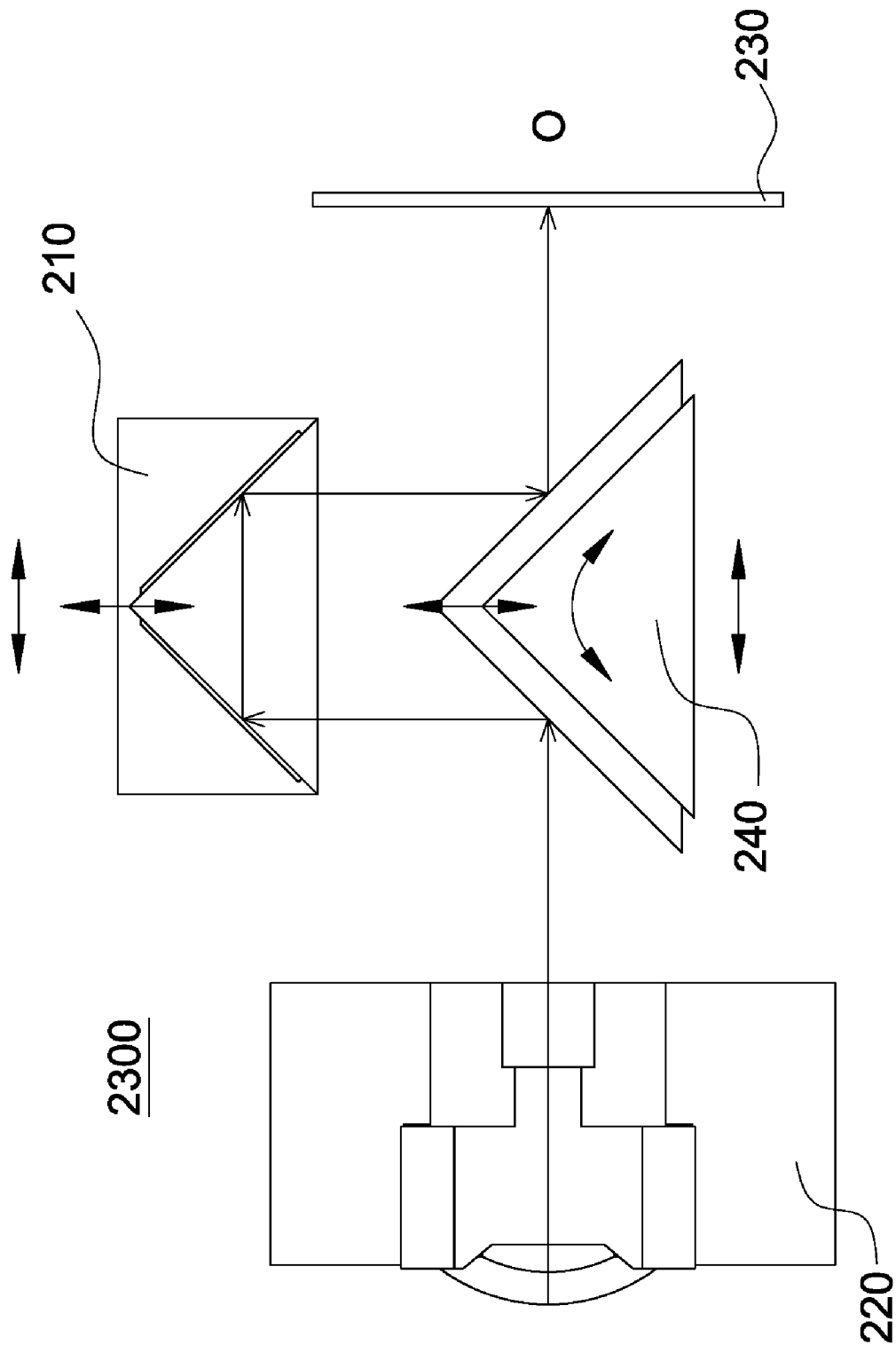
FIG. 14B depicts the optical path of the lens device of the fifth embodiment of the invention.

Referring to FIGS. 14A and 14B, a lens device 2300 in accordance with a fifth embodiment of the invention includes a third reflecting part 250, a first lens module 220, an image sensor 230, a second reflecting part 240 and a first reflecting part 210. In operation, a light beam is reflected by the third reflecting part 250 to the first lens module 220, passes through the first lens module 220, is reflected on the third reflecting cathetus surface 241 of the second reflecting part 240, enters the first reflecting part 210 through the first hypotenuse surface 213, is reflected on the first reflecting cathetus surface 211, is reflected on the second reflecting cathetus surface 212, leaves the first reflecting part 210 through the first hypotenuse surface 213, and is reflected on the fourth cathetus surface 242 of the second reflecting part 240 to form an image on the image sensor 230. In the fifth embodiment, the first reflecting cathetus surface 211 and the third reflecting cathetus surface 241 are parallel to each other, the second reflecting cathetus surface 212 and the fourth reflecting cathetus surface 242 are parallel to each other, and the first hypotenuse surface 213 and the second hypotenuse surface 243 are parallel to each other.

Figure 14C:
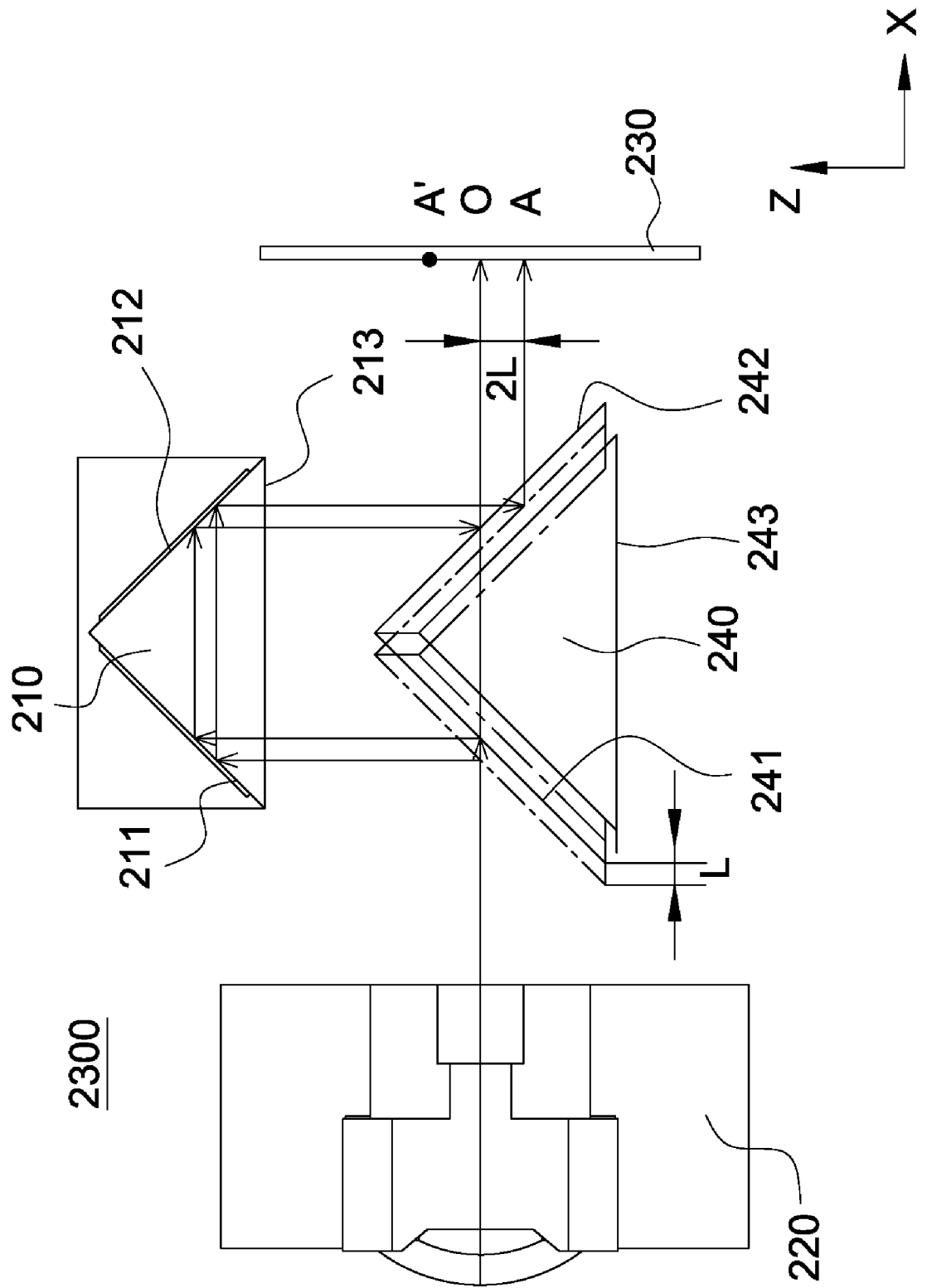
FIG. 14C depicts the optical path of the lens device of the fifth embodiment of the invention when the second reflecting part is moved along an X-axis.

Referring to FIG. 14C, the third reflecting cathetus surface 241, the fourth reflecting cathetus surface 242 and the second hypotenuse surface 243 are shown in solid lines when the second reflecting part 240 is in an initial position. The third reflecting cathetus surface 241, the fourth reflecting cathetus surface 242 and the second hypotenuse surface 243 are shown in broken lines when the second reflecting part 240 is moved leftwards (parallel to the second hypotenuse surface 243, in a −X direction) at a distance L to a first position. If the second reflecting part 240 is moved from the initial position to the first position in the −X direction at a distance of L, then the reflection of a light beam on the third reflecting cathetus surface 241 will be earlier. Then, the light beam enters the first reflecting part 210 through the first hypotenuse surface 213, is reflected on the first reflecting cathetus surface 211, is reflected on the second reflecting cathetus surface 212, and exits from the first hypotenuse surface 213 towards the fourth reflecting cathetus surface 242, and the reflection of the light beam on the fourth reflecting cathetus surface 242 becomes later. Thus, the light beam exiting from the second reflecting part 240 is shifted in the −Z direction at a distance of 2L. However, if the second reflecting part 240 is moved from the initial position to a second position in the +X direction at a distance of L, then the reflection of a light beam on the third reflecting cathetus surface 241 will be later. Then, the light beam enters the first reflecting part 210 through the first hypotenuse surface 213, is reflected on the first reflecting cathetus surface 211, is reflected on the second reflecting cathetus surface 212, and exits from the first hypotenuse surfaced 213 towards the fourth reflecting cathetus surface 242, and the reflection of the light beam on the fourth reflecting cathetus surface 242 becomes earlier. Thus, the light beam exiting from the second reflecting part 240 will be shifted in the +Z direction at a distance of 2L. By repeatedly moving the second reflecting part 240 along the X axis parallel to the second hypotenuse surface 243, the shaking (hand wobbling) can be compensated and the image blurring can be suppressed.

Figure 14D:
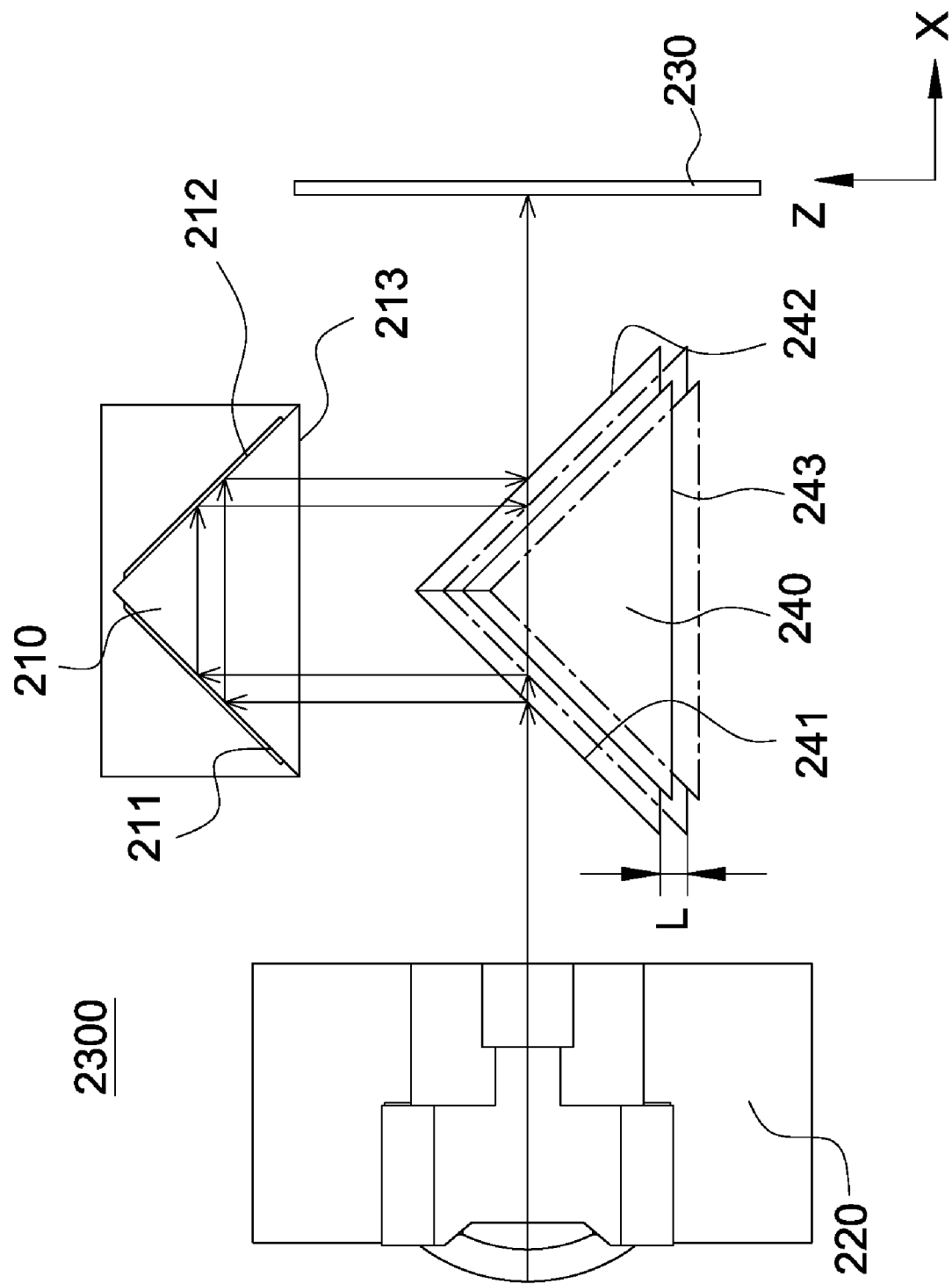
FIG. 14D depicts the optical path of the lens device of the fifth embodiment of the invention when the second reflecting part is moved along a Y-axis.

Referring to FIG. 14D, the third reflecting cathetus surface 241, the fourth reflecting cathetus surface 242 and the second hypotenuse surface 243 are shown in solid lines when the second reflecting part 240 is in an initial position. The third reflecting cathetus surface 241, the fourth reflecting cathetus surface 242 and the second hypotenuse surface 243 are shown in broken lines when the second reflecting part 240 is moved downwards (perpendicular to the second hypotenuse surface 243, in a −Z direction) at a distance L to a first position. If the first reflecting part 210 is moved from the initial position to the first position in the −Z direction at a distance of L, then the reflection of a light beam on the third reflecting cathetus surface 241 will be later. Then, the light beam enters the first reflecting part 210 through the first hypotenuse surface 213, is reflected on the first reflecting cathetus surface 211, is reflected on the second reflecting cathetus surface 212, and exits from the first hypotenuse surface 213 towards the fourth reflecting cathetus surface 242. Then, the reflection of the light beam on the fourth reflecting cathetus surface 242 becomes later. Thus, the light beam exiting from the second reflecting part 240 will be shifted in the −X direction at a distance of 2L (i.e. where the image is formed is changed at a distance of 2L in the −X direction) that produces an effect to reduce the focal length. Thus, the focal length of the lens device 2300 is decreased. However, if the second reflecting part 240 is moved upwards from the initial position to a second position in the +Z direction at a distance of L, then the reflection of a light beam on the third reflecting cathetus surface 241 will be earlier. Then, the light beam enters the first reflecting part 210 through the first hypotenuse surface 213, is reflected on the first reflecting cathetus surface 211, is reflected on the second reflecting cathetus surface 212, and exits from the first hypotenuse surface 213 towards the fourth reflecting cathetus surface 242, and the reflection of the light beam on the fourth reflecting cathetus surface 242 becomes earlier. Thus, the light beam exiting from the second reflecting part 240 will be shifted in the +X direction at a distance of 2L (i.e. where the image is formed is changed at a distance of 2L in the +X direction) that produces an effect to increase the focal length. Thus, the focal length of the lens device 2300 is increased. By repeatedly moving the second reflecting part 240 along the Z axis perpendicular to the second hypotenuse surface 243, the focal length can be adjusted.

Figure 14E:
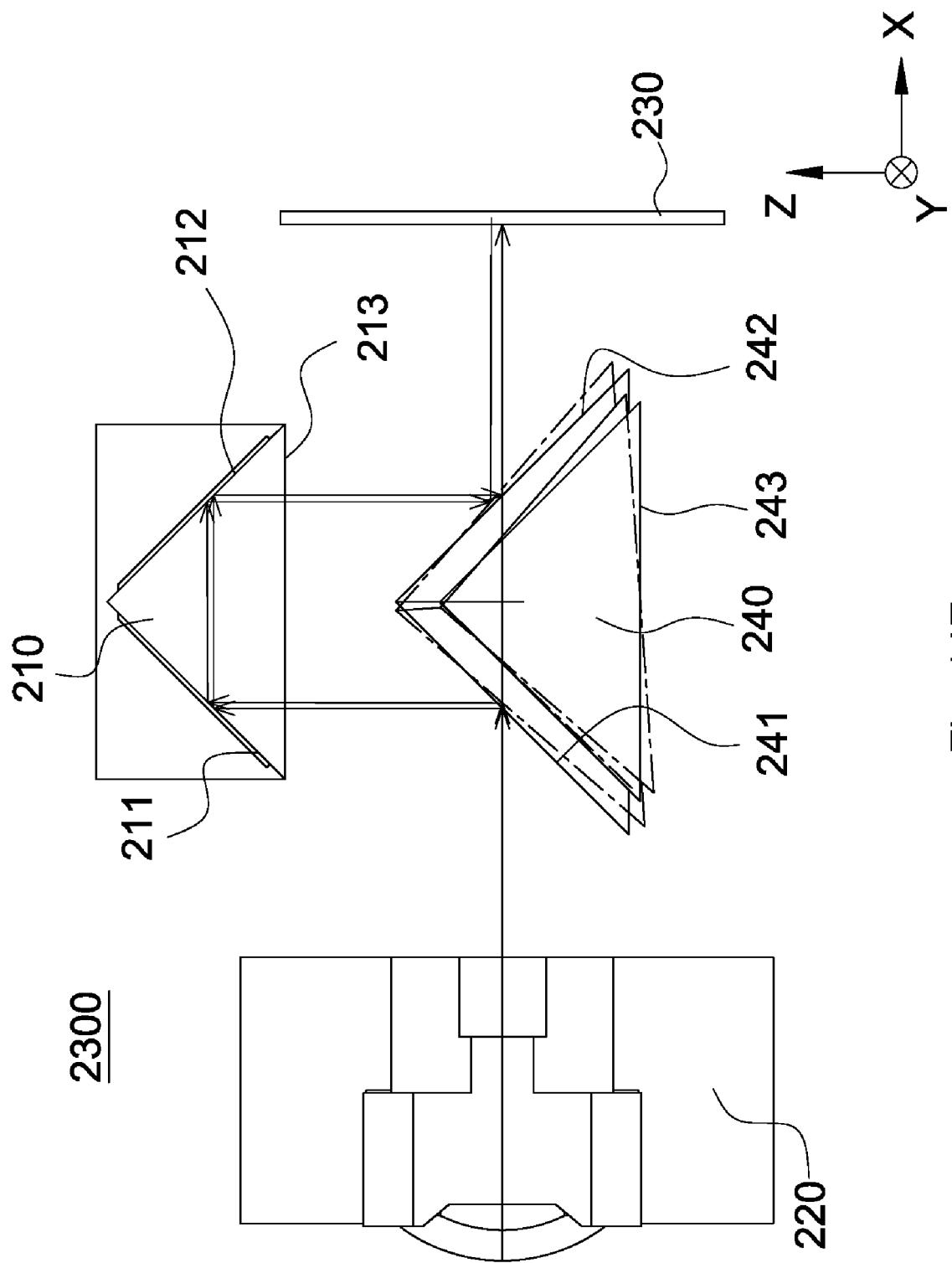
FIG. 14E depicts the optical path of the lens device of the fifth embodiment of the invention when the second reflecting part is rotated about a Z-axis.

Referring to FIG. 14E, the third reflecting cathetus surface 241, the fourth reflecting cathetus surface 242 and the second hypotenuse surface 243 are shown in solid lines when the second reflecting part 240 is in an initial position. The third reflecting cathetus surface 241, the fourth reflecting cathetus surface 242 and the second hypotenuse surface 243 are shown in broken lines when the second reflecting part 240 is rotated about the Y axis clockwise at an angle θ to a first position (the Y axis is parallel to the third reflecting cathetus surface 241, the fourth reflecting cathetus surface 242 and the second hypotenuse surface 243). If the second reflecting part 240 is rotated clockwise about the Y axis at an angle θ from the initial position to the first position, then the reflection of a light beam on the third reflecting cathetus surface 241 will be earlier. Then, the light beam enters the first reflecting part 210 through the first hypotenuse surface 213, is reflected on the first reflecting cathetus surface 211, is reflected on the second reflecting cathetus surface 212, and exits from the first hypotenuse surface 213 towards the fourth reflecting cathetus surface 242, and the reflection of the light beam on the fourth reflecting cathetus surface 242 becomes later. Thus, the light beam exiting from the second reflecting part 240 is shifted in the −Z direction at a predetermined distance. However, if the second reflecting part 240 is rotated about the Y axis counterclockwise at an angle θ from the initial position to a second position, then the reflection of the light beam on the third reflecting cathetus surface 241 will be later. Then, the light beam enters the first reflecting part 210 through the first hypotenuse surface 213, is reflected on the first reflecting cathetus surface 211, is reflected on the second reflecting cathetus surface 212, and exits from the first hypotenuse surfaced 213 towards the fourth reflecting cathetus surface 242, and the reflection of the light beam on the fourth reflecting cathetus surface 242 becomes earlier. Thus, the light beam exiting from the second reflecting part 240 will be shifted in the +Z direction at a predetermined distance. By repeatedly rotating the second reflecting part 240 about the Y axis (the Y axis is parallel to parallel to the third reflecting cathetus surface 241, the fourth reflecting cathetus surface 242 and the second hypotenuse surface 243), the shaking (hand wobbling) can be compensated and the image blurring can be suppressed.

Figure 14F:
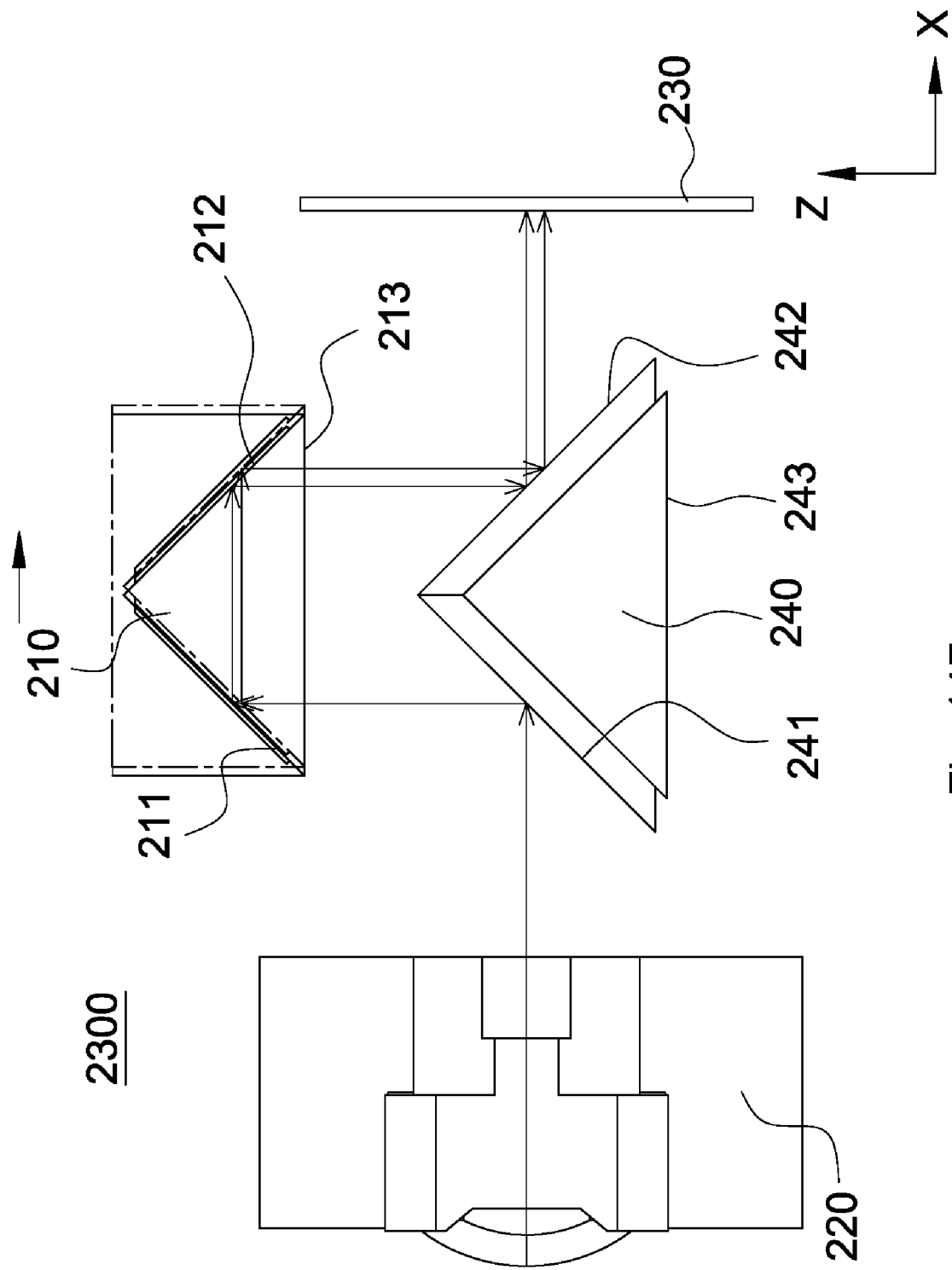
FIG. 14F depicts the optical path of the lens device of the fifth embodiment of the invention when the first reflecting part is moved along an X-axis.

Referring to FIG. 14F, the first reflecting cathetus surface 211, the second reflecting cathetus surface 212 and the first hypotenuse surface 213 are shown in solid lines when the first reflecting part 210 is in an initial position. The first reflecting cathetus surface 211, the second reflecting cathetus surface 212 and the first hypotenuse surface 213 are shown in broken lines when the first reflecting part 210 is moved rightwards (parallel to the first hypotenuse surface 213, in a +X direction) at a distance L to a first position, and the second reflecting part 240 is stationary. In operation, the light beam coming from the first lens module 220 is reflected on the third reflecting cathetus surface 241 of the second reflecting part 240 and enters the first reflecting part 210 through the first hypotenuse surface 213. If the first reflecting part 210 is rightwards moved from the initial position to the first position in the +X direction at a distance of L, then the reflection of the light beam on the first reflecting cathetus surface 241 will be earlier and the reflection of the light beam on the second reflecting cathetus surface 212 will be later. Then, the light beam leaves the first hypotenuse surface 213, propagates towards the fourth reflecting cathetus surface 242, is reflected on the fourth reflecting cathetus surface 242, and leaves the second reflecting part 240. The light beam exiting from the second reflecting part 240 will be shifted in the −Z direction at a distance of 2L. Similarly, in operation, the light beam coming from the first lens module 220 is reflected on the third reflecting cathetus surface 241 of the second reflecting part 240 and enters the first reflecting part 210 through the first hypotenuse surface 213. If the first reflecting part 210 is moved leftwards from the initial position to a second position in the −X direction at a distance of L, then the reflection of a light beam on the first reflecting cathetus surface 211 will be later and the reflection of the light beam on the second reflecting cathetus surface 212 will be earlier. Then, the light beam exits from the first hypotenuse surface 213, propagates towards the fourth reflecting cathetus surface 242, is reflected on the fourth reflecting cathetus surface 242, and leaves the second reflecting part 240. The light beam exiting from the second reflecting part 240 will be shifted in the +Z direction at a distance of 2L. By repeatedly moving the first reflecting part 210 along the X axis parallel to the first hypotenuse surface 213, the shaking (hand wobbling) can be compensated and the image blurring can be suppressed.

Figure 14G:
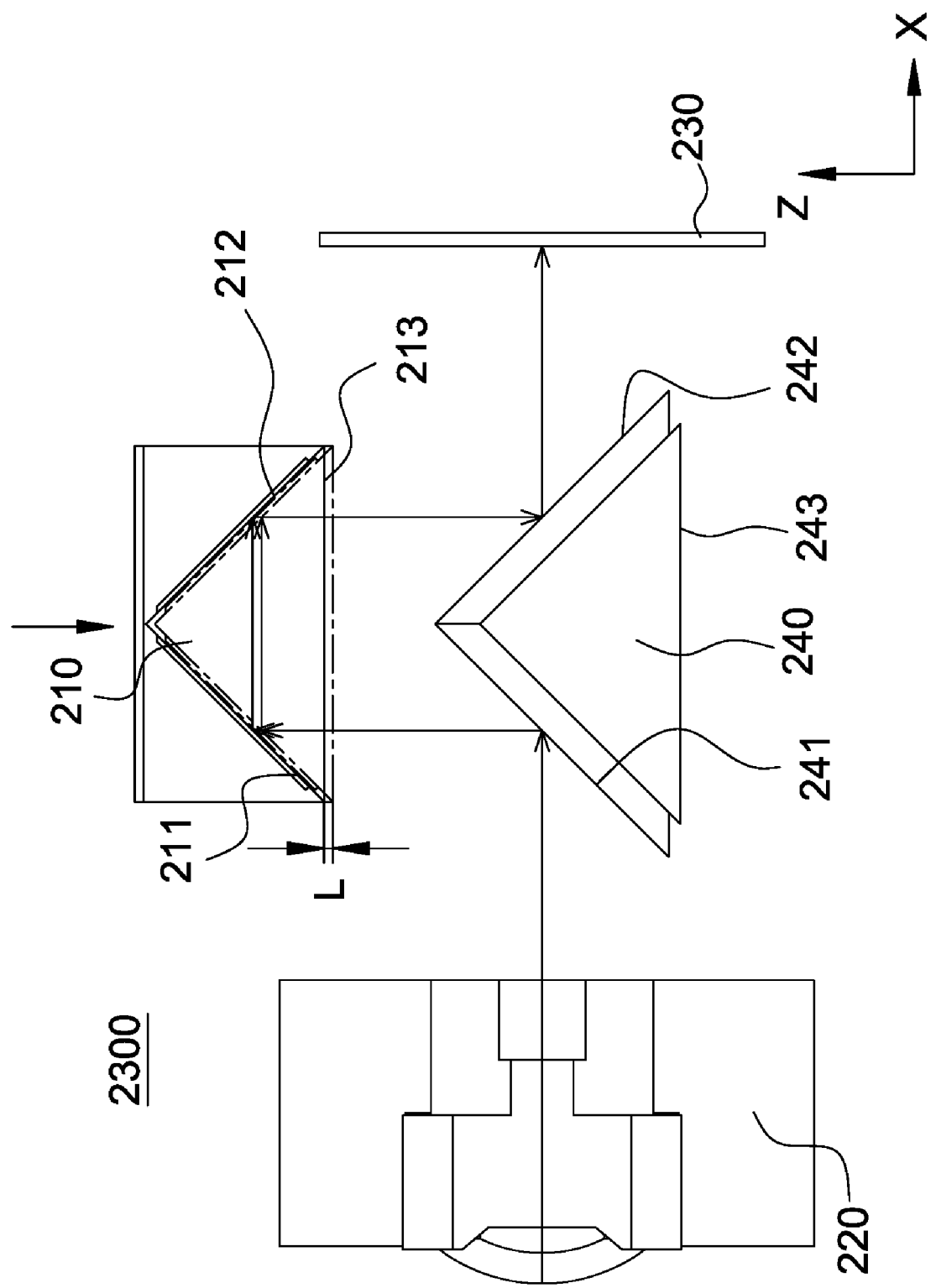
FIG. 14G depicts the optical path of the lens device of the fifth embodiment of the invention when the first reflecting part is moved along a Y-axis.

Referring to FIG. 14G, the first reflecting cathetus surface 211, the second reflecting cathetus surface 212 and the first hypotenuse surface 213 are shown in solid lines when the first reflecting part 240 is in an initial position. The first reflecting cathetus surface 211, the second reflecting cathetus surface 212 and the first hypotenuse surface 213 are shown in broken lines when the first reflecting part 210 is moved downwards (perpendicular to the first hypotenuse surface 213, in a −Z direction) at a distance L to a first position and the second reflecting part 240 is stationary. In operation, the light beam coming from the first lens module 220 is reflected on the third reflecting cathetus surface 241 of the second reflecting part 240 and enters the first reflecting part 210 through the first hypotenuse surface 213. If the first reflecting part 210 is moved downwards from the initial position to the first position in the −Z direction at a distance of L, then the reflection of a light beam on the first reflecting cathetus surface 211 will be earlier and the reflection of the light beam on the second reflecting cathetus surface 212 will be earlier. Then, the light beam exits from the first hypotenuse surface 213, propagates towards the fourth reflecting cathetus surface 242, is reflected on the fourth reflecting cathetus surface 242, and leaves the second reflecting part 240. The light beam exiting from the second reflecting part 240 will be shifted in the −X direction at a distance of 2L (i.e. where the image is formed is changed at a distance of 2L in the −X direction) that produces an effect to reduce the focal length. Thus, the focal length of the lens device 2300 is decreased. Similarly, in operation, the light beam coming from the first lens module 220 is reflected on the third reflecting cathetus surface 241 of the second reflecting part 240 and enters the first reflecting part 210 through the first hypotenuse surface 213. If the second reflecting part 240 is moved upwards from the initial position to a second position in the +Z direction at a distance of L, then the reflection of a light beam on the first reflecting cathetus surface 211 will be later, and the reflection of the light beam on the second reflecting cathetus surface 212 will be later. Then, the light beam exits from the first hypotenuse surface 213, propagates towards the fourth reflecting cathetus surface 242, is reflected on the fourth reflecting cathetus surface 242, and leaves the second reflecting part 240. The light beam exiting from the second reflecting part 240 will be shifted in the +X direction at a distance of 2L (i.e. where the image is formed is changed at a distance of 2L in the +X direction) that produces an effect to increase the focal length. Thus, the focal length of the lens device 2300 is increased. By repeatedly moving the first reflecting part 210 along the Z axis perpendicular to the first hypotenuse surface 213, the focal length can be adjusted.

From FIGS. 14C and 14F, it is concluded that the shaking (hand wobbling) can be compensated and the image blurring can be suppressed by using a relative motion between the first reflecting part 210 and the second reflecting part 240 in a direction parallel to the hypotenuse surface. From FIGS. 14D and 14G, it is concluded that the focal length can be adjusted by using a relative motion between the first reflecting part 210 and the second reflecting part 240 in a direction perpendicular to the hypotenuse surface.

In the third, fourth and fifth embodiments of the invention, the first reflecting part may be a right angle prism. Further, the first reflecting part may include two reflecting mirrors. That is, the first and second reflecting cathetus surfaces are reflecting mirrors.

In the fifth embodiment of the invention, the second reflecting part may be a right angle prism. Further, the second reflecting part may include two reflecting mirrors. That is, the third and fourth reflecting cathetus surfaces are reflecting mirrors. The plane on which the image sensor 230 is disposed is perpendicular to the optical axis of the first lens module 220, and the first lens module 220 covers the plane when observed along the optical axis.

In the fourth embodiment of the invention, the plane on which the image sensor 230 is disposed is parallel to the optical axis of the first lens module 220. In the fifth embodiment of the invention, the plane on which the image sensor 230 is disposed is perpendicular to the optical axis of the first lens module 220. It is understood that in some other embodiments the plane and the optical axis are neither parallel nor perpendicular to each other. Instead, the plane and the optical axis are oriented to have an angle therebetween and the angle is not equal to 90°.

Figure 15:
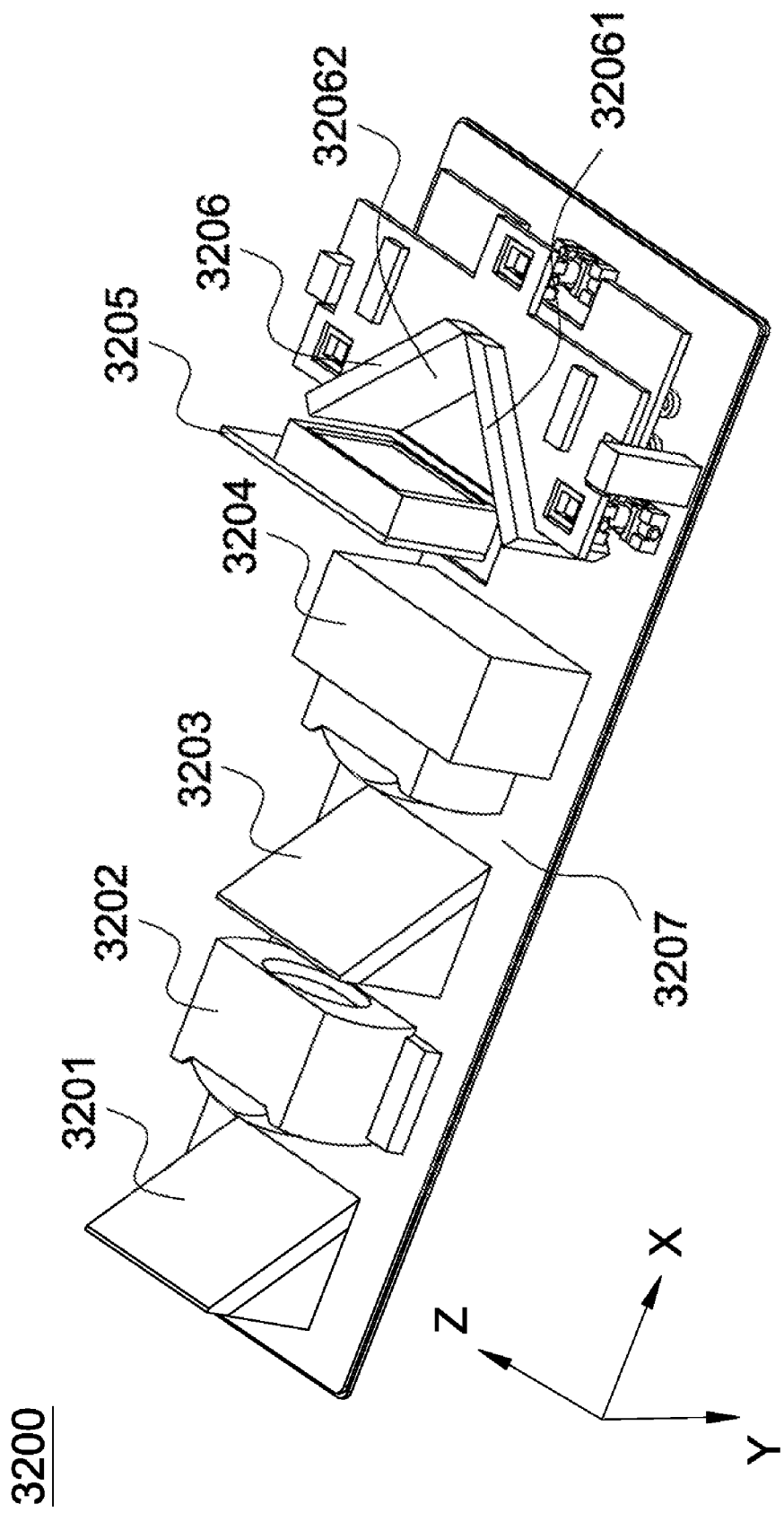
FIG. 15 is a schematic diagram showing the structure of a periscope lens in accordance with a sixth embodiment of the invention, wherein the second light path turning module is in a first position.
Figure 16:
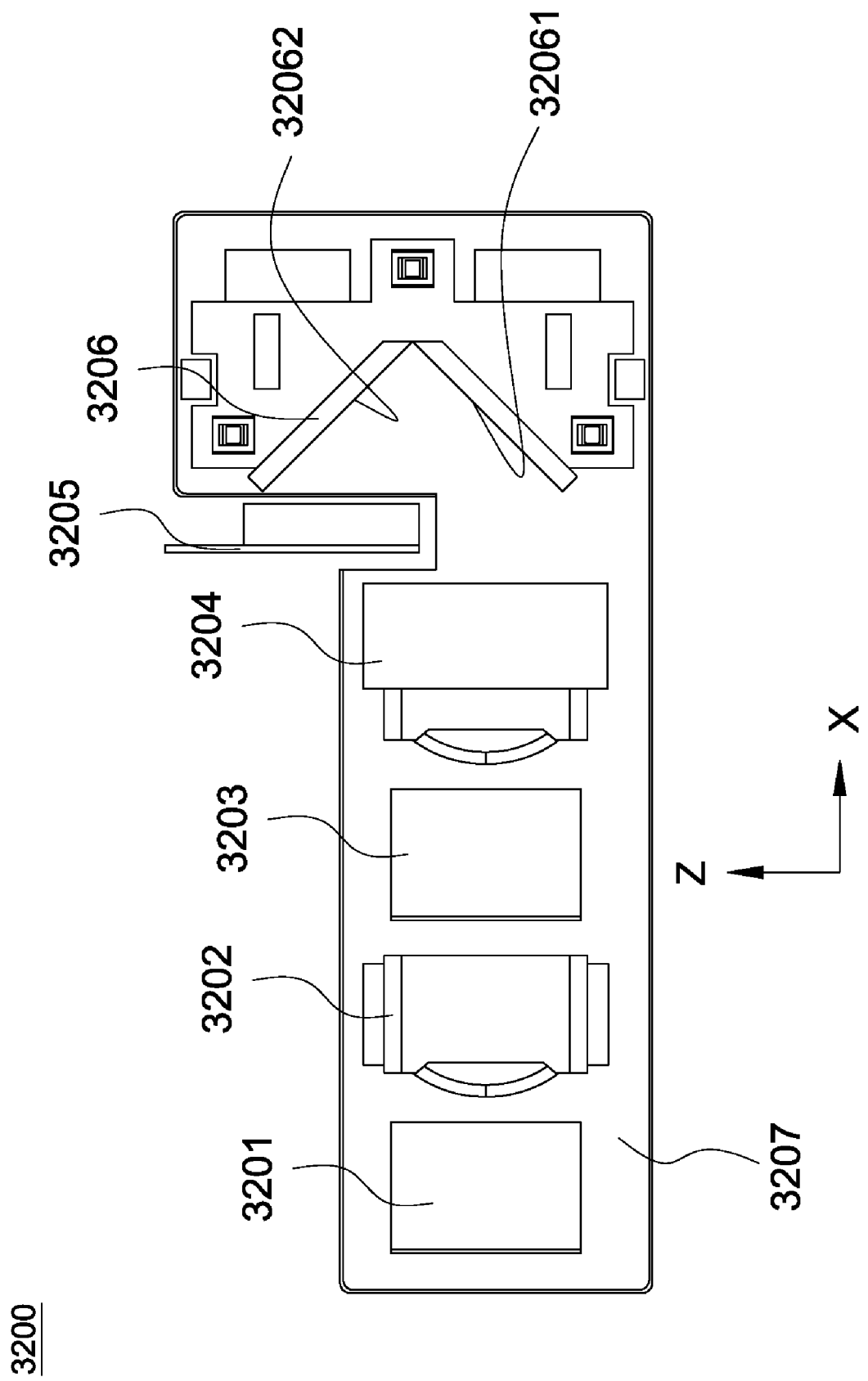
FIG. 16 is a top view of the periscope lens of FIG. 15.
Figure 17:
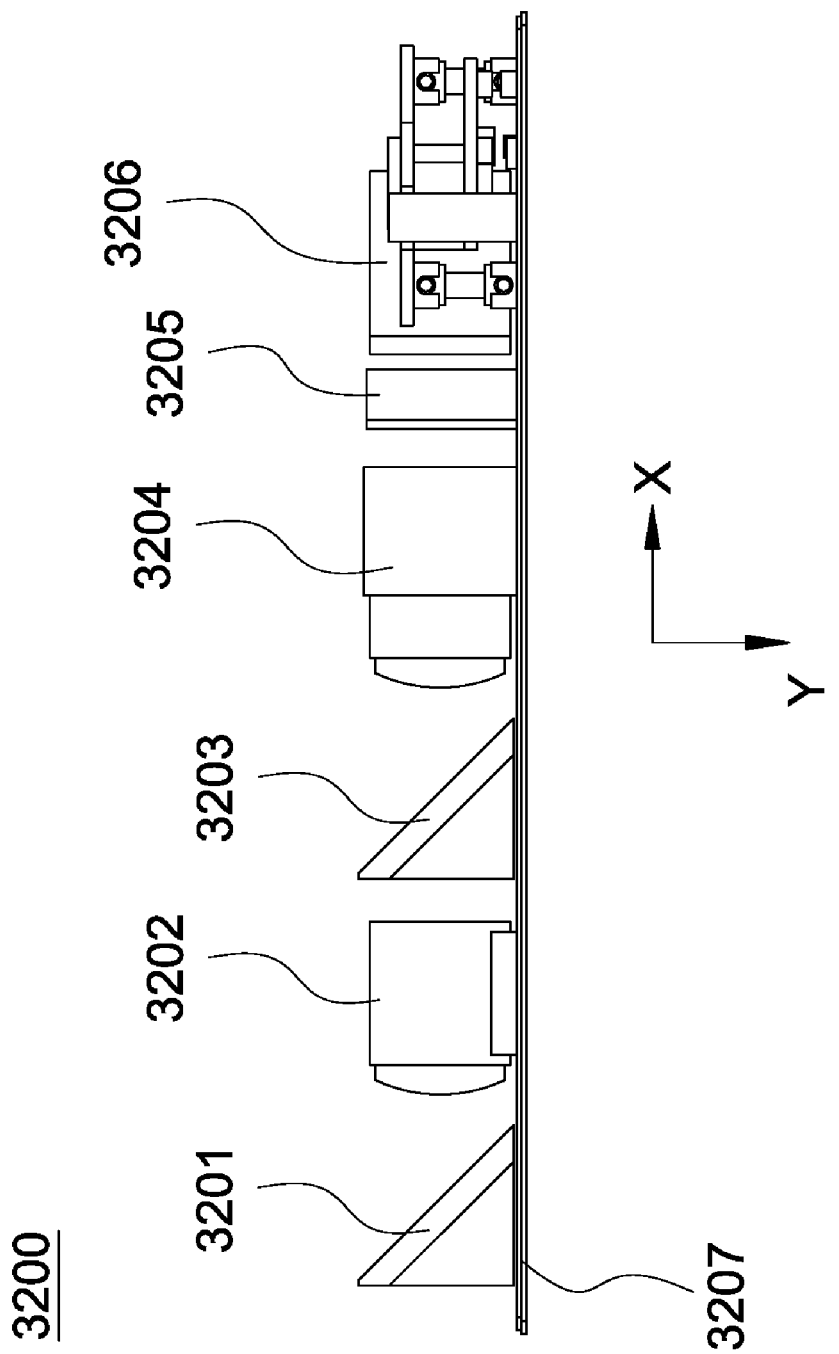
FIG. 17 is a side view of the periscope lens of FIG. 15.

FIG. 15 is a schematic diagram showing the structure of a lens device 3200 in accordance with the sixth embodiment of the invention. FIG. 16 is a top view of the lens device 3200 of FIG. 15. FIG. 17 is a side view of the lens module 3200 of FIG. 15. As shown in FIGS. 15-17, the lens device 3200 includes a base 3207, a third light path turning module 3201 for changing propagation of a light beam from a second direction Y to a first direction X by a reflection, a second lens module 3202 including one or more lenses and having a second optical axis extended in the first direction X, a second light path turning module 3203 for changing propagation of a light beam from the second direction Y to the first direction X by a reflection, and a first lens module 3204 including one or more lenses and having a first optical axis extended in the first direction X. The third light path turning module 3201, the second lens module 3202, the second light path turning module 3203 and the first lens module 3204 are sequentially disposed on the base 3207. The first optical axis and the second optical axis coincide. The lens device 3200 further includes an image sensor 3205 for an image formed thereon. The first optical axis of the first lens module 3204 is perpendicular to the plane on which the image sensor 3205 is disposed, and the first lens module 3204 partly covers the plane when observed in the first direction X.

The third light path turning module 3201 is configured to reflect a light beam coming from the second direction Y to the second lens module 3203 wherein the first direction X is perpendicular to the second direction Y. The position of the second light path turning module 3203 is switchable between a first position and a second position. That is, the second light path turning module 3203 is movable between the first position and the second position. The second light path turning module 3203 staying in the first position is able to block the light beam coming from the second lens module 3202. However, the second light path turning module 3203 staying in the second position is away from the first optical axis and the second optical axis, allowing the light beam coming from the second lens module 3202 to reach the first lens module 3204. The third light path turning module 3201 may be a reflecting prism or a reflecting mirror. Similarly, the second light path turning module 3203 may be a reflecting prism or a reflecting mirror.

In a selectable embodiment, the image sensor 3205 is disposed at the first optical axis. The light beam exiting from the first lens module 3204 is directly projected onto the image sensor 3205 to form an image.

In another selectable embodiment, to achieve the optical zoom in high magnification, miniaturization of module, and reduction of the length of the lens device 3200, the image sensor 3205 is not disposed at the first optical axis while a first light path turning module is disposed in the light path and between the first lens module 3204 and the image sensor 3205. The first light path turning module includes a first reflecting surface configured to reflect the light beam coming from the second lens module 3202 or the first lens module 3204 to the image sensor 3205 for forming an image.

In yet another selectable embodiment, to achieve the optical zoom in high magnification, miniaturization of module, and reduction of the length of the lens device 3200, the image sensor 3205 is not disposed at the first optical axis while a first light path turning module 3206 is disposed in the light path and between the first lens module 3204 and the image sensor 3205. The first light path turning module 3206 includes a first reflecting part 32061 and a second reflecting part 32062 arranged perpendicular to each other. The first reflecting part 32061 is disposed at an angle of 45° from the second optical axis. The light beam coming from the second lens module 3202 or the first lens module 3204 is reflected to the second reflecting part 32062 by the first reflecting part 32061 and then reflected to the image sensor 3205 by the second reflecting part 32062.

In the embodiments, the first reflecting part 32061 and the second reflecting part 32062 may be unified to move together. The lens device 3200 further includes a first directional driving unit (not shown) for driving the first light path turning module 3206 to move in the first direction X, and a third directional driving unit (not shown) for driving the first light path turning module 3206 to move in the third direction Z. The third direction Z is perpendicular to the first direction X and the second direction Y. A movement of the first light path turning module 3206 in the first direction X is able to change the length of the path followed by the light beam for the lens device 3200 thereby performing an auto focusing operation. A movement of the first light path turning module 3206 in the third direction Z is able to change the position on the image sensor 3205 of the lens device 3200 where an image is formed thereby performing an image stabilization operation (the length of the path followed by the light beam is also changed). In another embodiment of the invention, the lens device 3200 does not include the third directional driving unit but the first directional driving unit for only driving the first light path turning module 3206 to move in the first direction X. Alternatively, the lens device 3200 does not includes the first directional driving unit but the third directional driving unit for only driving the first light path turning module 3206 to move in the third direction Z.

In another embodiment of the invention, the first reflecting part 32061 and the second reflecting part 32062 are independent from each other. The lens device 3200 further includes a first reflecting surface driving unit (not shown) for driving the first reflecting part 32061 to move in the third direction Z, and a second reflecting surface driving unit (not shown) for driving the second reflecting part 32062 to move in the third direction Z. The third direction Z is perpendicular to the first direction X and the second direction Y. By means of movement of the first reflecting part 32061 and the second reflecting part 32062 in the third direction Z in accordance with the distance therebetween, the auto focusing and/or the image stabilization can performed.

Figure 18:
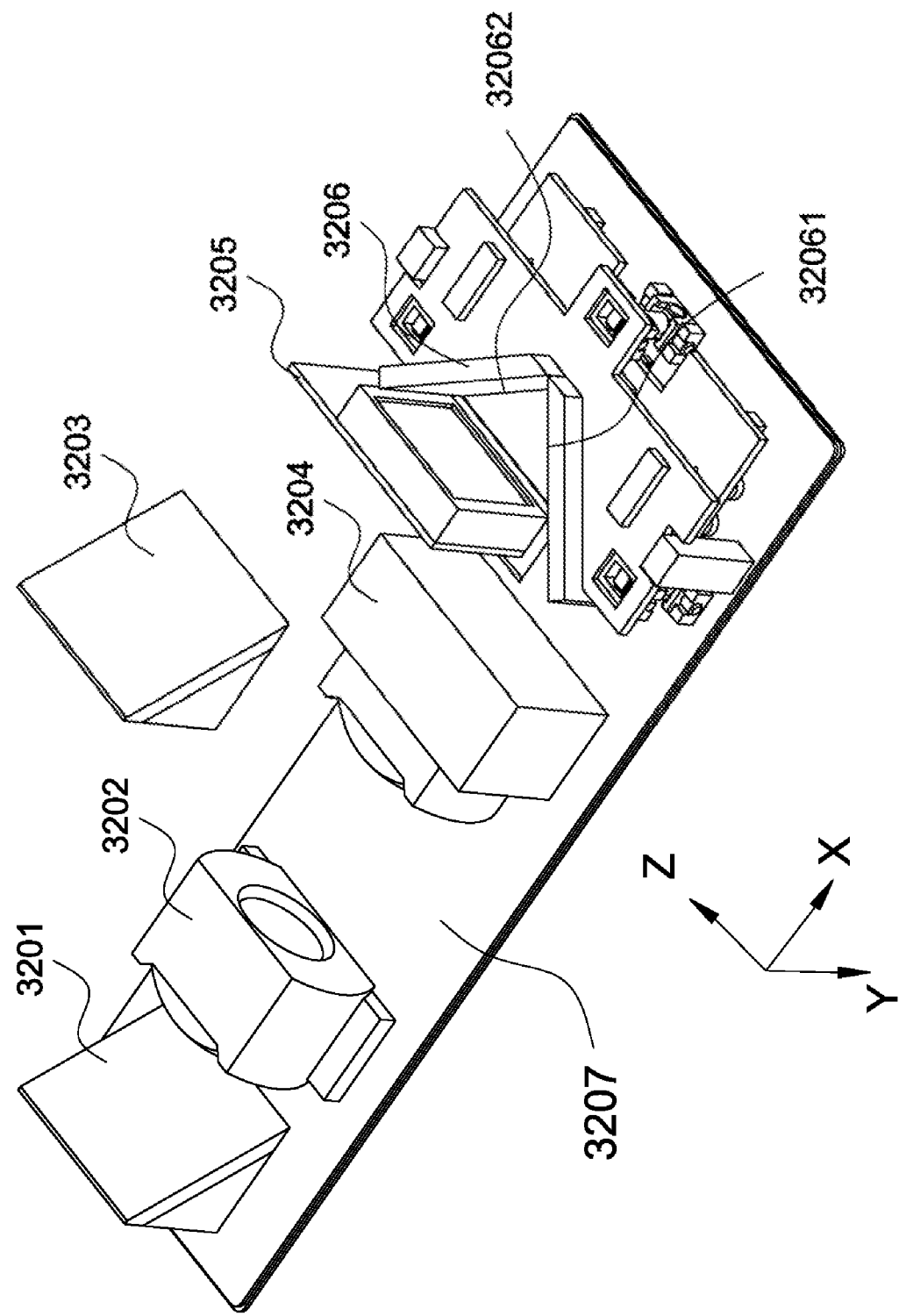
FIG. 18 is a schematic diagram showing the structure of the periscope lens of the invention wherein the second light path turning module is in a second position.
Figure 19:
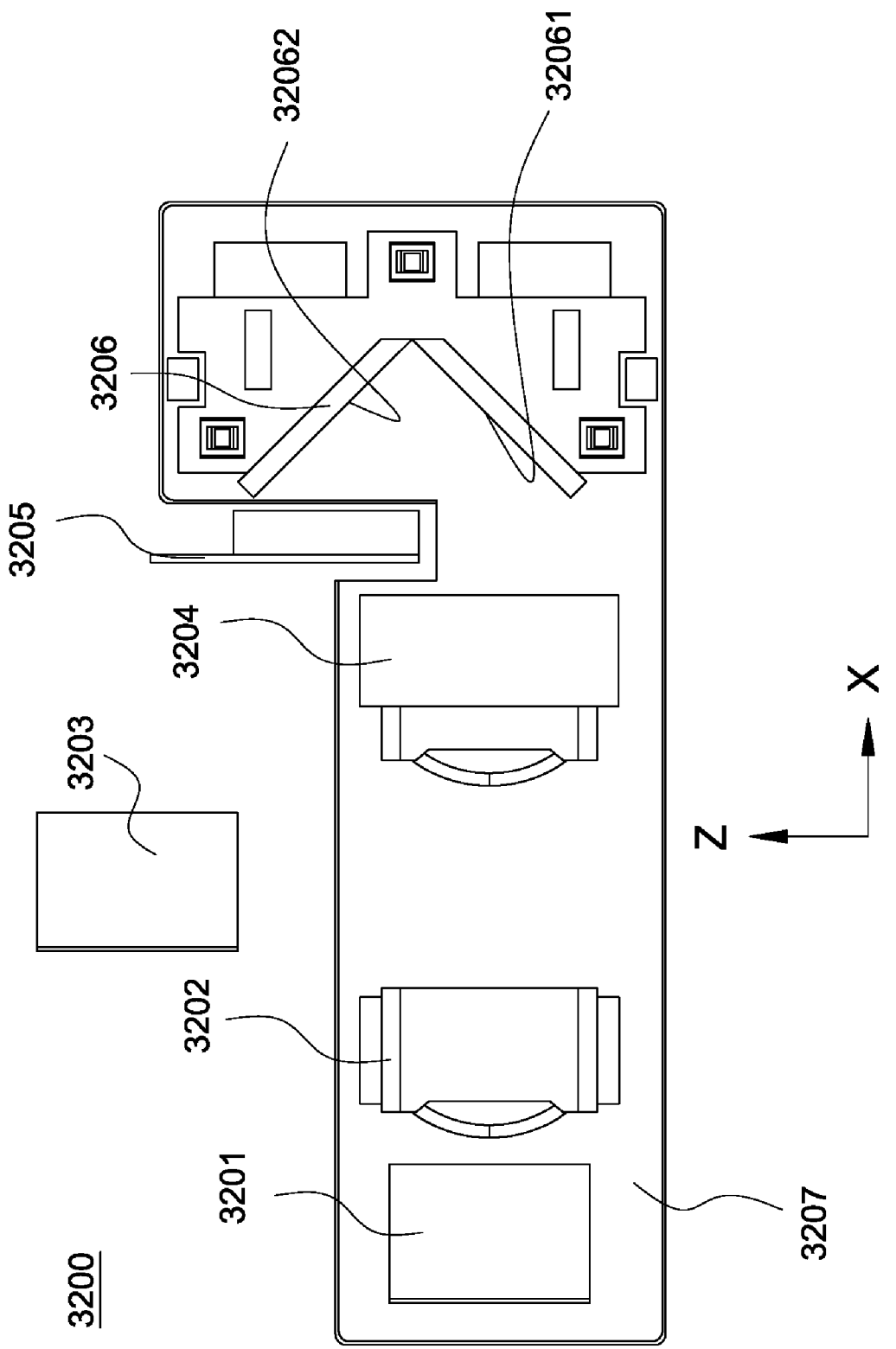
FIG. 19 is a top view of the periscope lens of FIG. 18.
Figure 20:
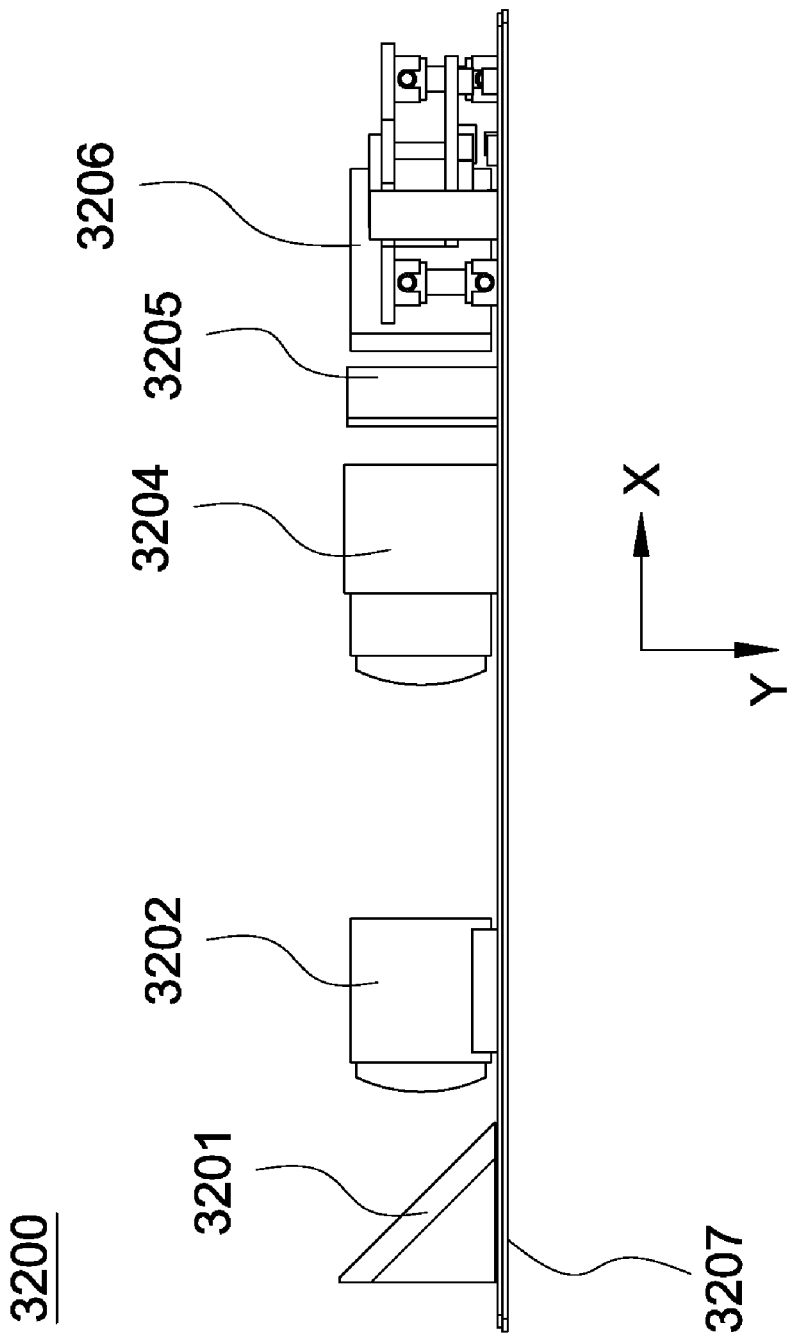
FIG. 20 is a side view of the periscope lens of FIG. 18.

FIG. 18 is a schematic diagram showing the structure of the lens device 3200 of the invention wherein the second light path turning module 3203 is in a second position. FIG. 19 is a top view of the lens device 3200 of FIG. 18. FIG. 20 is a side view of the lens device 3200 of FIG. 18. As shown in FIGS. 15-20, when the second light path turning module 3203 is in a first position, a light beam coming from the second direction Y enters the third light path turning module 3201, is reflected to the second lens module 3202, exits from the second lens module 3202, and is blocked by the second light path turning module 3203 in the first position. Also, another light beam coming from the second direction Y enters the second light path turning module 3203, is reflected to the first lens module 3204, exits from the first lens module 3204, and is reflected to the image sensor by the first light path turning module 3206 to form an image. Under such circumstance, the magnification of the lens device 3200 is determined by the first lens module 3204.

When the second light path turning module 3203 is in a second position, a light beam coming from the second direction Y enters the third light path turning module 3201, is reflected to the second lens module 3202, exits from the second lens module 3202, propagates without being blocked by the second light path turning module 3203 in the second position, passes through the first lens module 3204, and is reflected to the image sensor by the first light path turning module 3206 to form an image. Under such circumstance, the magnification of the lens device 3200 is determined by the second lens module 3202 and the first lens module 3204.

Accordingly, the magnification of the lens device 3200 can be changed by means of movement of the second light path turning module 3203 between the first position and the second position.

The movement of the second light path turning module 3203 between the first position and the second position can be performed by the following structure: The second light path turning module 3203 is provided with a slidable mechanism, while the base 3207 is provided with a guiding mechanism. Alternatively, the second light path turning module 3203 is provided with a guiding mechanism, while the base 3207 is provided with a slidable mechanism. The slidable mechanism may be a slide or a roller. The guiding mechanism may be a guide groove cooperating with the slide or roller. The lens device 300 further includes a driving unit for driving the second light path turning module 3203 to move to the second position or back to the first position in the third direction Z. The driving unit may includes a coil and a magnet, wherein the coil and the magnet are respectively disposed on the second light path turning module 3203 and the base 3207, or the coil and the magnet are respectively disposed on the base 3207 and the second light path turning module 3203.

Figure 21:
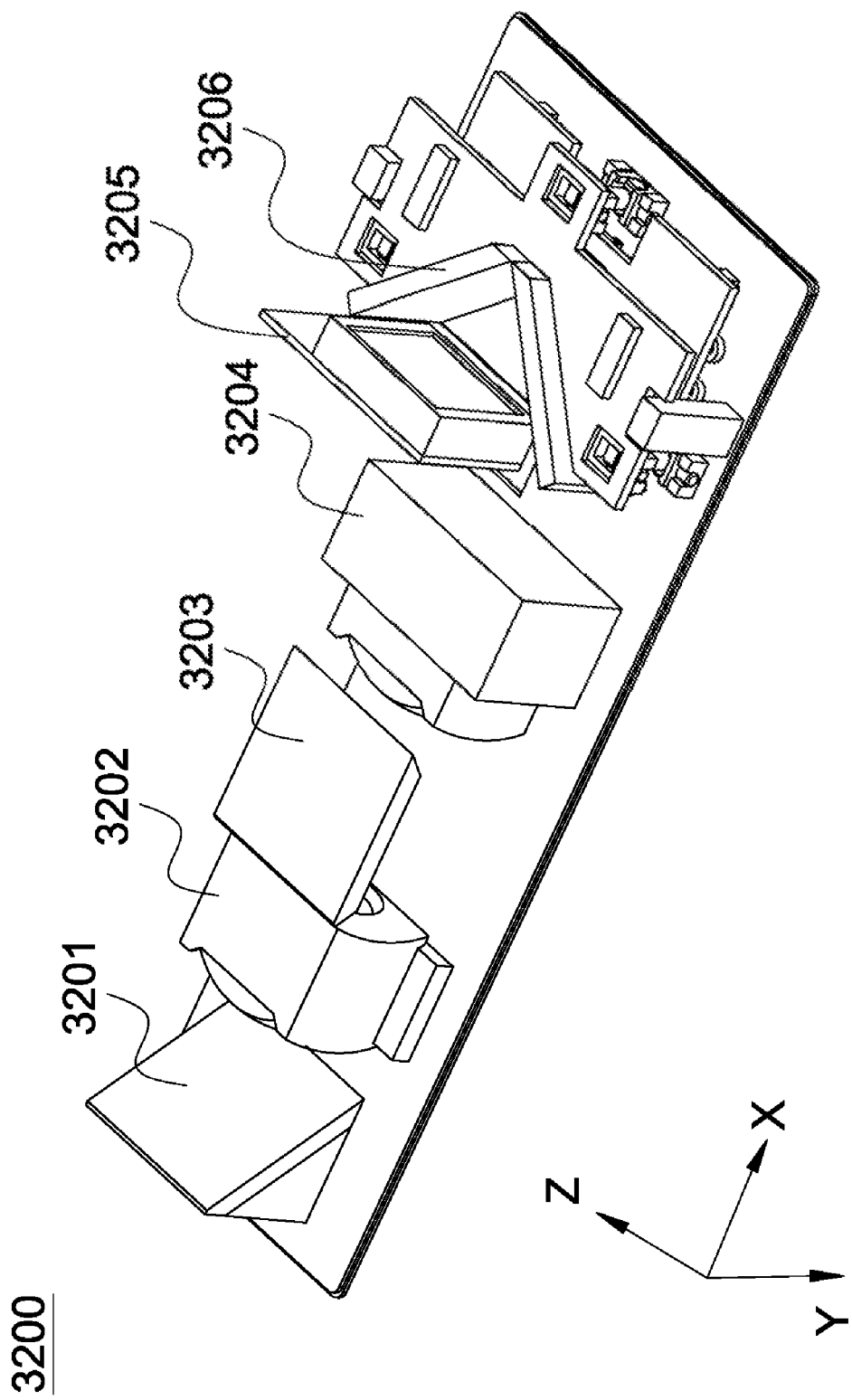
FIG. 21 is a schematic diagram showing a periscope lens in accordance with a seventh embodiment of the invention, wherein the second light path turning module is in the second position.
Figure 22:
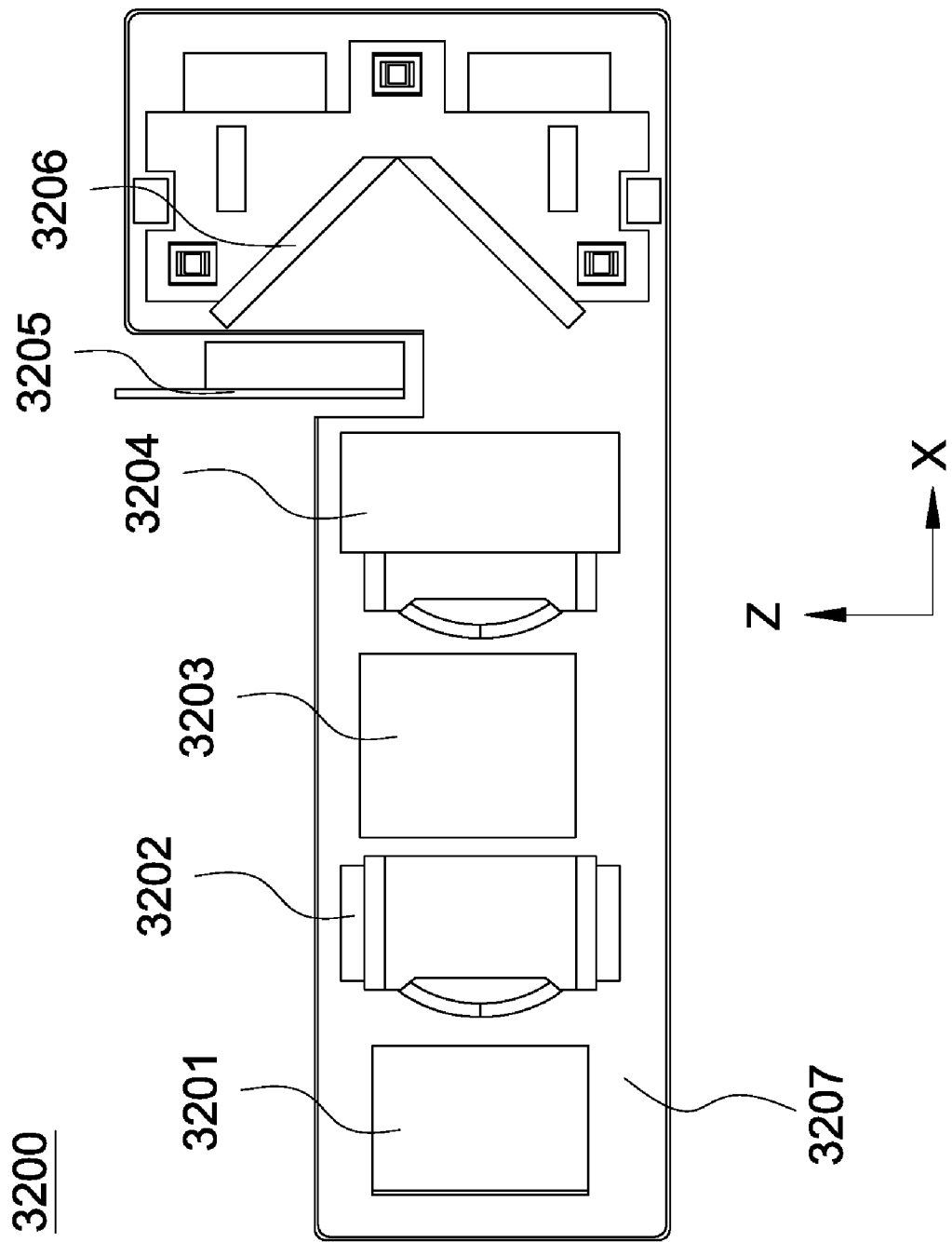
FIG. 22 is atop view of the periscope lens of FIG. 21.

FIG. 21 is a schematic diagram showing a lens device 3200 in accordance with a seventh embodiment of the invention, wherein the second light path turning module 3202 is in the second position. FIG. 22 is a top view of the lens device 3200 of FIG. 21. FIG. 23 is a side view of the lens device 3200 of FIG. 21. The descriptions of elements of the seventh embodiment identical to or similar with those of the sixth embodiment are omitted. The seventh embodiment differs from the sixth embodiment in that the second light path turning module 3203 is not moved but rotated to the second position or back to the first position.

Specifically, in the seventh embodiment, the second light path turning module 3203 is (preferably) a reflecting mirror rotatable about the upper side thereof. The rotational axis is parallel the third direction Z so that the reflecting mirror can be switched to be in the first position or the second position. In the second position, the second light path turning module 3203 is parallel to a first optical axis and is disposed above the first optical axis. The lens device 3200 further includes a driving unit for driving the second light path turning module 3203 to rotate about the rotational axis to the second position or back to the first position.

From the above descriptions, it is understood that the lens device of the invention is able to switch magnifications and to achieve the optical zoom in high magnification and miniaturization of module.

Figure 24:
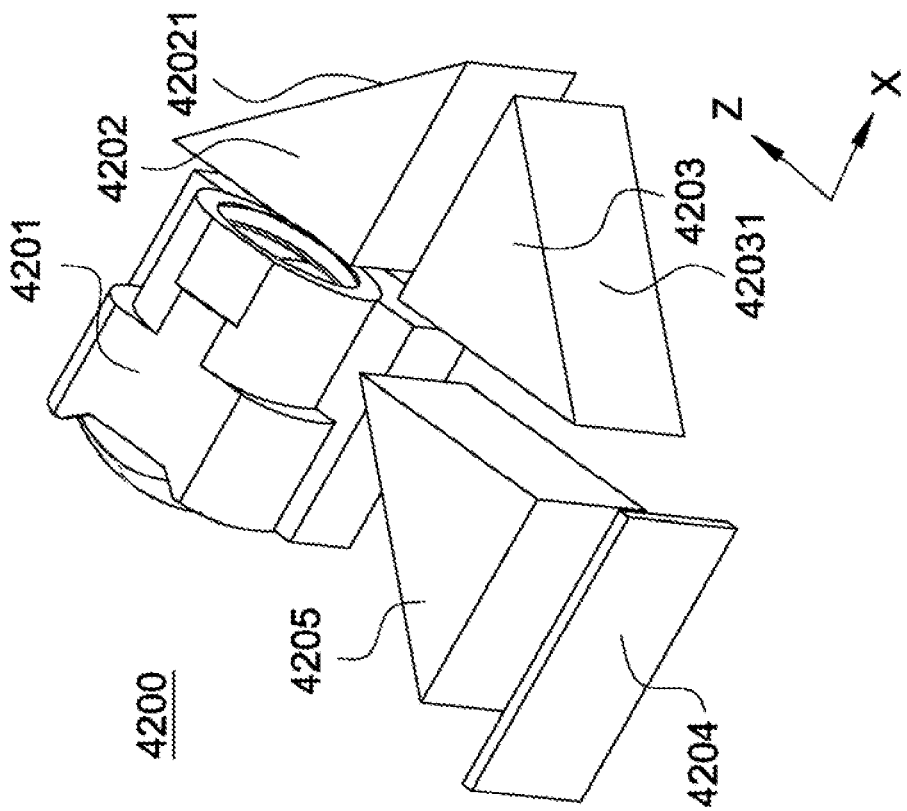
FIG. 24 is a schematic diagram showing the structure of the primary elements of a lens device in accordance with an eighth embodiment of the invention.

FIG. 24 is a schematic diagram showing the structure of the primary elements of a lens device 4200 in accordance with an eighth embodiment of the invention. As shown, the lens device 4200 includes a first lens module 4201 having an optical axis extended in the first direction X, a first reflecting part 4202 receiving the light beam form the first lens module 4201 and reflecting the light beam, a second reflecting part 4203 reflecting the light beam from the first reflecting part 4202 and being disposed opposite to the first reflecting part 4202 in the third direction Z, an image sensor 4204, and a third reflecting part 4205 reflecting the light beam from the second reflecting part 4203 to the image sensor 4204. The first reflecting part 4202, the second reflecting part 4203 and the third reflecting part 4205 are disposed between the first lens module 4201 and the image sensor 4204 to form a first light part turning module.

The first reflecting part 4202 has a first reflecting surface 42021. The second reflecting part 4203 has a second reflecting surface 42031. The first reflecting surface 42021 is at 450 from the first direction X. The first reflecting surface 42021 and the second reflecting surface 42031 are perpendicular to each other. Further, the first reflecting surface 42021 and the second reflecting surface 42031 are disposed opposite to each other in the third direction Z. The third reflecting part 4205 has a third reflecting surface 42051. The third reflecting surface 42051 is disposed opposite to the second reflecting surface 42031 in the first direction X. Preferably, the third reflecting surface 42051 is parallel to the second reflecting surface 42031 and, however, the invention is not limited thereto. It is understood that the third reflecting part can be omitted and the image sensor 4204 can be disposed opposite to the second reflecting part 4203 so that the light beam reflected by the second reflecting part 4203 directly reaches the image sensor 4204 without passing through the third reflecting part 4205. In the invention, the term "opposite to" does not necessarily mean "parallel to"

but "arranged in such way that the light beam passing through one element can reach another element".

In the invention, the first reflecting part 4202, the second reflecting part 4203 and the third reflecting part 4205 may be reflecting prisms or reflecting mirrors.

Figure 25:
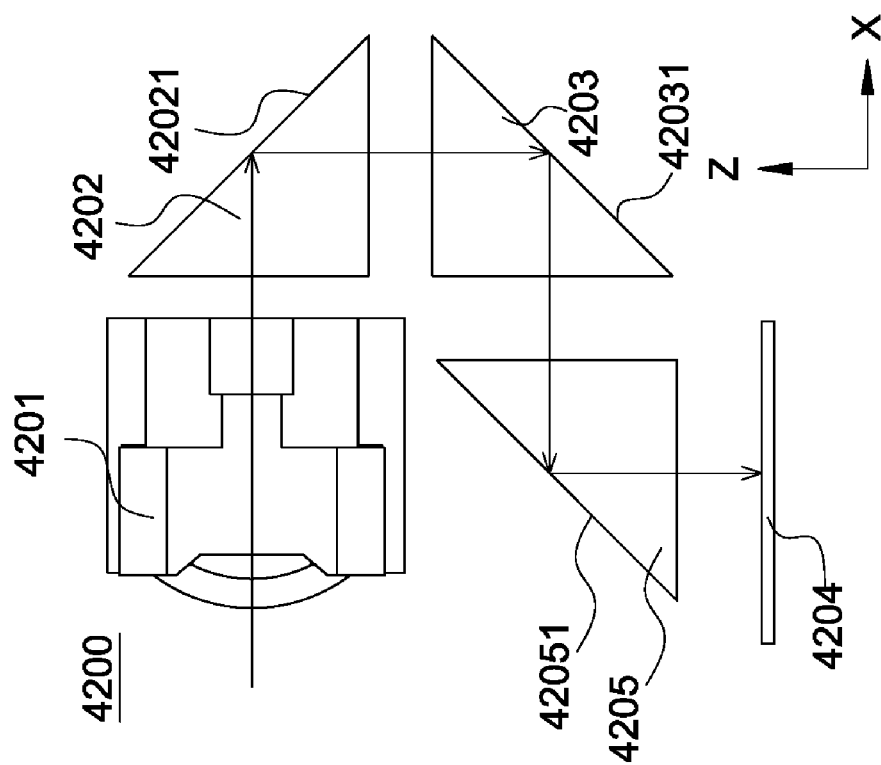
FIG. 25 is a schematic diagram showing the light path of the lens device of the eighth embodiment of the invention.

FIG. 25 is a schematic diagram showing the light path of the lens device 4200 of the eighth embodiment of the invention. As shown, the light beam propagates in the first direction X, enters the first lens module 4201, exits from the first lens module 4201, reaches the first reflecting surface 42021, is reflected on the first reflecting surface 42021, reaches the second reflecting surface 42031, is reflected on the second reflecting surface 42031, reaches the third reflecting surface 42051, is reflected on the third reflecting surface 42051, and reaches the image sensor 4204 to form an image.

Figure 26:
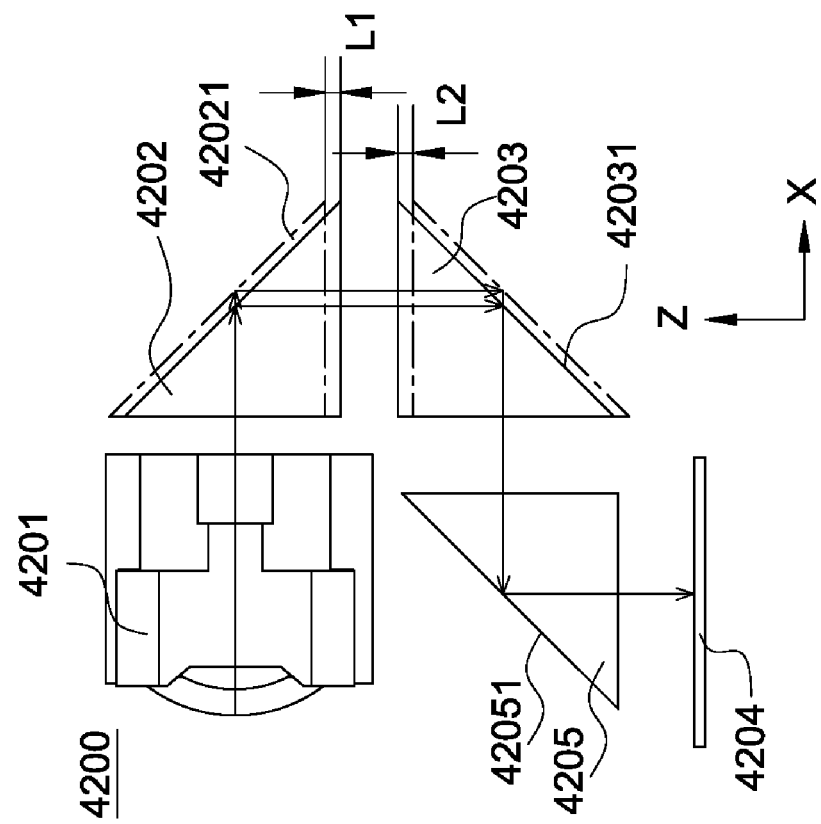
FIG. 26 is a schematic diagram showing the light path of the lens device of the eighth embodiment of the invention wherein the first reflecting part and the second reflecting part are moved in opposite directions including the third direction and the opposite direction thereof.

FIG. 26 is a schematic diagram showing the light path of the lens device 4200 of the eighth embodiment of the invention, in which the first reflecting part 4202 and the second reflecting part 4203 are moved in opposite directions (i.e. the third direction Z and the opposite direction thereof). In FIG. 26, the initial positions of the first reflecting part 4202 and the second reflecting part 4203 are shown in solid lines, while the positions of the first reflecting part 4202 and the second reflecting part 4203 after movement are shown in broken lines. The first reflecting part 4202 is moved a distance L1 in the third direction Z and the second reflecting part 4203 is moved a distance L2 in a direction opposite to the third direction Z so that the first reflecting part 4202 and the second reflecting part 4203 are away from each other. Thus, the length of the path followed by the light beam is increased by $^{\Delta}S=L1+L2$ to perform the auto focusing operation of the lens device 4200, wherein L1 and L2 are positive numbers.

However, if the first reflecting part 4202 is moved a distance L1 in the third direction Z and the second reflecting part 4203 is moved a distance L2 in a direction opposite to the third direction Z so that the first reflecting part 4202 and the second reflecting part 4203 are closer to each other, then the length of the path followed by the light beam will be reduced by $^{\Delta}S=L1+L2$ to perform the auto focusing operation of the lens device 4200.

If L1=L2, then the light beam reflected by the second reflecting part 4203 will propagate along the same optical path as the previous optical path (i.e. the optical path before the first reflecting part 4202 and the second reflecting part 4203 are moved). Therefore, the image-forming position on the image sensor 4204 is unchanged and the lens device 4200 merely performs the auto focusing operation. If L1≠L2, then the light beam reflected by the second reflecting part 4203 will propagate along an optical path different from the optical path before the first reflecting part 4202 and the second reflecting part 4203 are moved. Therefore, the image-forming position on the image sensor 4204 is shifted at a distance S=|L1−L2|.

Specifically, in this embodiment, the first reflecting part 4202 and the second reflecting part 4203 can be moved in opposite directions (the third direction Z and the opposite direction thereof) and away from each other. If the distance L1 of movement of the first reflecting part 4202 in the third direction Z is greater than the distance L2 of movement of the second reflecting part 4203 in a direction opposite to the third direction Z, then the image-forming position on the image sensor 4204 will be shifted at a distance S=|L1−L2| in the first direction X. However, if the distance L1 of movement of the first reflecting part 4202 in the third direction Z is less than the distance L2 of movement of the second reflecting part 4203 in a direction opposite to the third direction Z, then the image-forming position on the image sensor 4204 will be shifted at a distance S=|L1−L2| in the direction opposite to the first direction X. Alternatively, the first reflecting part 4202 and the second reflecting part 4203 can be moved in opposite directions (the third direction Z and the opposite direction thereof) and closer to each other. If the distance L1 of movement of the first reflecting part 4202 in the third direction Z is greater than the distance L2 of movement of the second reflecting part 4203 in a direction opposite to the third direction Z, then the image-forming position on the image sensor 4204 will be shifted at a distance S=|L1−L2| in the direction opposite to the first direction X. However, if the distance L1 of movement of the first reflecting part 4202 in the third direction Z is less than the distance L2 of movement of the second reflecting part 4203 in the direction opposite to the third direction Z, then the image-forming position on the image sensor 4204 will be shifted at a distance S=|L1−L2| in the first direction X.

By above arrangement, the lens device 4200 is able to perform auto focusing operation and compensation for hand wobbling.

Figure 27:
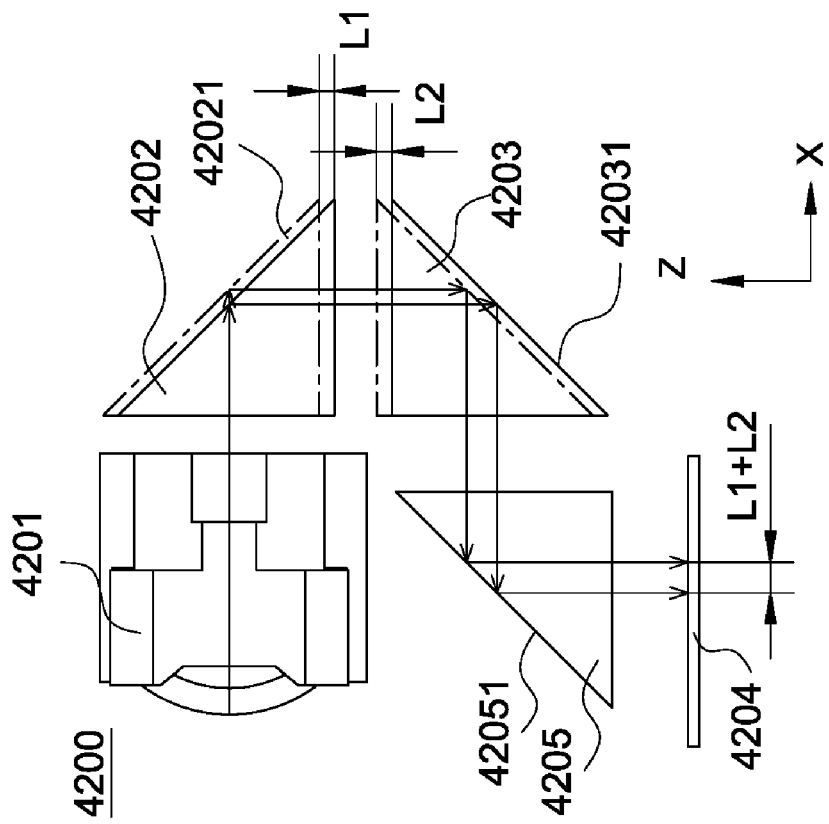
FIG. 27 is a schematic diagram showing the light path of the lens device of the eighth embodiment of the invention wherein the first reflecting part and the second reflecting part are moved in the same direction including the third direction or the opposite direction thereof.

FIG. 27 is a schematic diagram showing the light path of the lens device 4200 of the eighth embodiment of the invention, in which the first reflecting part 4202 and the second reflecting part 4203 are moved in same direction (i.e. the third direction Z or a direction opposite to the third direction Z). In FIG. 27, the initial positions of the first reflecting part 4202 and the second reflecting part 4203 are shown in solid lines, while the positions of the first reflecting part 4202 and the second reflecting part 4203 after movement are shown in broken lines. The first reflecting part 4202 is moved a distance L1 in the third direction Z and the second reflecting part 4203 is moved a distance L2 also in the third direction Z so that the image forming position on the image sensor 4204 is shifted at a distance S=L1+L2 to perform a compensation for hand wobbling, wherein L1 and L2 are positive numbers.

In FIG. 27, if both of the first reflecting part 4202 and the second reflecting part 4203 are moved in the third direction Z, then the image forming position on the image sensor 4204 will be shifted in the first direction X. However, if both of the first reflecting part 4202 and the second reflecting part 4203 are moved in a direction opposite to the third direction Z, then the image forming position on the image sensor 4204 will be shifted in the direction opposite to the first direction X.

If L1=L2, then the image forming position on the image sensor 4204 will be shifted at a distance S=L1+L2=2L1=2L2 and the length of path followed by the light beam will be unchanged. If L1≠L2, then the image-forming position on the image sensor 4204 will be shifted at a distance S=L1+L2 and the length of path followed by the light beam will be also changed in a difference $^{\Delta}S=|L1−L2|$.

Specifically, the first reflecting part 4202 and the second reflecting part 4203 can be respectively moved distances L1 and L2 in the third direction Z. If L1>L2, then the length of path followed by the light beam will be increased in a difference $^{\Delta}S=|L1−L2|$. However, if L1<L2, then the length of path followed by the light beam will be reduced in a difference $^{\Delta}S=|L1−L2|$. Alternatively, the first reflecting part 4202 and the second reflecting part 4203 can be respectively moved distance L1 and L2 in a direction opposite to the third direction Z. If L1>L2, then the length of path followed by the light beam will be reduced in a difference $^{\Delta}S=|L1−L2|$. However, if L1<L2, then the length of path followed by the light beam will be increased in a difference $^{\Delta}S=|L1−L2|$.

By above arrangement, the lens device 4200 is able to perform compensation for hand wobbling and auto focusing operation.

Figure 29:
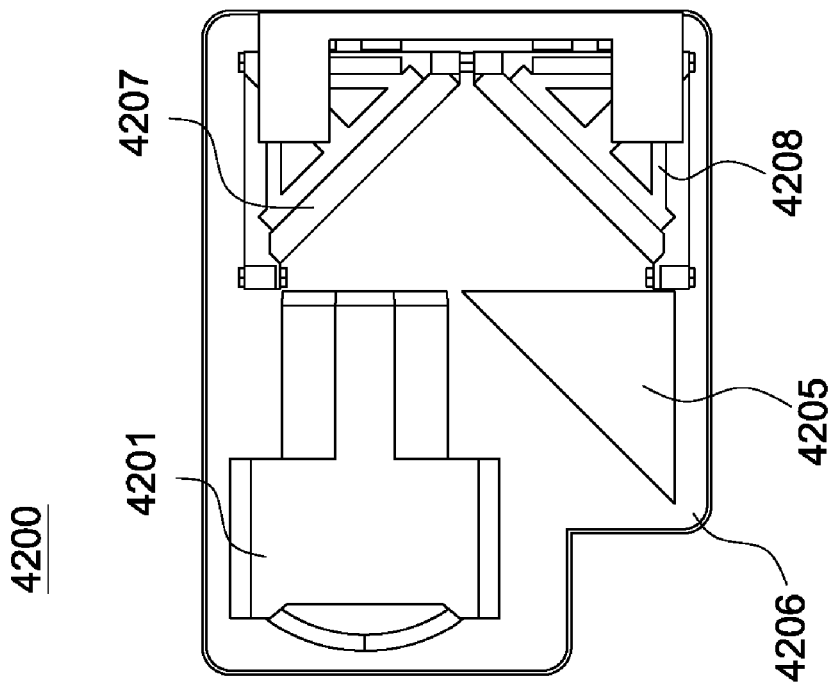
FIG. 29 is a top view of the elements of the lens device of FIG. 25.
Figure 28:
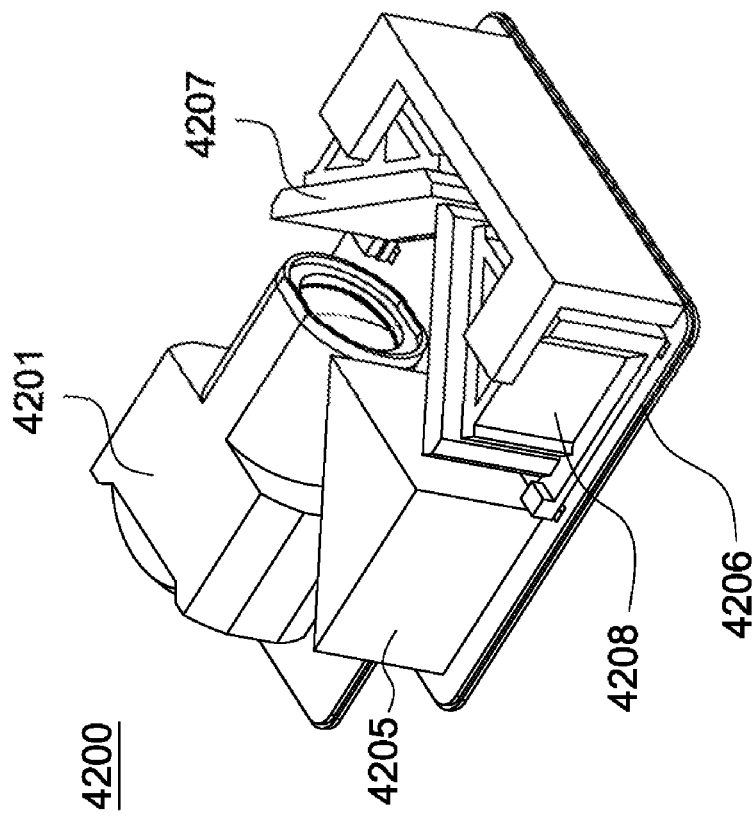
FIG. 28 is a schematic diagram showing another structure of the primary elements of a lens device in accordance with the eighth embodiment of the invention.
Figure 30:
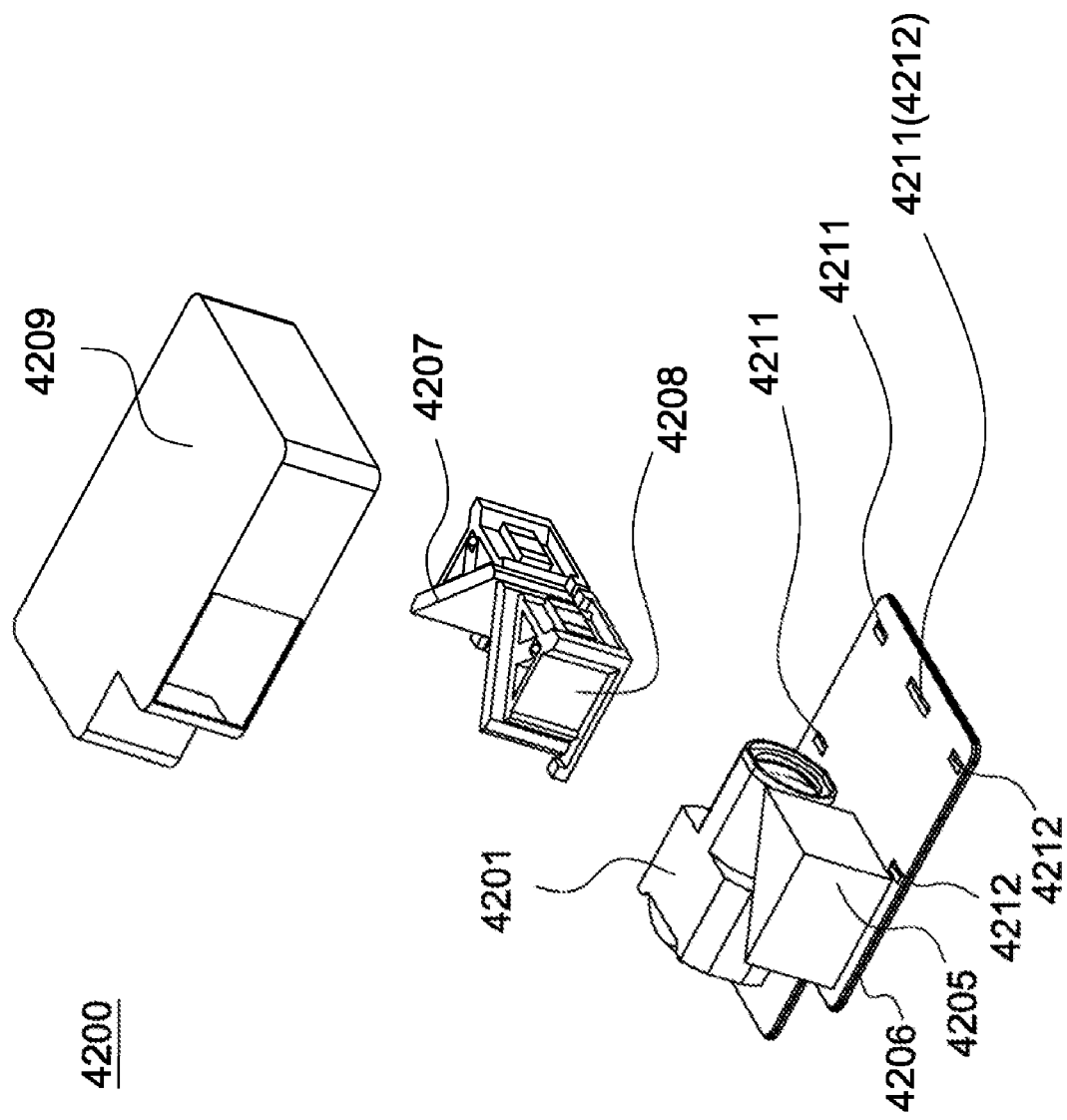
FIG. 30 is an exploded diagram of the elements of the lens device of FIG. 25.
Figure 31:
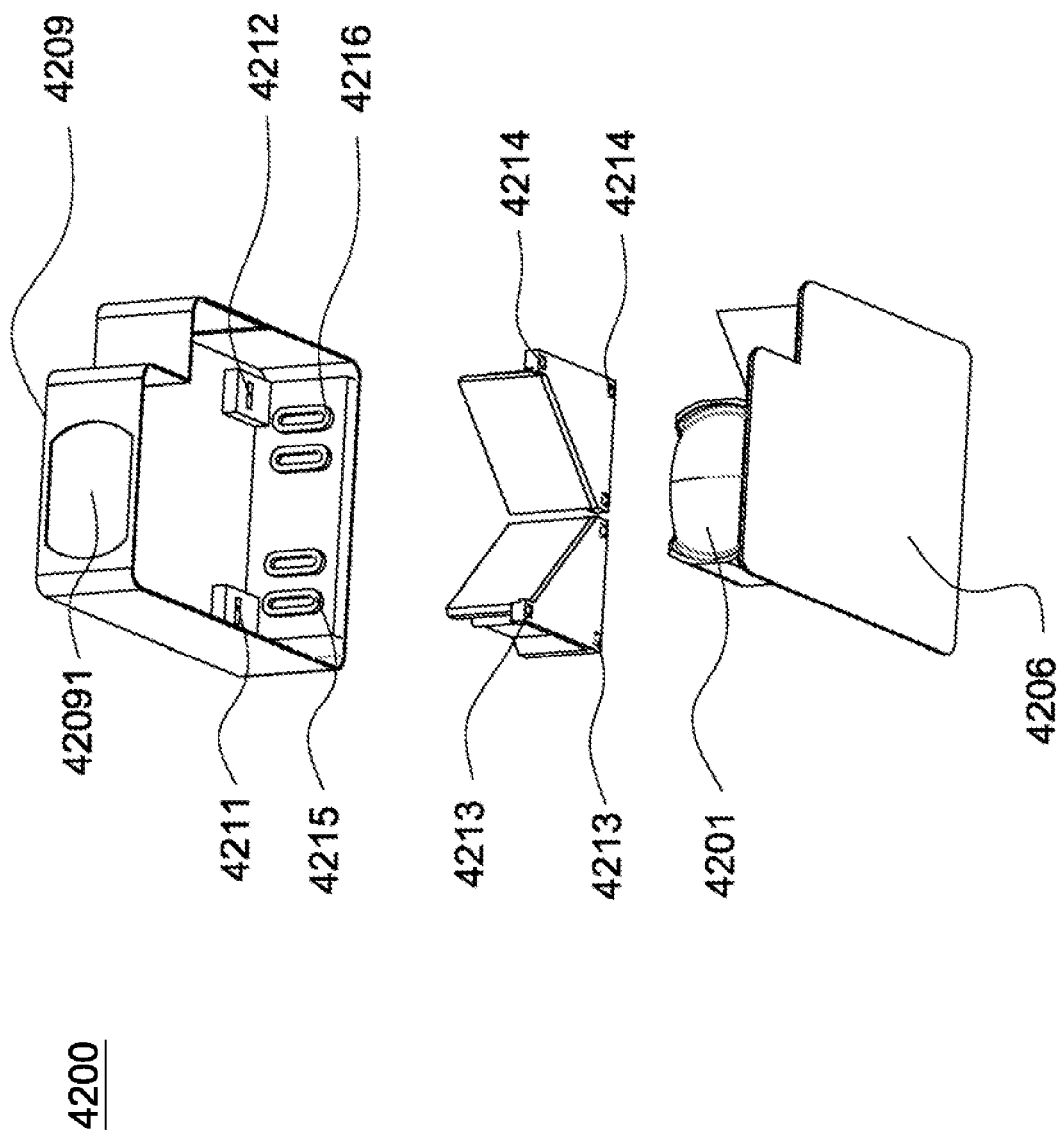
FIG. 31 is another exploded diagram of the elements of the lens device of FIG. 25.

FIG. 28 is a schematic diagram showing anther structure of the primary elements of a lens device 4200 in accordance with the eighth embodiment of the invention. FIG. 29 is a top view of the elements of the lens device 4200 of FIG. 28. FIG. 30 is an exploded diagram of the elements of the lens device 4200 of FIG. 28. FIG. 31 is another exploded diagram of the elements of the lens device 4200 of FIG. 28. As shown in FIGS. 28-31, the lens device 4200 further includes a base 4206 to which the first lens module 4201 and the third reflecting part 4205 are fixed, a first reflecting part carrier 4207 configured to carry the first reflecting part 4202 and movably disposed on the base 4206 to move in the third direction Z, a second reflecting part carrier 4208 configured to carry the second reflecting part 4203 and movably disposed on the base 4206 to move in the third direction Z, and a cover 4209 connected to the base 4206 to form a storage space for storing the above elements. The cover 4209 is provided with a hole 42091 allowing the light beam to enter the first lens module 4201.

For the movement of the first reflecting part 4202 and the second reflecting part 4203 in the third direction Z, the base 4206 is provided with a first guide groove 4211 and a second guide groove 4212 extending in the third direction Z. For stabilization of the movement, the number of the first guide groove 4211 and the second guide groove 4212 may be plural, and one of the first guide groove 4211 may be connected to one of the second guide groove 4212 to form a longer guide groove. A first movable element 4213 is disposed on the bottom of the first reflecting part carrier 4207 to cooperate with the first guide groove 4211, while a second movable element 4214 is disposed on the bottom of the second reflecting part carrier 4208 to cooperate with the second guide groove 4212.

The first movable element 4213 includes a first receiving hole disposed at the bottom of the first reflecting part carrier 4207 and a first roller disposed in the first receiving hole. The first roller is able to roll in the first receiving hole and the first guide groove 4211, thereby allowing the first reflecting part carrier 4207 to move in the third direction Z. The second movable element 4214 includes a second receiving hole disposed at the bottom of the second reflecting part carrier 4208 and a second roller disposed in the second receiving hole. The second roller is able to roll in the second receiving hole and the second guide groove 4212, thereby allowing the second reflecting part carrier 4208 to move in the third direction Z. However, the invention is not limited thereto. The first movable element 4213 and the second movable element 4214 may use other structure, for example, sliding blocks as substitutes.

To enhance the stabilization of movement, the cover 4209 is provided with another first guide groove 4211 and another second guide groove 4212 extending in the third direction Z. Another first movable element 4213 is disposed on the top of the first reflecting part carrier 4207 to cooperate with the first guide groove 4211, while another second movable element 4214 is disposed on the top of the second reflecting part carrier 4208 to cooperate with the second guide groove 4212. The structure of the first movable element 4213 and the second movable element 4214 are similar to that described in the previous paragraph and therefore the descriptions thereof are omitted.

A first driving assembly 4215 is disposed between the cover 4209 and the first reflecting part carrier 4207. The first driving assembly 4215 includes a magnet and a coil. The magnet is disposed on the cover 4209 and the coil is disposed on the first reflecting part carrier 4207. Alternatively, the magnet is disposed on the first reflecting part carrier 4207 and the coil is disposed on the cover 4209. When power is provided, the first reflecting part carrier 4207 is driven by the electromagnetic force to move in the third direction Z. A second driving assembly 4216 is disposed between the cover 4209 and the second reflecting part carrier 4208. The second driving assembly 4216 includes a magnet and a coil. The magnet is disposed on the cover 4209 and the coil is disposed on the second reflecting part carrier 4208. Alternatively, the magnet is disposed on the second reflecting part carrier 4208 and the coil is disposed on the cover 4209. When power is provided, the second reflecting part carrier 4208 is driven by the electromagnetic force to move in the third direction Z.

Figure 32:
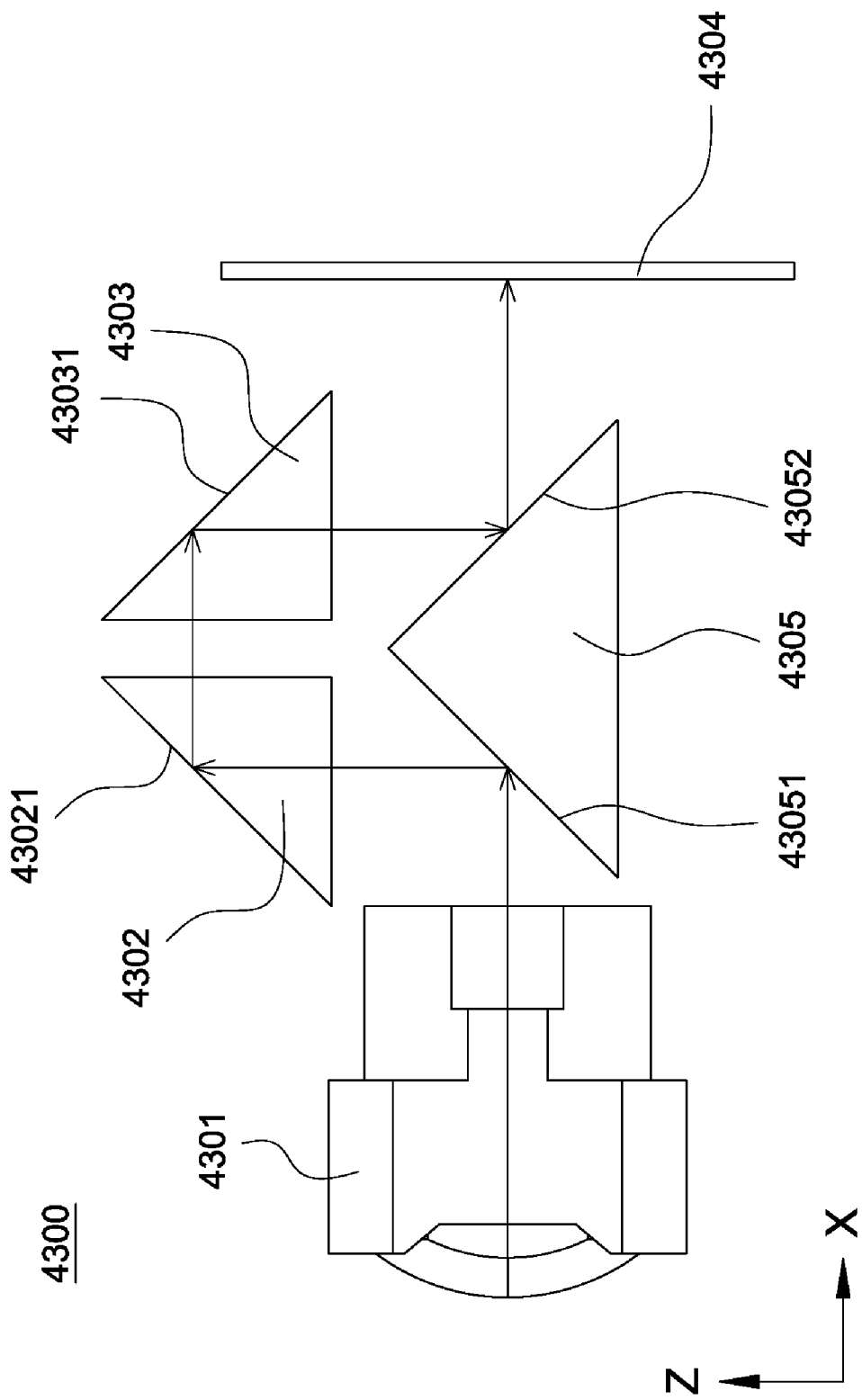
FIG. 32 is a schematic diagram showing the optical path of a lens device in accordance with a ninth embodiment of the invention.

FIG. 32 is a schematic diagram showing the optical path of a lens device 4300 in accordance with a ninth embodiment of the invention. As shown, the lens device 4300 includes a first lens module 4301 having an optical axis extended in the first direction X, a first reflecting part 4302, a second reflecting part 4303 reflecting the light beam form the first reflecting part 4302 and being disposed opposite to the first reflecting part 4302 in the first direction X, an image sensor 4304, and a third reflecting part 4305 reflecting the light beam from the first lens module 4301 to the first reflecting part 4302 and reflecting the light beam from the second reflecting part 4303 to the image sensor 4304. The first reflecting part 4302, the second reflecting part 4303 and the third reflecting part 4305 are configured to form a first light part turning module.

The first reflecting part 4302 has a first reflecting surface 43021. The second reflecting part 4303 has a second reflecting surface 43031. The first reflecting surface 43021 is at 450 from the first direction X. The first reflecting surface 43021 and the second reflecting surface 43031 are perpendicular to each other. Further, the first reflecting surface 43021 and the second reflecting surface 43031 are disposed opposite to each other in the first direction X. The third reflecting part 4305 has a third reflecting surface 43051 and a fourth reflecting surface 43052. The third reflecting surface 43051 is disposed opposite to the first lens module 4301 in the first direction X and opposite to the first reflecting surface 43021 in the third direction Z. The fourth reflecting surface 43052 is disposed opposite to the second reflecting surface 43031 in the third direction Z.

Preferably, the third reflecting surface 43051 is parallel to the first reflecting surface 43021 and the fourth reflecting surface 43052 is parallel to the second reflecting surface 43031. However, the invention is not limited thereto. It is understood that the fourth reflecting surface 43052 can be omitted and the image sensor 4304 can be disposed opposite to the second reflecting part 4303 so that the light beam reflected by the second reflecting part 4303 directly reaches the image sensor 4304 without passing through the fourth reflecting surface 43052. In the invention, the term "opposite to" does not necessarily mean "parallel to" but "arranged in such way that the light beam passing through one element can reach another element".

In the invention, the first reflecting part 4302, the second reflecting part 4303 and the third reflecting part 4305 may be reflecting prisms or reflecting mirrors.

In operation, the light beam propagates in the first direction X, enters the first lens module 4301, exits from the first lens module 4301, reaches the third reflecting surface 43051, is reflected on the third reflecting surface 43051, reaches the first reflecting surface 43021, is reflected on the first reflecting surface 43021, reaches the second reflecting surface 43031, is reflected on the second reflecting surface 43031, reaches the fourth reflecting surface 43052, is reflected on the fourth reflecting surface 43052, and reaches the image sensor 4304 to form an image.

Figure 33:
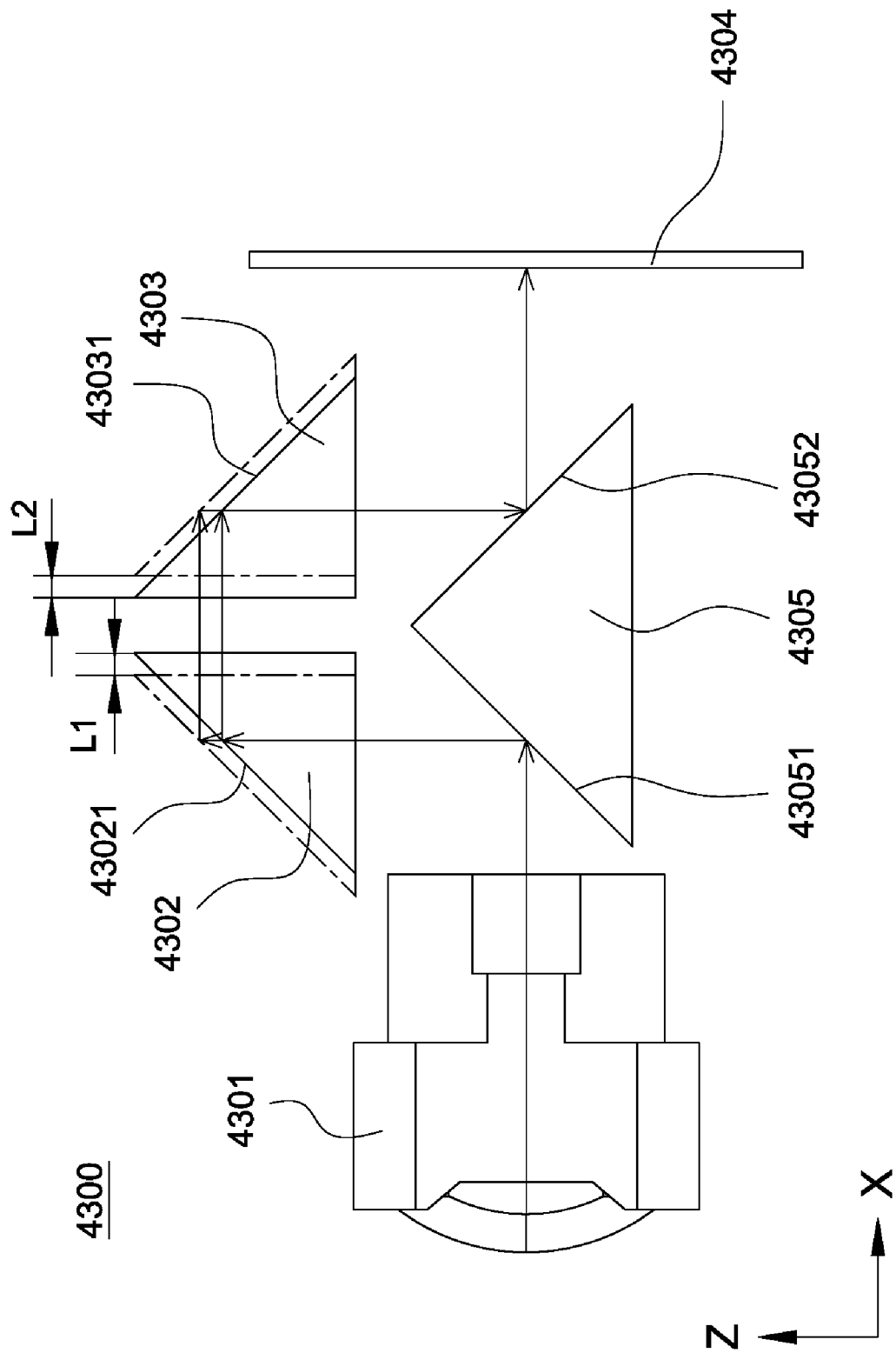
FIG. 33 is a schematic diagram showing the light path of the lens device of the ninth embodiment of the invention, wherein the first reflecting part and the second reflecting part are moved in opposite directions including the first direction and the opposite direction thereof.

FIG. 33 is a schematic diagram showing the light path of the lens device 4300 of the ninth embodiment of the invention, in which the first reflecting part 4302 and the second reflecting part 4303 are moved in opposite directions (i.e. the first direction X and the opposite direction thereof). In FIG. 33, the initial positions of the first reflecting part 4302 and the second reflecting part 4303 are shown in solid lines, while the positions of the first reflecting part 4302 and the second reflecting part 4303 after movement are shown in broken lines. The first reflecting part 4302 is moved a distance L1 in the first direction X and the second reflecting part 4303 is moved a distance L2 in a direction opposite to the first direction X so that the first reflecting part 4202 and the second reflecting part 4203 are away from each other. Thus, the length of the path followed by the light beam from the first lens module 4301 to the image sensor 4304 is increased by $^\Delta$S=L1+L2 to perform the auto focusing operation of the lens device 4300, wherein L1 and L2 are positive numbers.

However, if the first reflecting part 4302 is moved a distance L1 in the first direction X and the second reflecting part 4303 is moved a distance L2 in a direction opposite to the first direction X so that the first reflecting part 4302 and the second reflecting part 4303 are closer to each other, then the length of the path followed by the light beam from the first lens module 4301 to the image sensor 4304 will be reduced by $^\Delta$S=L1+L2 to perform the auto focusing operation of the lens device 4300.

If L1=L2, then the light beam reflected by the second reflecting part 4303 will propagate along the same optical path as the previous optical path (i.e. the optical path before the first reflecting part 4202 and the second reflecting part 4203 are moved). Therefore, the image-forming position on the image sensor 4204 is unchanged and the lens device 4300 merely performs the auto focusing operation. If L1≠L2, then the light beam reflected by the second reflecting part 4303 will propagate along an optical path different from the optical path before the first reflecting part 4202 and the second reflecting part 4203 are moved. Therefore, the image-forming position on the image sensor 4204 is shifted at a distance S=|L1−L2|.

Specifically, in this embodiment, the first reflecting part 4302 and the second reflecting part 4303 can be moved in opposite directions (i.e. the first direction X and the opposite direction thereof) and away from each other. If the distance L1 of movement of the first reflecting part 4302 in the first direction X is greater than the distance L2 of movement of the second reflecting part 4303 in a direction opposite to the first direction X, then the image-forming position on the image sensor 4304 will be shifted at a distance S=|L1−L2| in the third direction Z. However, if the distance L1 of movement of the first reflecting part 4302 in the first direction X is less than the distance L2 of movement of the second reflecting part 4303 in a direction opposite to the first direction X, then the image-forming position on the image sensor 4304 will be shifted at a distance S=|L1−L2| in the direction opposite to the third direction Z. Alternatively, the first reflecting part 4302 and the second reflecting part 4303 can be moved in opposite directions (the first direction X and the opposite direction thereof) and closer to each other. If the distance L1 of movement of the first reflecting part 4302 in the first direction X is greater than the distance L2 of movement of the second reflecting part 4303 in a direction opposite to the first direction X, then the image-forming position on the image sensor 4204 will be shifted at a distance S=|L1−L2| in the direction opposite to the third direction Z. However, if the distance L1 of movement of the first reflecting part 4302 in the first direction X is less than the distance L2 of movement of the second reflecting part 4303 in the direction opposite to the first direction X, then the image-forming position on the image sensor 4304 will be shifted at a distance S=|L1−L2| in the third direction Z.

By above arrangement, the lens device 4300 is able to perform auto focusing operation and compensation for hand wobbling.

Figure 34:
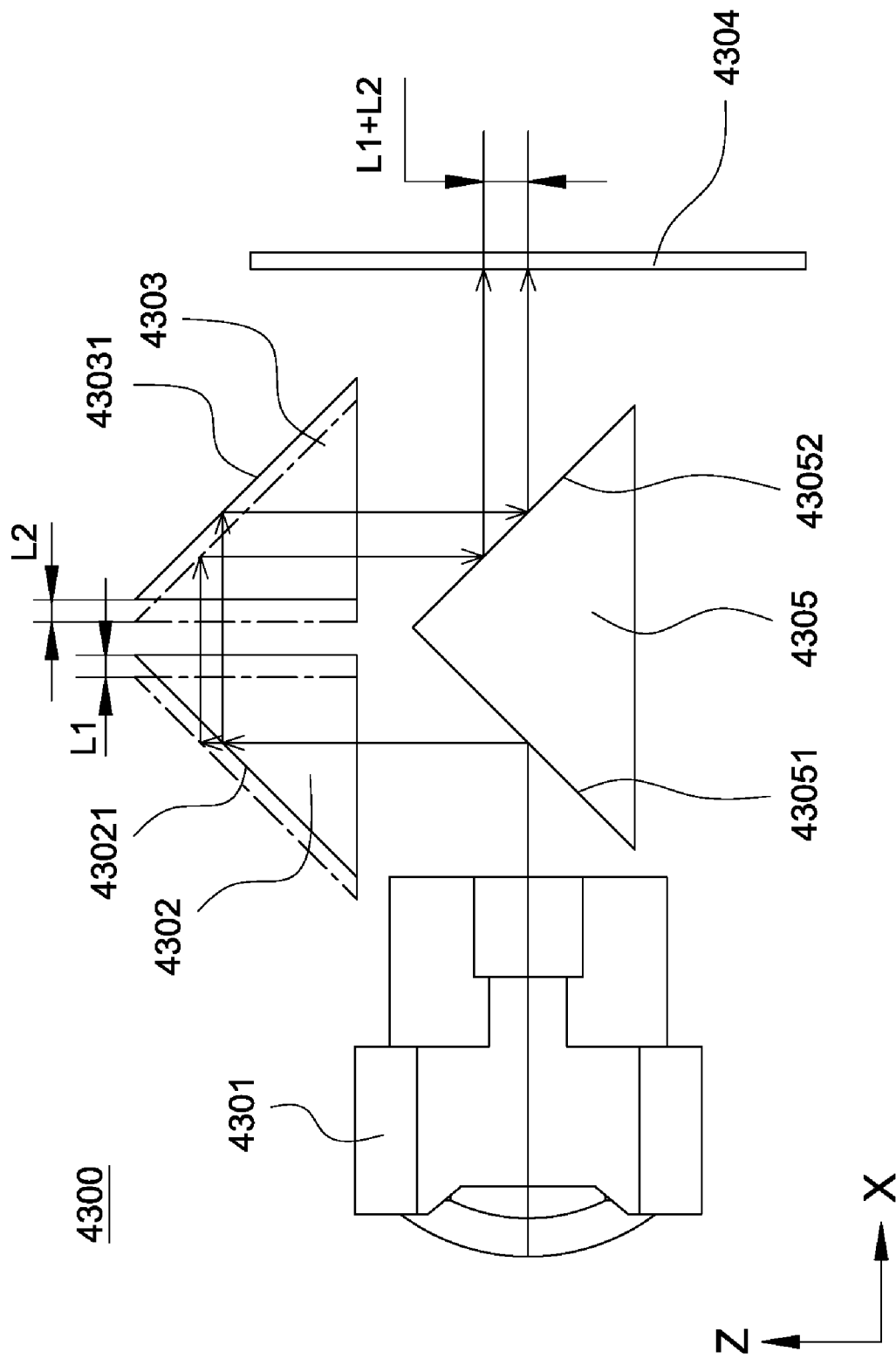
FIG. 34 is a schematic diagram showing the light path of the lens device of the ninth embodiment of the invention, wherein the first reflecting part and the second reflecting part are moved in the same direction including the first direction or the opposite direction thereof.

FIG. 34 is a schematic diagram showing the light path of the lens device 4300 of the ninth embodiment of the invention, in which the first reflecting part 4302 and the second reflecting part 4303 are moved in same direction (i.e. the first direction X or the direction opposite to the first direction X). In FIG. 34, the initial positions of the first reflecting part 4302 and the second reflecting part 4303 are shown in solid lines, while the positions of the first reflecting part 4302 and the second reflecting part 4303 after movement are shown in broken lines. The first reflecting part 4302 is moved a distance L1 in the first direction X and the second reflecting part 4303 is moved a distance L2 also in the first direction X so that the image forming position on the image sensor 4304 is shifted at a distance S=L1+L2 to perform a compensation for hand wobbling, wherein L1 and L2 are positive numbers.

In FIG. 34, if both of the first reflecting part 4302 and the second reflecting part 4303 are moved in the direction opposite to the first direction X, then the image forming position on the image sensor 4304 will be shifted in the third direction Z. However, if both of the first reflecting part 4302 and the second reflecting part 4303 are moved in the first direction X, then the image forming position on the image sensor 4304 will be shifted in the direction opposite to the third direction Z.

If L1=L2, then the image forming position on the image sensor 4304 will be shifted at a distance S=L1+L2=2L1=2L2 and the length of path followed by the light beam will be unchanged. If L1≠L2, then the image-forming position on the image sensor 4304 will be shifted at a distance S=L1+L2 and the length of path followed by the light beam will be also changed in a difference $^\Delta$S=|L1−L2|.

Specifically, the first reflecting part 4302 and the second reflecting part 4303 can be respectively moved distances L1 and L2 in the first direction X. If L1>L2, then the length of path followed by the light beam will be increased in a difference $^\Delta$S=|L1−L2|. However, if L1<L2, then the length of path followed by the light beam will be reduced in a difference $^\Delta$S=|L1−L2|. Alternatively, the first reflecting part 4302 and the second reflecting part 4303 can be respectively moved distance L1 and L2 in a direction opposite to the first direction X. If L1>L2, then the length of path followed by the light beam will be reduced in a difference $^\Delta$S=|L1−L2|. However, if L1<L2, then the length of path followed by the light beam will be increased in a difference $^\Delta$S=|L1−L2|.

By above arrangement, the lens device 4300 is able to perform compensation for hand wobbling and auto focusing operation.

In the ninth embodiment of the invention, the lens device 4300 further includes a base to which the first lens module 4301 and the third reflecting part 4305 are fixed, a first reflecting part carrier configured to carry the first reflecting part 4302 and movably disposed on the base to move in the first direction X, a second reflecting part carrier 4308 configured to carry the second reflecting part 4303 and movably disposed on the base to move in the first direction X, and a cover connected to the base to form a storage space for storing the above elements. The cover is provided with a hole allowing the light beam to enter the first lens module 4301. The first reflecting part carrier and the second reflecting part carrier of the ninth embodiment are the same as those of the eighth embodiment except the movement directions thereof, and therefore the descriptions thereof are omitted.

Figure 36:
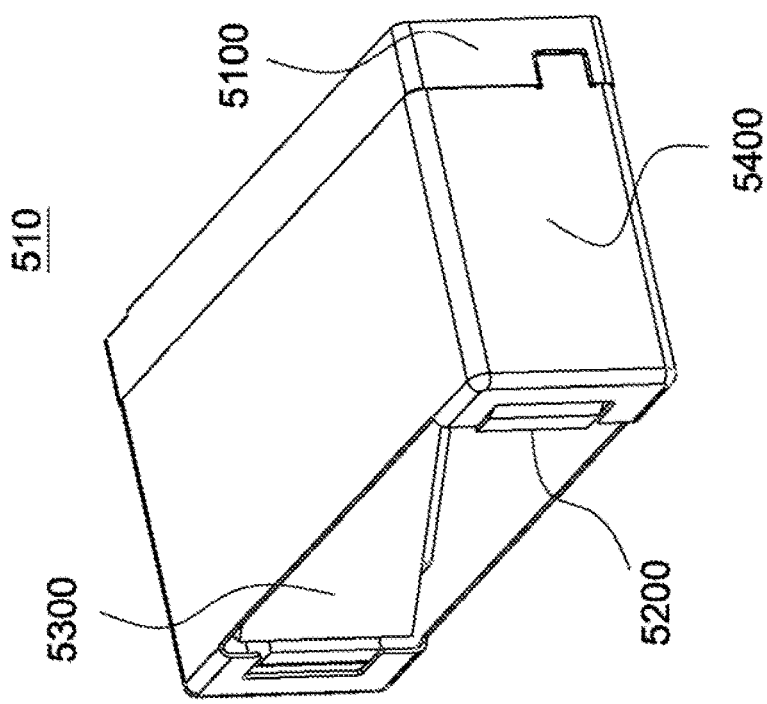
FIG. 36 is a perspective diagram showing the voice coil motor in accordance with the tenth embodiment of the invention.

FIGS. 35 and 36 depict a voice coil motor 510 in accordance with a tenth embodiment of the invention, wherein the voice coil motor 510 includes a first light path turning module and a driving unit 5100.

The first light path turning module includes a first reflecting module 5200 and a second reflecting module 5300. The second reflecting module 5300 is configured to reflect the light beam coming from the first reflecting module 5200.

The driving unit 5100 is configured to drive the first reflecting module 5200 and the second reflecting module 5300 to move in the same direction or in opposite directions.

The driving unit 5100 includes a mount 5110, a first driving assembly 5120 and a second driving assembly 5130. The first driving assembly 5120 and the second driving assembly 5130 are configured to drive the first reflecting module 5200 and the second reflecting module 5300 which are movably disposed on the mount 5110. The first driving assembly 5120 includes a first magnet 5122, a first printed circuit unit 5125 and a first attracting yoke 5124. The first magnet 5122 is disposed on the mount 5110 while the first printed circuit unit 5125 and the first attracting yoke 5124 are disposed on the first reflecting module 5200. Alternatively, the first magnet 5122 is disposed on the first reflecting module 5200 while the first printed circuit unit 5125 and the first attracting yoke 5124 are disposed on the mount 5110. The second driving assembly 5130 includes a second magnet 5132, a second printed circuit unit 5135 and a second attracting yoke 5134. The second magnet 5132 is disposed on the mount 5110 while the second printed circuit unit 5135 and the second attracting yoke 5134 are disposed on the second reflecting module 5300. Alternatively, the second magnet 5132 is disposed on the second reflecting module 5300 while the second printed circuit unit 5135 and the second attracting yoke 5134 are disposed on the mount 5110.

As shown in FIG. 36, the voice coil motor 510 includes a driving unit 5100, a first reflecting module 5200, a second reflecting module 5300 and a frame 5400. The first reflecting module 5200 and the second reflecting module 5300 are connected to the driving unit 5100. The driving unit 5100 can drive the first reflecting module 5200 and the second reflecting module 5300 to move in the same direction or in opposite directions. The frame 5400 is used for covering the driving unit 5100 to provide an appearance of the voice coil motor 510.

Figure 37:
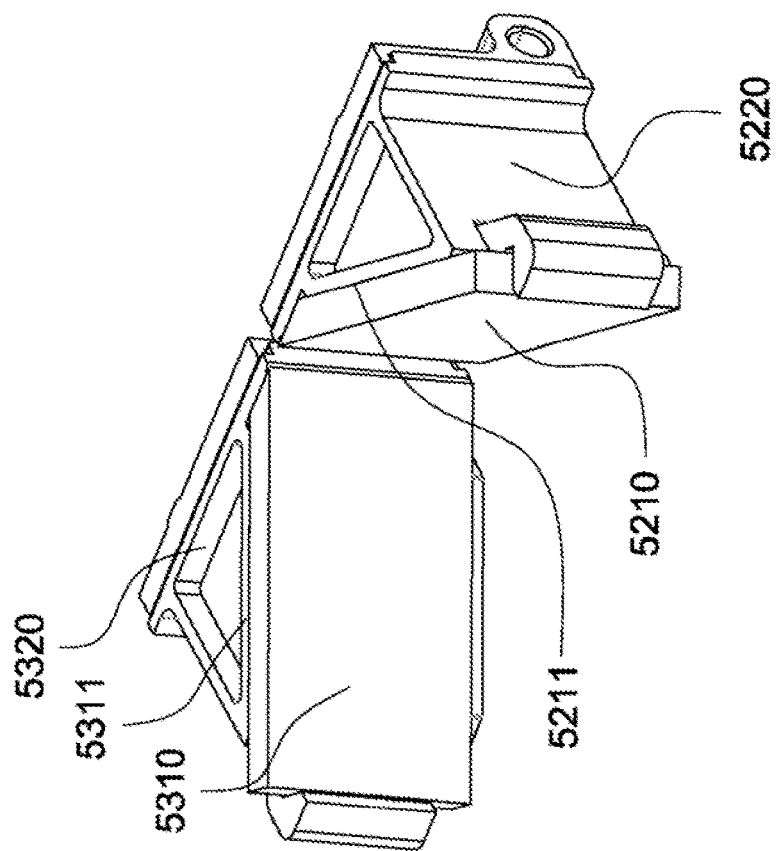
FIG. 37 is a perspective diagram showing the first reflecting module and the second reflecting module in accordance with the tenth embodiment of the invention.

As shown in FIG. 37, the first reflecting module 5200 includes a first reflecting part 5210 and a first reflecting carrier 5220. The first reflecting part 5210 has a first reflecting surface 5211. The second reflecting module 5300 includes a second reflecting part 5310 and a second reflecting carrier 5320. The second reflecting part 5310 has a second reflecting surface 5311.

The first reflecting part 5210 and the second reflecting part 5310 are disposed opposite to each other. Preferably, the first reflecting surface 5211 and the second reflecting surface 5311 are perpendicular to each other. In the invention, the term "opposite to" does not necessarily mean "parallel to" but "arranged in such way that the light beam passing through one element can reach another element".

In the invention, the first reflecting part 5210 and the second reflecting part 5310 may be prisms, reflecting prisms or reflecting mirrors.

The first reflecting part 5210 is fixedly mounted on the first reflecting carrier 5220. The relative position of the first reflecting part 5210 is kept by the first reflecting carrier 5220. The second reflecting part 5310 is fixedly mounted on the second reflecting carrier 5320. The relative position of the second reflecting part 5310 is kept by the second reflecting carrier 5320.

Figure 38:
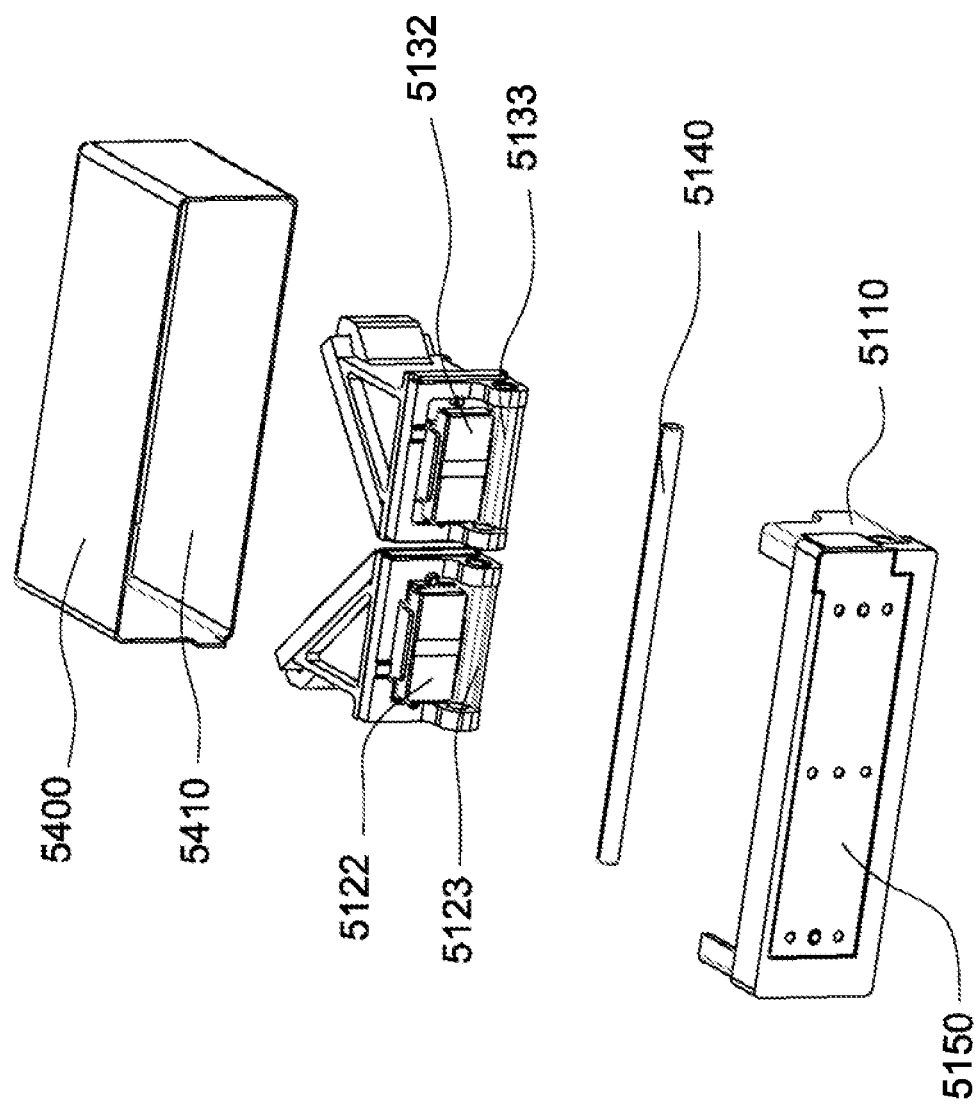
FIG. 38 is an exploded diagram of the voice coil motor in accordance with the tenth embodiment of the invention.
Figure 39:
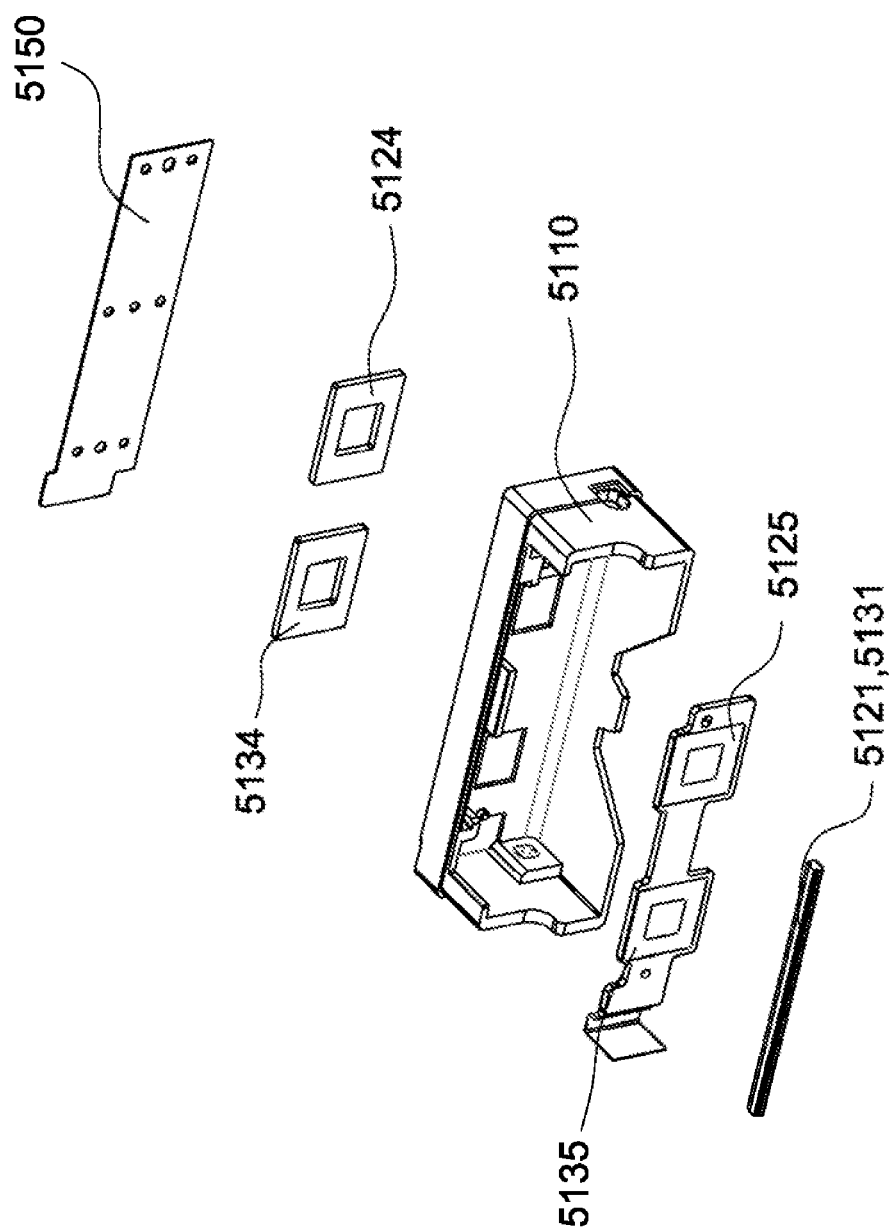
FIG. 39 is an exploded diagram of a driving unit in accordance with the tenth embodiment of the invention.

As shown in FIGS. 38 and 39, the driving unit 5100 includes the mount 5110, the first driving assembly 5120, the second driving assembly 5130, a shaft 5140 and a rear cover 5150.

The mount 5110 is open towards the first reflecting module 5200 and the second reflecting module 5300. That is, the mount 5110 has an opening towards the first reflecting module 5200 and the second reflecting module 5300 for receiving the first reflecting carrier 5220 of the first reflecting module 5200 and the second reflecting carrier 5320 of the second reflecting module 5300.

The first driving assembly 5120 is firmly connected to the first reflecting carrier 5220 and is able to drive the first reflecting carrier 5220 to move on the mount 5110. The second driving assembly 5130 is firmly connected to the second reflecting carrier 5320 and is able to drive the second reflecting carrier 5320 to move on the mount 5110.

The first driving assembly 5120 includes a first stopper 5121, a first magnet 5122, a first slider mechanism 5123, a first attracting yoke 5124 and a first printed circuit unit 5125. The first printed circuit unit 5125 includes a first coil 51252. The second driving assembly 5130 includes a second stopper 5131, a second magnet 5132, a second slider mechanism 5133, a second attracting yoke 5134 and a second printed circuit unit 5135. The second printed circuit unit 5135 includes a second coil 51352. In the invention, the first printed circuit unit 5125 and the second printed circuit unit 5135 are integrally formed as a continuous-unity piece. However, the invention is not limited thereto. The first printed circuit unit 5125 and the second printed circuit unit 5135 can be two separated pieces.

Figure 40:
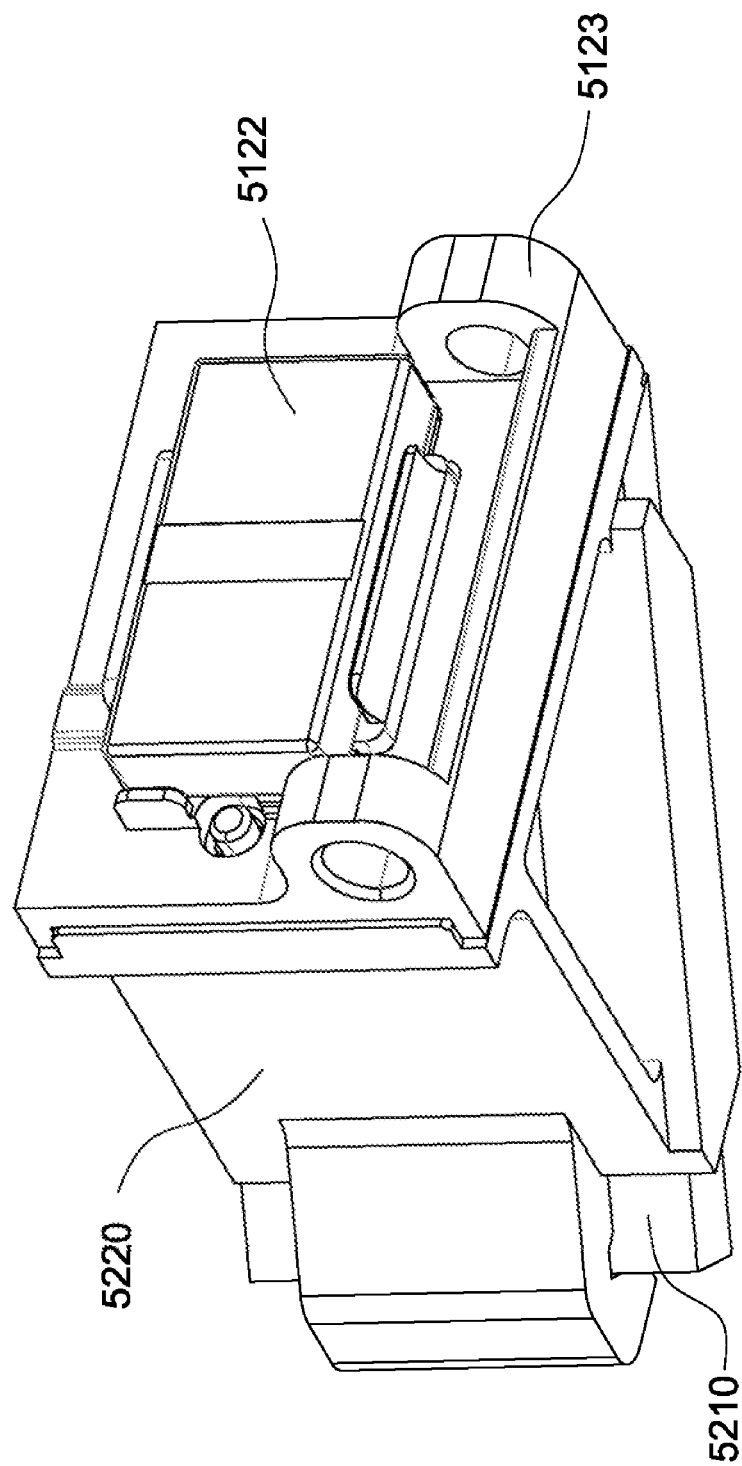
FIG. 40 is a perspective diagram showing the first reflecting module and the first driving module in accordance with the tenth embodiment of the invention.
Figure 41:
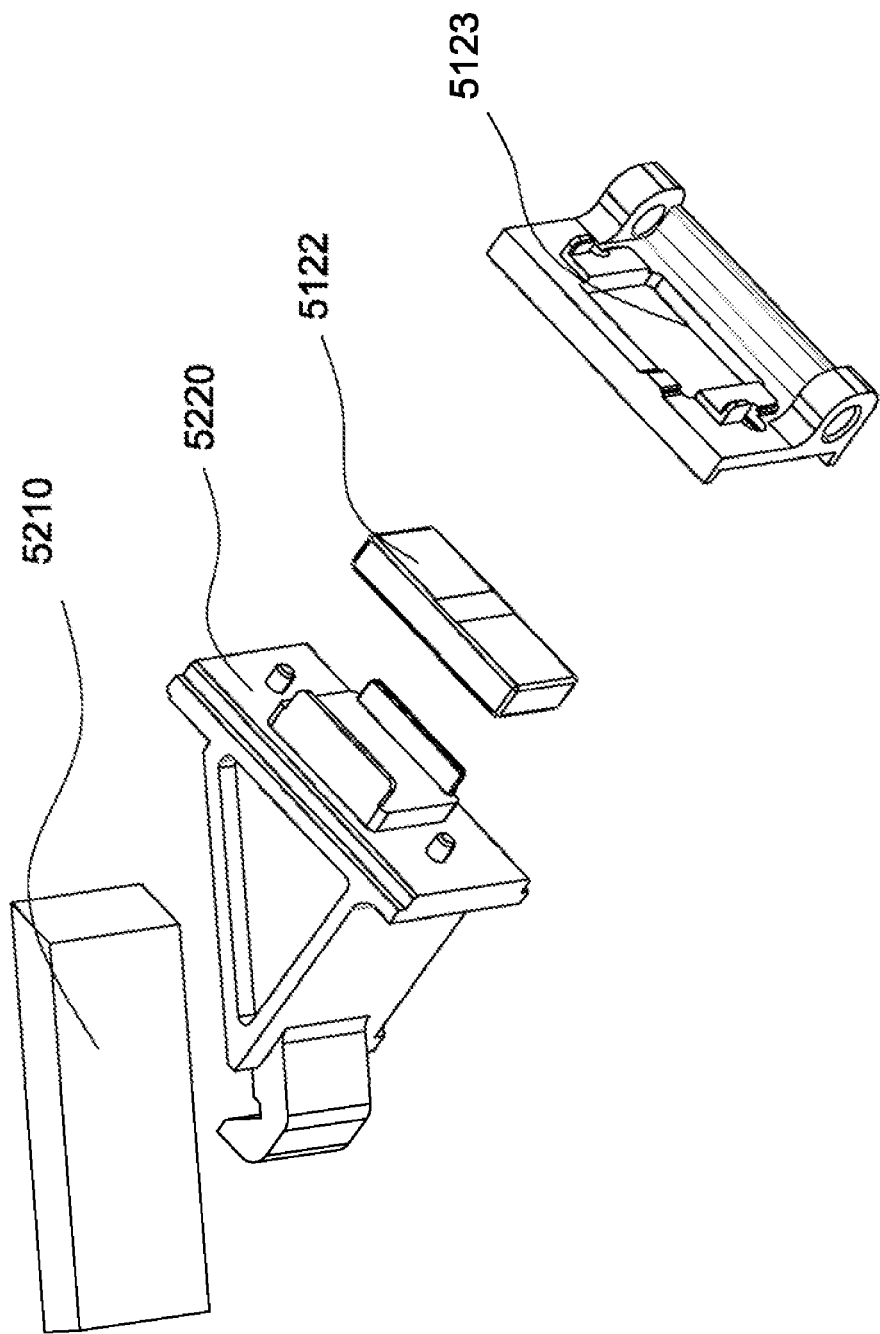
FIG. 41 is an exploded diagram showing the first reflecting module and the first driving module in accordance with the tenth embodiment of the invention.

As shown in FIGS. 40 and 41, the first slider mechanism 5123 and the first reflecting carrier 5220 are firmly connected. The second slider mechanism 5133 and the second reflecting carrier 5320 are firmly connected. The first slider mechanism 5123 and the second slider mechanism 5133 are slidably connected to the mount 5110. Specifically, the shaft 5140 is fixed to the mount 5110. The first slider mechanism 5123 and the second slider mechanism 5133 are movably disposed around the shaft 5140. Preferably, the shaft 5140 is made of magnetically non-permeable material to avoid interfering the electromagnetic force of the driving unit 5100, thereby minimizing the optical deviation.

The first magnet 5122 and the first printed circuit unit 5125 provide a motive force for the first slider mechanism 5123 to move in the same direction or in opposite directions. Similarly, the second magnet 5132 and the second printed circuit unit 5135 provide a motive force for the second slider mechanism 5133 to move in the same direction or in opposite directions. Specifically, the first printed circuit unit 5125 (the first coil 51252) and the second printed circuit unit 5135 (the second coil 51352) are provided with power to generate magnetic fields. The first magnet 5122 and the second magnet 5132 are pushed by electromagnetic forces so as to drive the first slider mechanism 5123 and the second slider mechanism 5133 to move along the shaft 5140 in the same direction or in opposite directions. Thus, a lens device provided with the voice coil motor 510 can perform the auto focusing operation and compensation for hand wobbling.

The first magnet 5122 is disposed on the mount 5110 while the first printed circuit unit 5125 (the first coil 51252) and the first attracting yoke 5124 are disposed on the first reflecting carrier 5220. Alternatively, the first magnet 5122 is disposed on the first reflecting carrier 5220 while the first printed circuit unit 5125 (the first coil 51252) and the first attracting yoke 5124 are disposed on the mount 5110. As shown in FIGS. 40 and 41, in this embodiment, the first magnet 5122 is firmly disposed on the first slider mechanism 5123 while the first printed circuit unit 5125 (the first coil 51252) and the first attracting yoke 5124 are disposed on the mount 5110.

The second magnet 5132 is disposed on the mount 5110 while the second printed circuit unit 5135 (the second coil 51352) and the second attracting yoke 5134 are disposed on the second reflecting carrier 5320. Alternatively, the second magnet 5132 is disposed on the second reflecting carrier 5320 while the second printed circuit unit 5135 (the second coil 51352) and the second attracting yoke 5134 are disposed on the mount 5110. In this embodiment, the second magnet 5132 is firmly disposed on the second slider mechanism 5133 as shown in FIG. 38, while the second printed circuit unit 5135 (the second coil 51352) and the second attracting yoke 5134 are disposed on the mount 5110.

The first attracting yoke 5124 and the second attracting yoke 5134 are fixed to the mount 5110 through the rear cover 5150. The first magnet 5122 and the first attracting yoke 5124 attract each other. The second magnet 5132 and the second attracting yoke 5134 attract each other. Thus, the first reflecting carrier 5220 and the second reflecting carrier 5320 can be tightly propped against the mount 5110 to ensure that the first reflecting part 5210 and the second reflecting part 5310 are perpendicular to the optical path.

Figure 42:
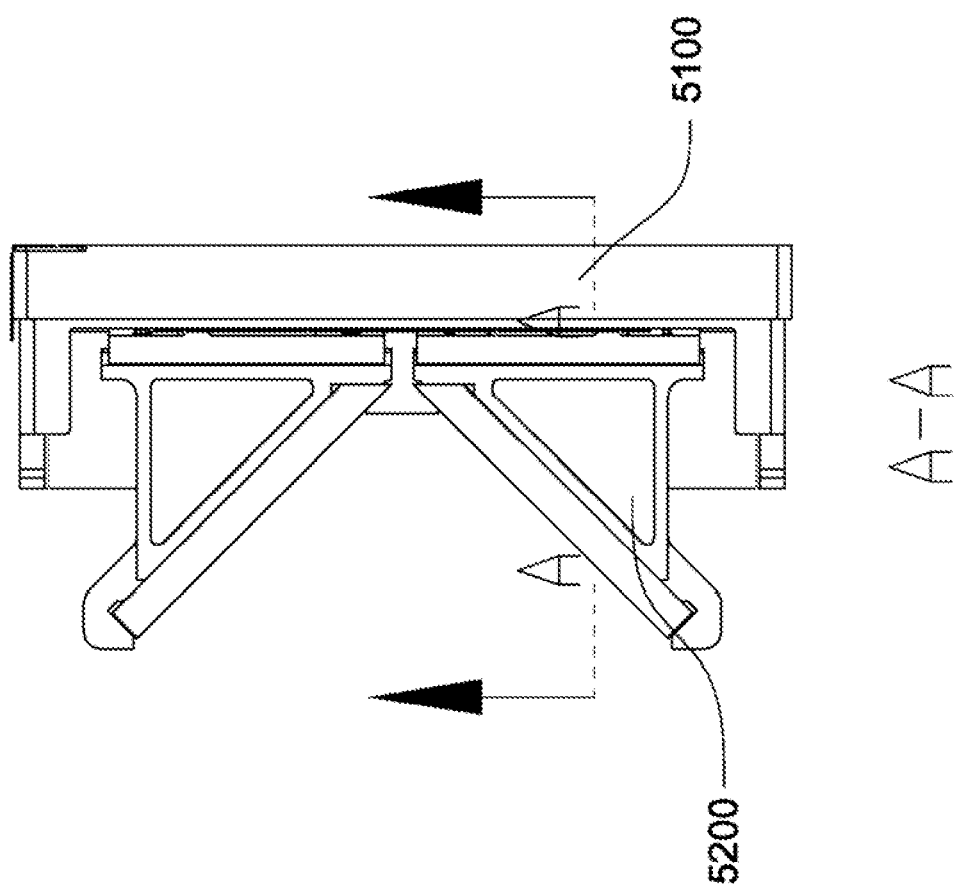
FIG. 42 is a top view of the first reflecting module and the first driving module in accordance with the tenth embodiment of the invention.
Figure 43:
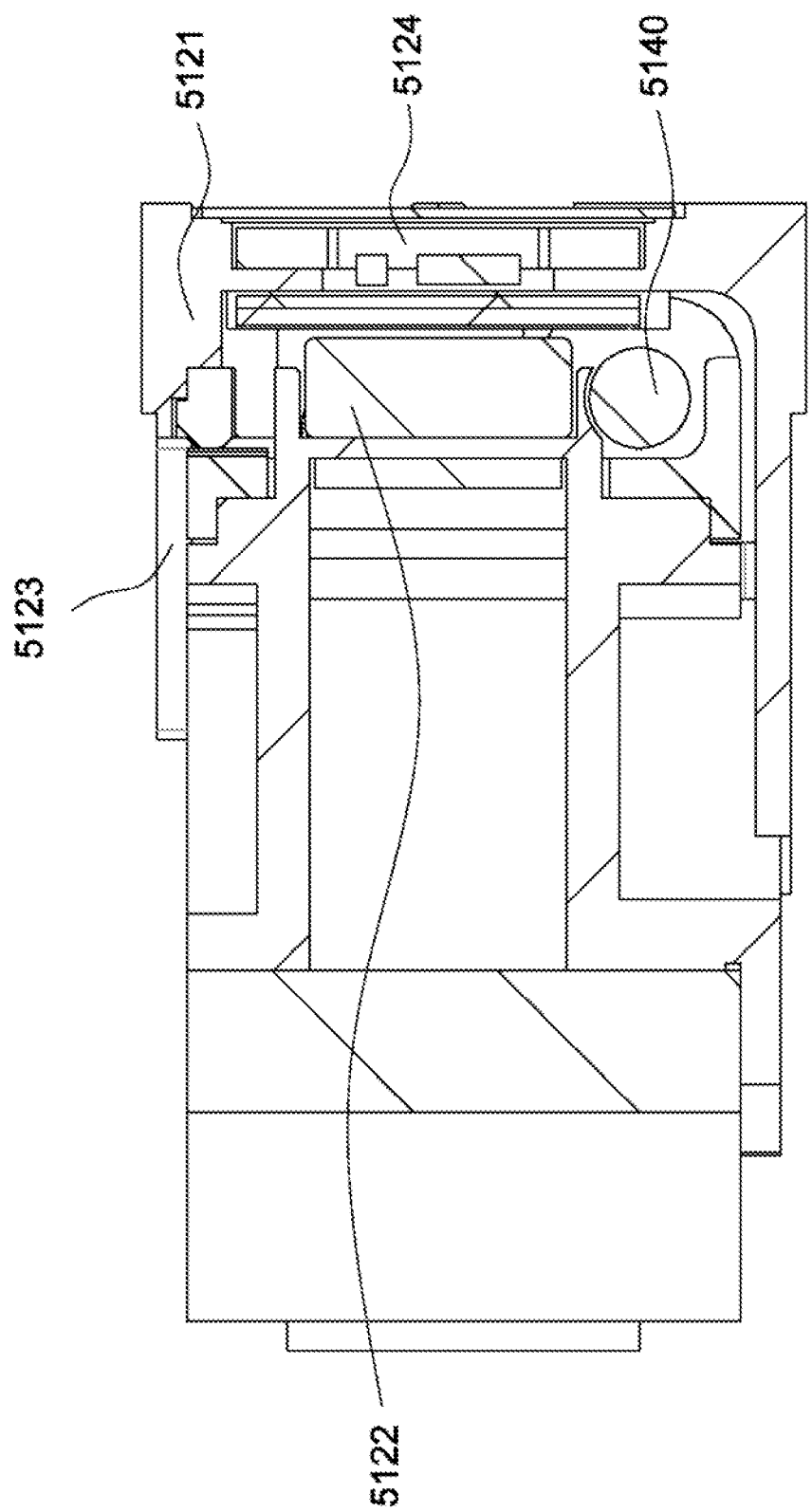
FIG. 43 is a section of FIG. 42 along A-A.

Preferably, as shown in FIGS. 42 and 43, the first stopper 5121 and the second stopper 5131 are mounted on the mount 5110. The first magnet 5122 and the first attracting yoke 5124 attract each other. The second magnet 5132 and the second attracting yoke 5134 attract each other. Thus, the first reflecting carrier 5220 and the second reflecting carrier 5320 can be tightly propped against the first stopper 5121 and the second stopper 5131 to ensure that the first reflecting part 5210 and the second reflecting part 5310 are perpendicular to the optical path, thereby obtaining a good image quality.

Figure 44:
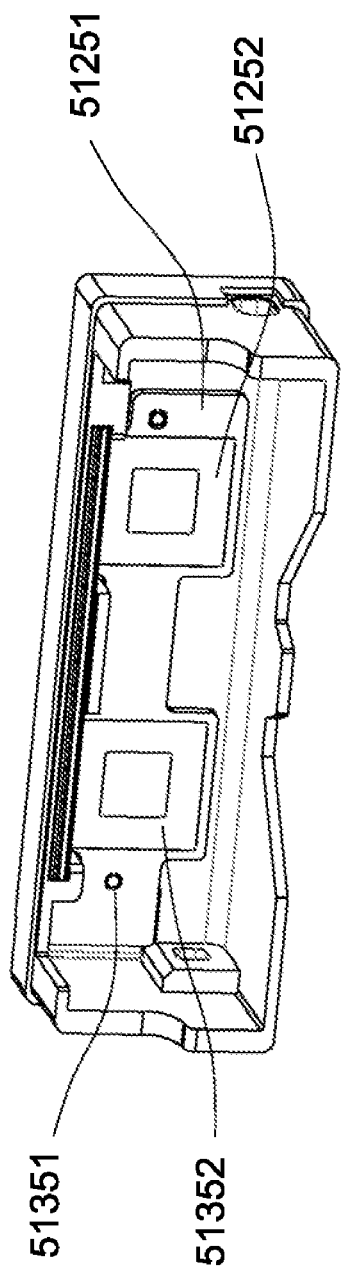
FIG. 44 is a perspective diagram showing a first printed circuit unit, a second printed circuit unit and a mount in accordance with the tenth embodiment of the invention.
Figure 45:
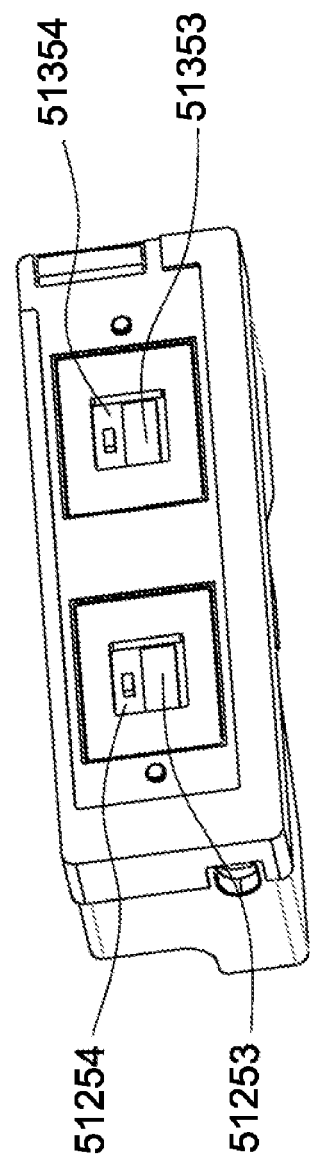
FIG. 45 is another perspective diagram showing the first printed circuit unit, the second printed circuit unit and the mount in accordance with the tenth embodiment of the invention.

As shown in FIGS. 44 and 45, the first printed circuit unit 5125 includes a first printed circuit board 51251, a first coil 51252, a first driving chip 51253 and a first chip cooler 51254. The first coil 51252 is printed on a surface of the first circuit board 51251 wherein the surface faces the first magnet 5122. Preferably, in this embodiment, the first circuit board 51251 has nine layers of coil printed thereon. The first driving chip 51253 and the first chip cooler 51254 are disposed on another surface of the first circuit board 51251.

The second printed circuit unit 5135 includes a second printed circuit board 51351, a second coil 51352, a second driving chip 51353 and a second chip cooler 51354. The second coil 51352 is printed on a surface of the second circuit board 51351 wherein the surface faces the second magnet 5132. Preferably, in this embodiment, the second circuit board 51351 has nine layers of coil printed thereon. The second driving chip 51353 and the second chip cooler 51354 are disposed on another surface of the second circuit board 51351.

The frame 5400 is connected to the mount 5110 to form a storage space for storing above described elements. The frame 5400 has an opening 5410 allowing an entry of the light beam.

Figure 46:
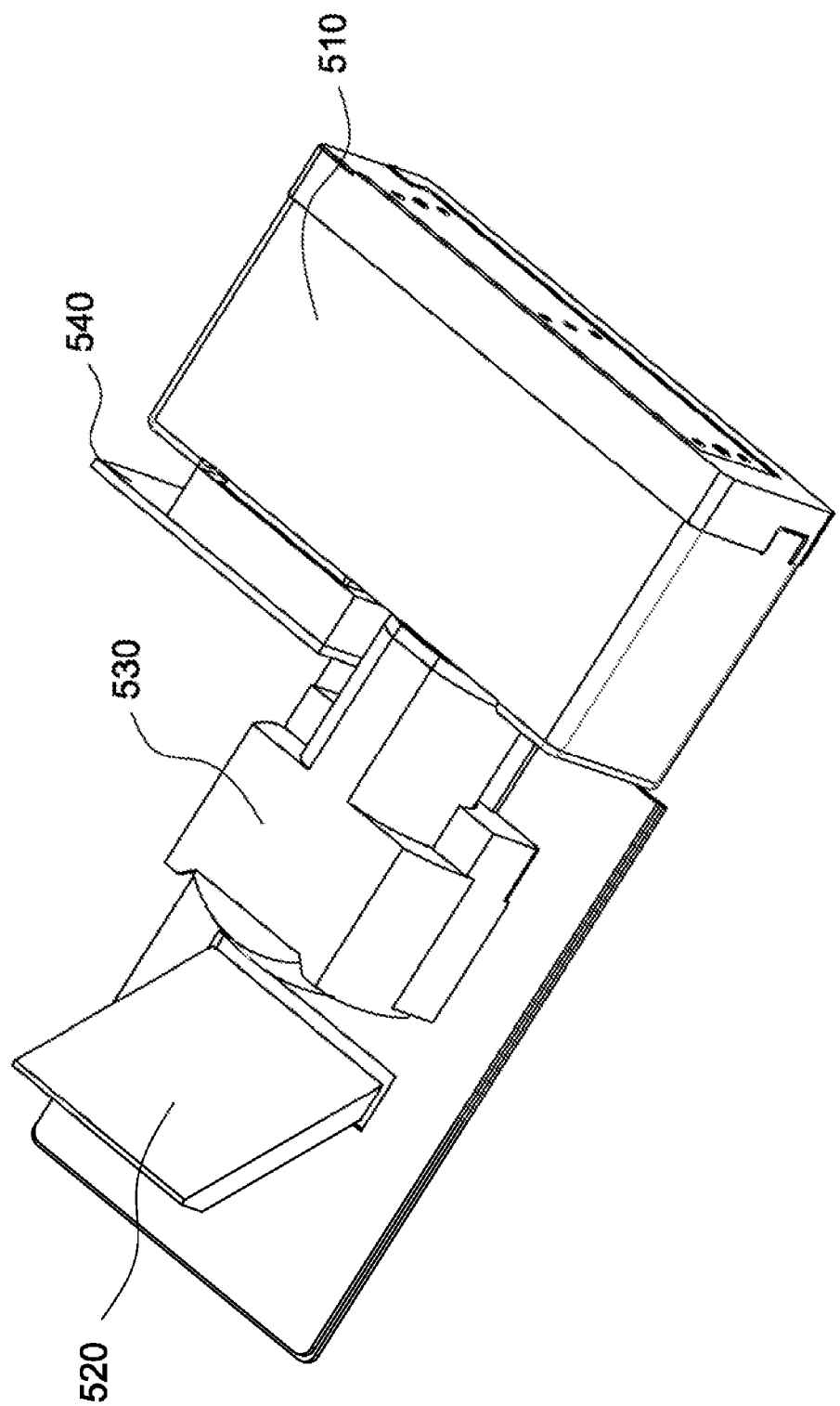
FIG. 46 is a perspective diagram of a lens device in accordance with an eleventh embodiment of the invention.

As shown in FIG. 46, a lens device of the eleventh embodiment includes the voice coil motor 510, the second light path turning module 520, the first lens module 530 and the image sensor 540 of the tenth embodiment, wherein the second light path turning module 520 is configured to receive and reflect a light beam coming from the object-side, and the first lens module 530 is configured to receive the light beam reflected by the second light path turning module 520.

The voice coil motor 510 is disposed between the first lens module 530 and the image sensor 540. In operation, the light beam passes through the first lens module 530 to the first reflecting module 5200, is reflected by the first reflecting module 5200 to the second reflecting module 5300, and is reflected by the second reflecting module 5300 to the image sensor 540.

Specifically, the light beam from the object side propagates in the second direction, enters the second light path turning module 520, is reflected by the second light path turning module 520 to propagate in the first direction, passes through the first lens module 530, reaches the first reflecting module 5200, is reflected on the first reflecting surface 5211 of the first reflecting module 5200 to propagate in the third direction, reaches the second reflecting module 5300, is reflected on the second reflecting surface 5311 to propagate in the first direction, and reaches the image sensor 540 to form an image.

The first lens module 530 has an optical axis oriented in the first direction, at least three lenses and a stop. At least one of the three lenses has positive refractive power (i.e. the focal length is positive). The lens adjacent to the object side may have positive refractive power and the object-side surface thereof may be convex. At least one of the three lenses has negative refractive power (i.e. the focal length is negative). At least one of the three lenses has a non-circular outer circumferential portion. When the at least one of the lenses is observed along the optical axis thereof, the outer circumferential portion may be in shape of polygon, polygon with sides arranged symmetrically with respect to the optical axis, lanes of track and field, bottle, oak barrel, the upper half portion of red wine bottle or the like. The stop may be non-circular. When the stop is observed along the optical axis thereof, the outer circumferential portion of the stop may be in shape of polygon, polygon with sides arranged symmetrically with respect to the optical axis, lanes of track and field, bottle, oak barrel, the upper half portion of red wine bottle or the like. Preferably, at least one lens and/or the stop of the lens device has a non-circular outer circumferential portion. Such a design facilitates the reduction of dimensions, thickness and volume of the lens module and can effectively minimize the lens module. However, the invention is not limited thereto. The lenses and the stop may be circular.

The described lens module has longer focal length and higher magnification for the optical zoom, is miniaturized with the dimensions of the lens reduced, and can minimize the optical deviation by using the reflecting prisms and the shaft 5140.

Figure 47:
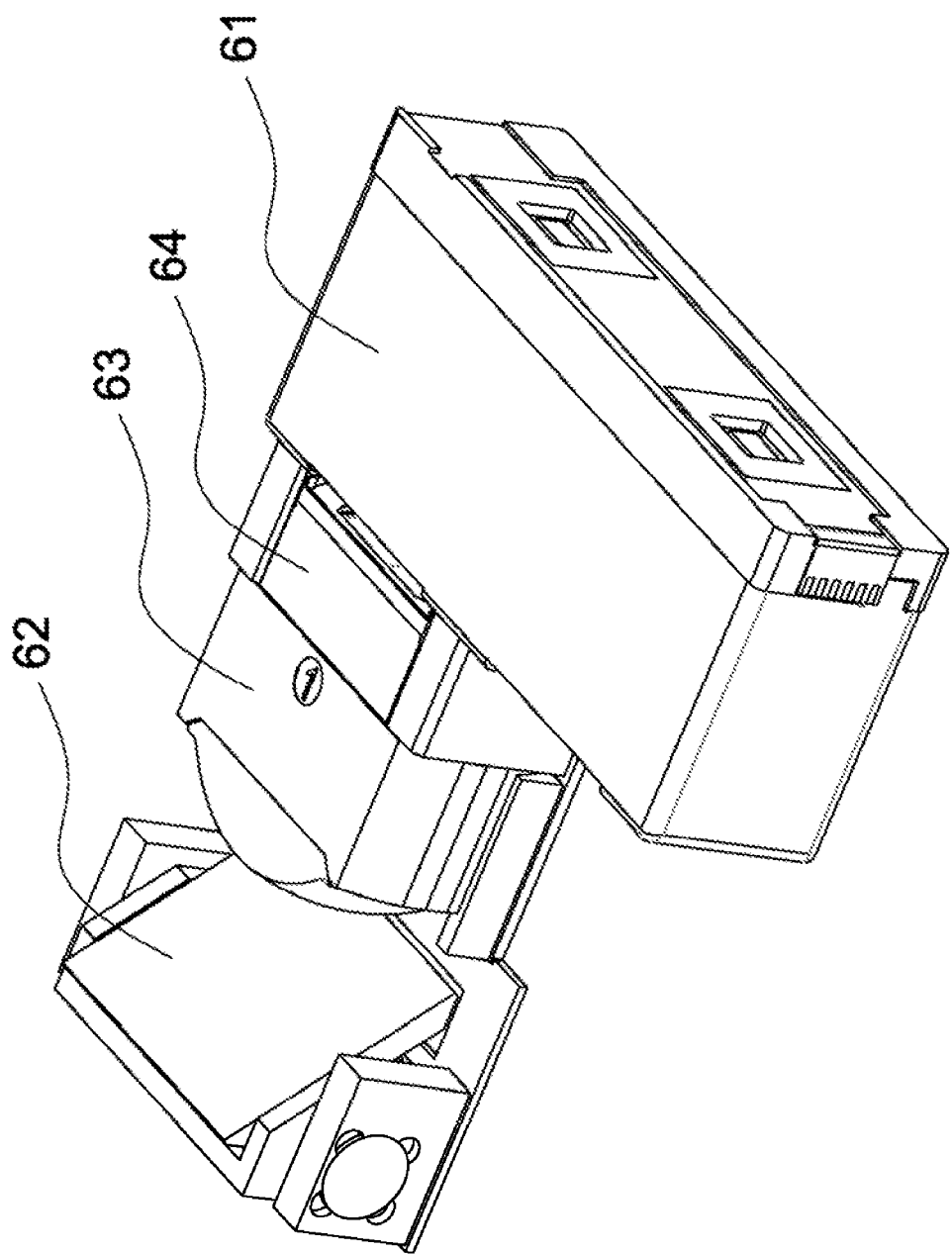
FIG. 47 is a schematic diagram showing the structure of the lens device of the invention.

As shown in FIG. 47, the invention provides a lens device including a voice coil motor 61, a second light path turning module 62, a first lens module 63, a connecting unit 64 and an image sensor (not shown). The second light path turning module 62 is configured to receive and reflect the light beam coming from the object side. The first lens module 63 is configured to receive the light beam reflected by the second light path turning module 62. The voice coil motor 61 provides the functions of auto focusing operation and image stabilization.

The connecting unit 64 is able to stabilize the connection of the first lens module 63 and the voice coil motor 61 and to rapidly position the first lens module 63 at the voice coil motor 61. However, the invention is not limited thereto. It is understood that the connecting unit 64 can be omitted or replaced with another structure to function the same.

The image sensor is disposed near where the light beam exits from the second reflecting module 612. Specifically, the image sensor is disposed on a lateral wall of the voice coil motor 61 and the lateral wall is parallel to the third direction. The image sensor is configured to receive the light beam reflected by the second reflecting module 612. In some other embodiments, the image sensor is disposed near where the light beam exits from the first reflecting module 611. That is, the image sensor is disposed on another lateral wall of the voice coil motor 61 and the lateral wall is parallel to the first direction.

Figure 48:
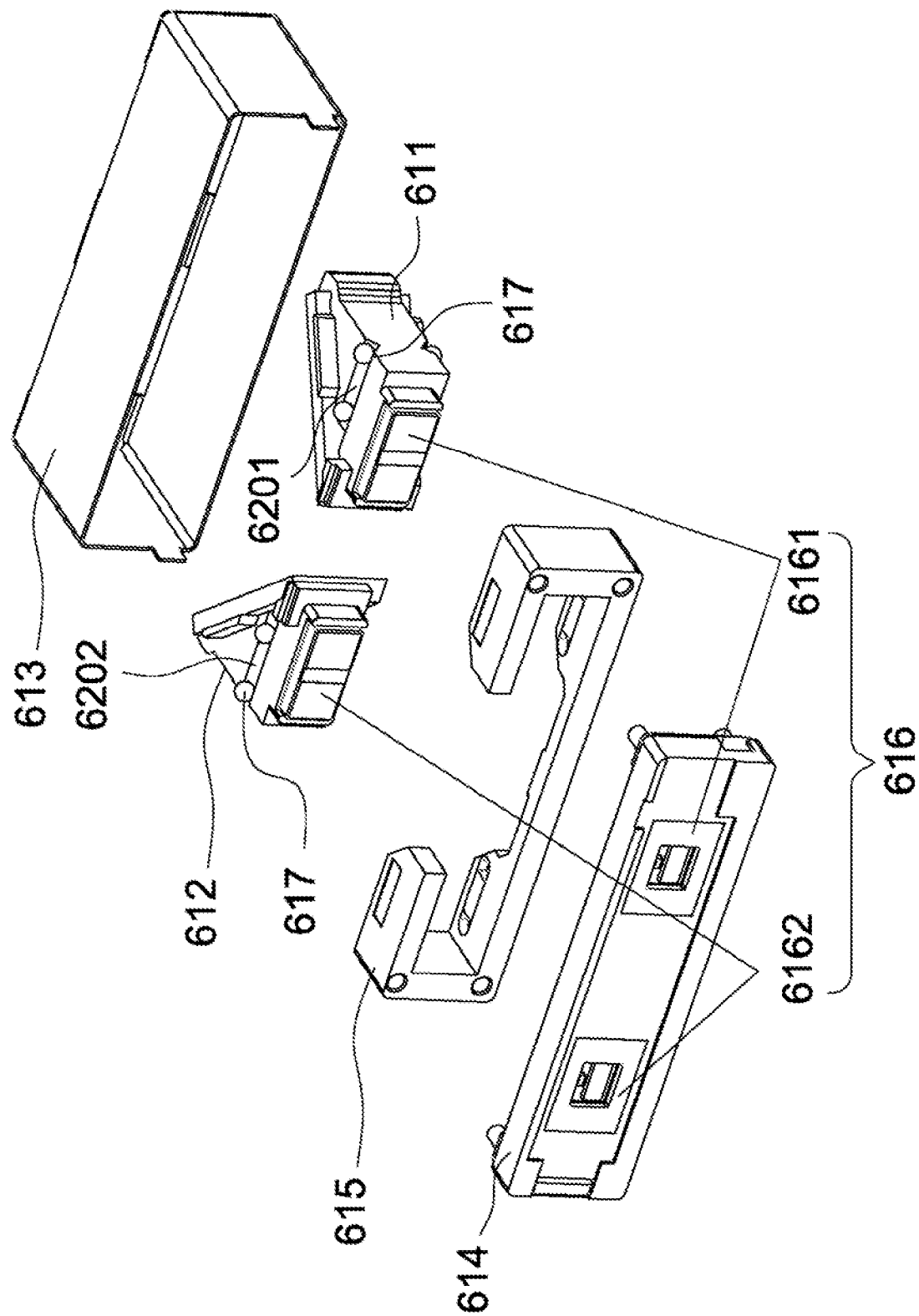
FIG. 48 is an exploded diagram of a voice coil motor in accordance with a twelfth embodiment of the invention.

The voice coil motor 61 is disposed between the first lens module 63 and the image sensor. As shown in FIG. 48, the voice coil motor 61 includes a first light path turning module consisting of the first reflecting module 611 and the second reflecting module 612. The first reflecting is configured to receive the light beam from the first lens module 63 and reflect the light beam to the second reflecting module 612. The second reflecting module 612 is configured to receive the light beam from the first reflecting module 611 and reflect the light beam to the image sensor.

Specifically, the light beam from the object side propagates in the second direction, enters the second light path turning module 62, is reflected by the second light path turning module 62 to propagate in the first direction, passes through the first lens module 63, reaches the first reflecting module 611, is reflected by the first reflecting module 611 to propagate in the third direction, reaches the second reflecting module 612, is reflected by the second reflecting module 612 to propagate in the first direction, and reaches the image sensor to form an image. In other words, the light beam from the object side propagates in the second direction, is reflected by the second light path turning module 62 to propagate in the first direction, passes through the first lens module 63, is reflected by the first reflecting module 611 to propagate in the third direction, is reflected by the second reflecting module 612 to propagate in the first direction, and reaches the image sensor.

It is understood that the first lens module 63 has an optical axis oriented in the first direction, at least three lenses and a stop. At least one of the lenses has positive refractive power (i.e. the focal length is positive). The lens adjacent to the object side may have positive refractive power and the object-side surface thereof may be convex. At least one of the three lenses has negative refractive power (i.e. the focal length is negative). At least one of the three lenses has a non-circular outer circumferential portion. When the lens is observed along the optical axis thereof, the outer circumferential portion may be in shape of polygon, polygon with sides arranged symmetrically with respect to the optical axis, lanes of track and field, bottle, oak barrel, the upper half portion of red wine bottle or the like. The stop may be non-circular. When the stop is observed along the optical axis thereof, the outer circumferential portion of the stop may be in shape of polygon, polygon with sides arranged symmetrically with respect to the optical axis, lanes of track and field, bottle, oak barrel, the upper half portion of red wine bottle or the like. Preferably, at least one lens and/or the stop of the lens device has a non-circular outer circumferential portion. The design facilitates the reduction of dimensions, thickness and volume of the lens module and can effectively minimize the lens module. However, the invention is not limited thereto. The lenses and the stop may be circular.

Figure 49:
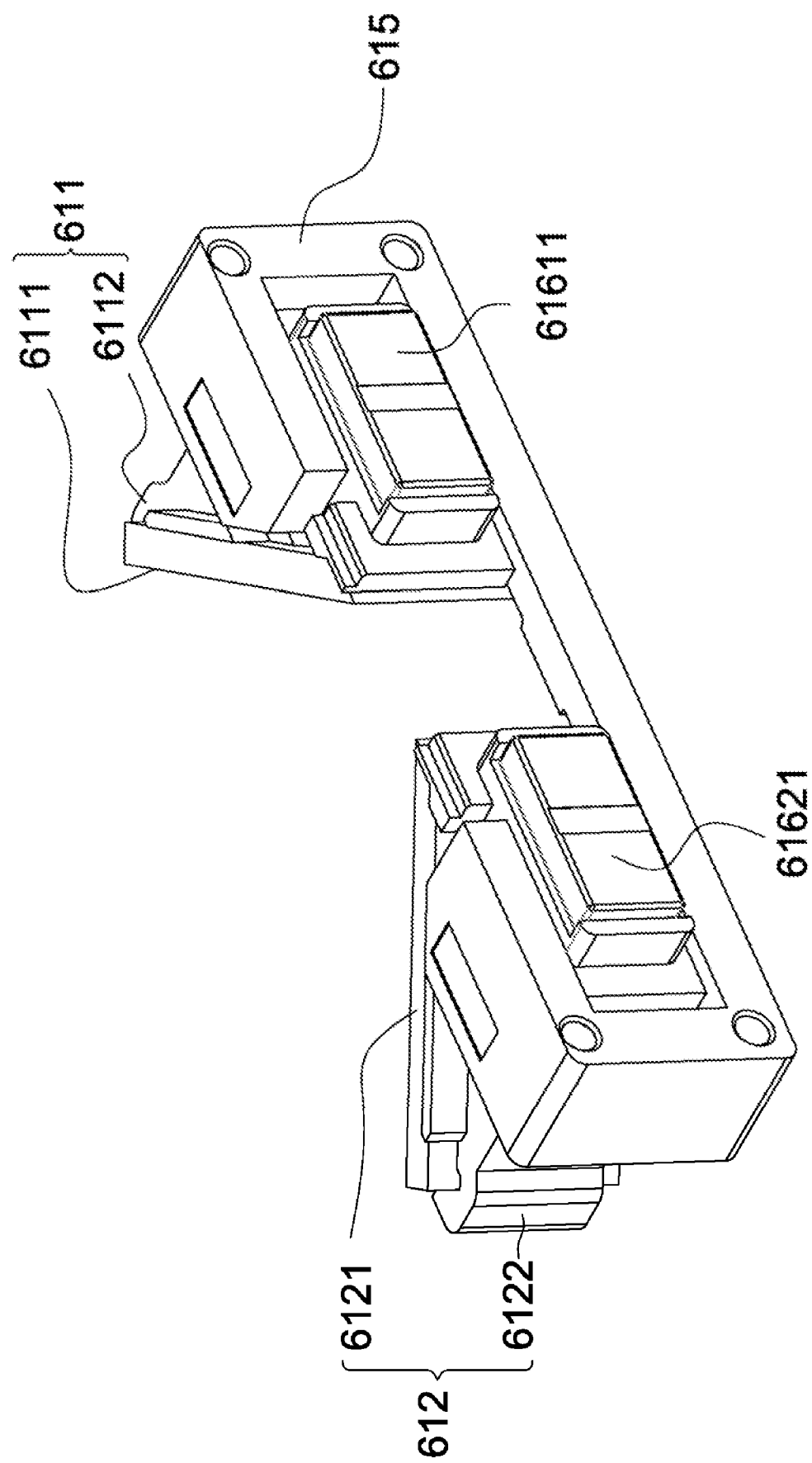
FIG. 49 is a schematic diagram showing an assembly of a first reflecting module and a second reflecting module of the voice coil motor in accordance with the twelfth embodiment of the invention.

As shown in FIGS. 48 and 49, the voice coil motor 61 in accordance with the twelfth embodiment of the invention includes a frame 613, a rear cover 614, a first mount 615, a first reflecting module 611, a second reflecting module 612 for reflecting the light beam from the first reflecting module 611, and a first driving unit 5100 for driving the first reflecting module 611 and the second reflecting module 612 to move on the first mount 615 in the same direction or in opposite directions. The first reflecting module 611 and the second reflecting module 612 are connected to the mount 615 through at least one rolling unit 617. The rolling unit 617 may include a ball, a roller, a shaft or other part capable of rolling.

The first mount 615 is substantially a hollow frame and the upper wall of the hollow frame has an opening to mount the first reflecting module 611 and the second reflecting module 612.

The frame 613 and the rear cover 614 are connected to form a storage space for storing the above elements and to provide an appearance of the voice coil motor 61. The rear cover 614 is disposed at a side of the frame 613 near the first mount 615.

As shown in FIG. 49, the first reflecting module 611 and the second reflecting module 612 is slidably mounted in the first mount 615. The first reflecting module 611 includes a first reflecting part 6111 and a first carrier 6112. The first reflecting part 6111 is mounted on the first carrier 6112. The second reflecting module 612 includes a second reflecting part 6121 and a second carrier 6122. The second reflecting part 6121 is mounted on the second carrier 6122. The first reflecting part 6111 is disposed opposite to the second reflecting part 6122. In the invention, the term "opposite to" does not mean "parallel to and aligned with" but "arranged in such way that the light beam passing through one element can reach another element". Preferably, the reflecting surfaces of the first reflecting part 6111 and the second reflecting part 6121 are perpendicular to each other.

In the invention, the first reflecting part 6111 and the second reflecting part 6121 may be prisms, reflecting prisms or reflecting mirrors. The first reflecting part 6111 is firmly mounted on the first carrier 6112 and the relative position of the first reflecting part 6111 is kept by the first carrier 6112. The second reflecting part 6121 is firmly mounted on the second carrier 6122 and the relative position of the second reflecting part 6121 is kept by the second carrier 6122.

Referring to FIGS. 48 and 50-52, the first carrier 6112 has at least one first receiving groove 6101 for the rolling unit 617 to roll therein while the first mount 615 has at least one first guide groove 6201 corresponding to the first receiving groove 6101 and extending in the direction of movement of the first carrier 6112. Alternatively, the first mount 615 has the first receiving groove 6101 while the first carrier 6112 has the first guide groove 6201 corresponding to the first receiving groove 6101. The second carrier 6122 has at least one second receiving groove 6102 for the rolling unit 617 to roll therein while the first mount 615 has at least one second guide groove 6202 corresponding to the second receiving groove 6102 and extending in the direction of movement of the second carrier 6122. Alternatively, the first mount 615 has the second receiving groove 6102 while the second carrier 6122 has the second guide groove 6202 corresponding to the second receiving groove 6102.

Figure 50:
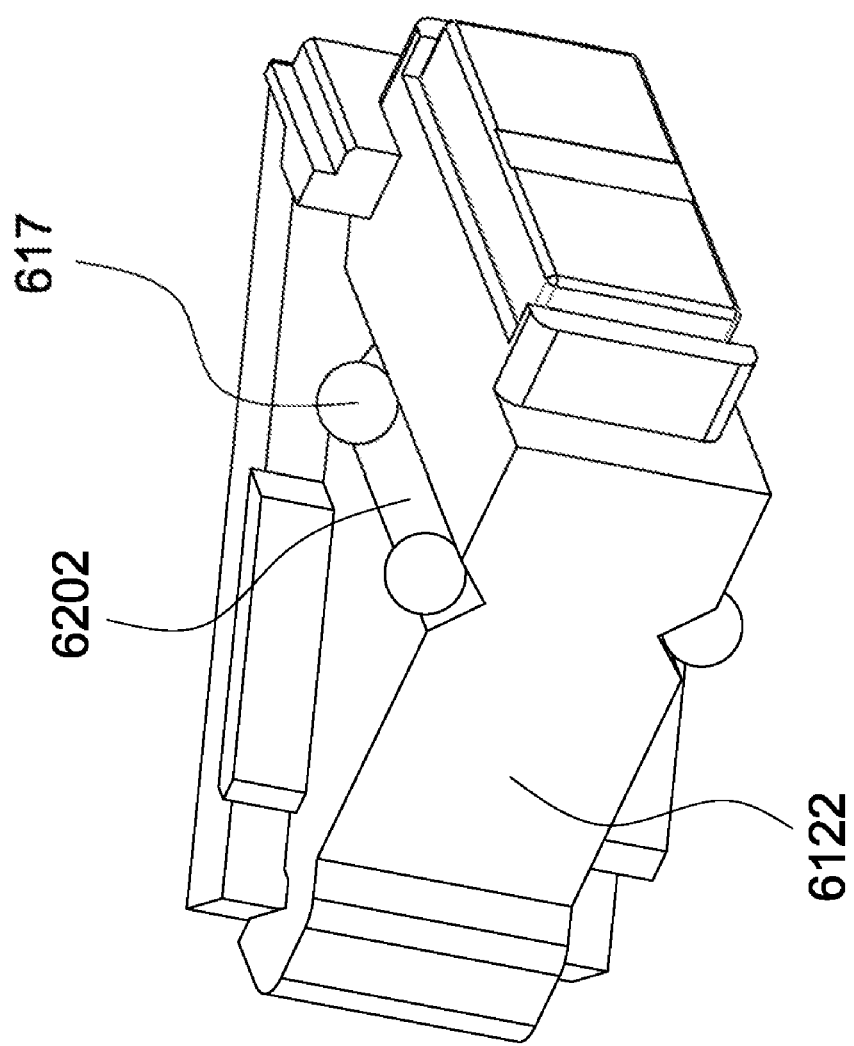
FIG. 50 is a schematic diagram showing the second reflecting module of the voice coil motor in accordance with the twelfth embodiment of the invention.

As shown in FIGS. 48 and 50, in a preferred embodiment of the invention, the first carrier 6112 is provided with the first guide grooves 6201 on the upper side and the lower side thereof. The section of the first guide groove 6201 is substantially V-shaped to reduce the contact area with the rolling unit 617. The second carrier 6122 is provided with the second guide grooves 6202 on the upper side and the lower side thereof. The section of the second guide groove 6202 is substantially V-shaped to reduce the contact area with the rolling unit 617. In some other embodiment, the sections of the first guide groove 6201 and the second guide groove 6202 may be curved, semicircular, or in other shapes.

Figure 51:
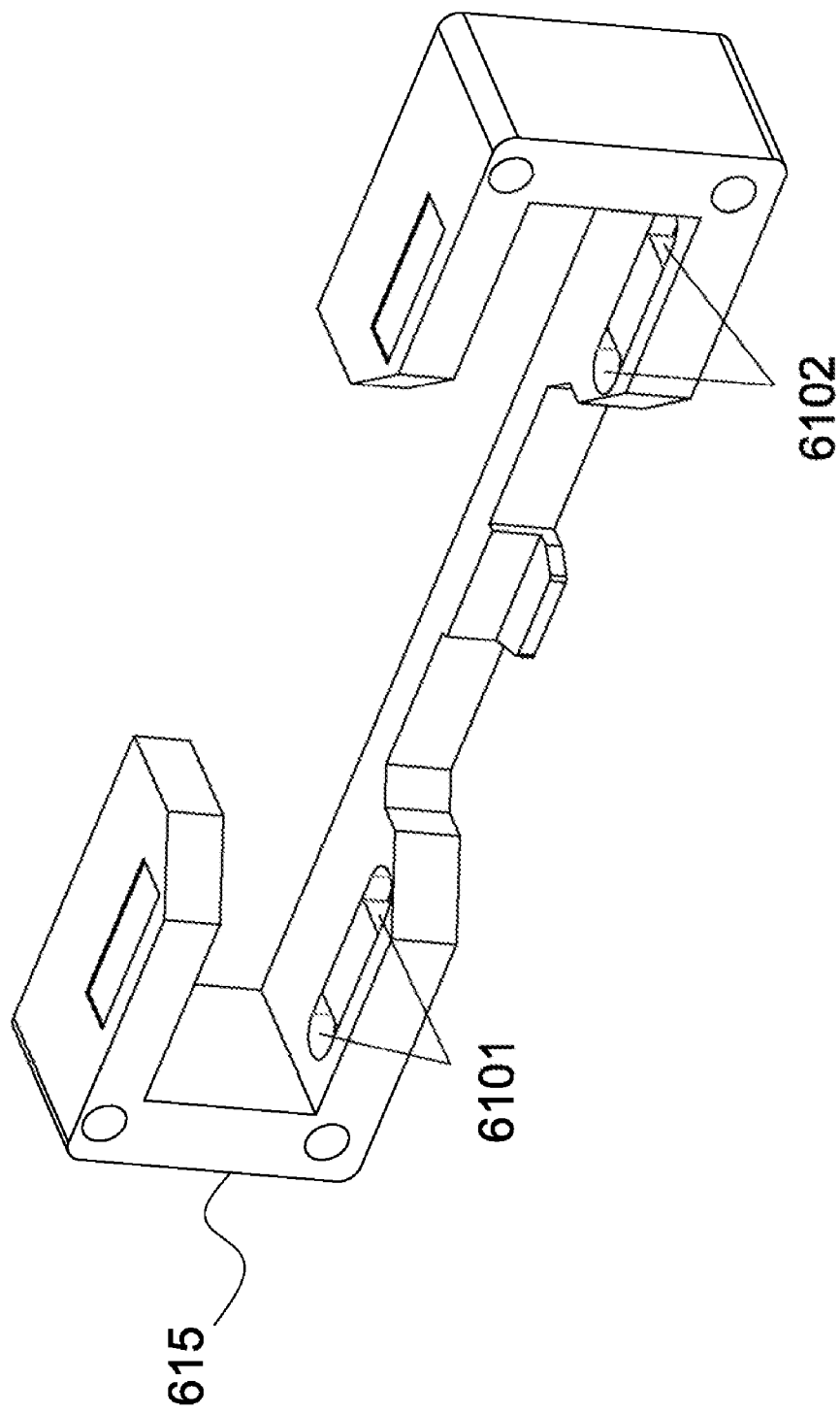
FIG. 51 is a schematic diagram showing the first mount of the voice coil motor in accordance with the twelfth embodiment of the invention.

Referring to FIGS. 49 and 51, in this embodiment, two first receiving grooves 6101 are provided on the bottom wall of the first mount 615 corresponding to the first guide groove 6201 disposed on the bottom side of the first carrier 6112. Two second receiving grooves 6102 are provided on the bottom wall of the first mount 615 corresponding to the second guide groove 6202 disposed on the bottom side of the second carrier 6122. Two first receiving grooves 6101 are provided on the top wall of the first mount 615 corresponding to the first guide groove 6201 disposed on the top side of the first carrier 6112. Two second receiving grooves 6102 are provided on the top wall of the first mount 615 corresponding to the second guide groove 6202 disposed on the top side of the second carrier 6122. It is worth noting that the number of the first receiving grooves 6101 and the second receiving grooves 6102 depends on the number of the rolling units 617, and the number of the rolling units 617 depends on the demand.

Figure 52:
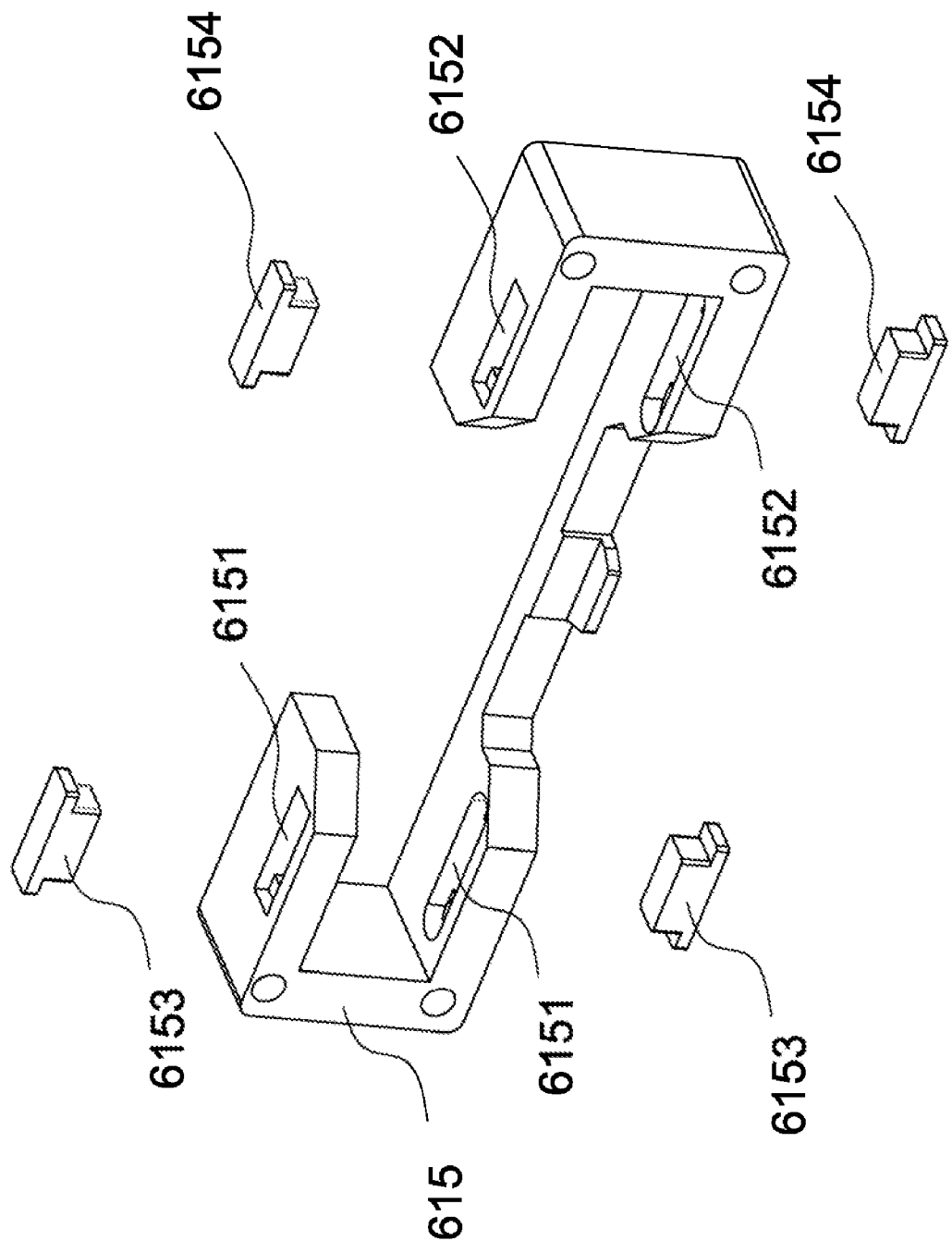
FIG. 52 is an exploded diagram showing the first mount of the voice coil motor in accordance with the twelfth embodiment of the invention.

Referring to FIG. 52, in this embodiment, a plurality of first through holes 6151 are provided on the first mount 615 corresponding to the first guide grooves 6201 of the first carrier 6112. T-shaped first blocks 6153 are fitted into the first through holes 6151 to form the first receiving grooves 6101. Further, a plurality of second through holes 6152 are provided on the first mount 615 corresponding to the second guide grooves 6202 of the second carrier 6122. T-shaped second blocks 6154 are fitted into the second through holes 6152 to form the second receiving grooves 6102 for mounting the rolling unit 617. In some other embodiments, the first receiving grooves 6101 and the second receiving grooves 6102 can be replaced with blind holes, perforations or openings directly formed on the first mount 615.

In operation, the rolling units 617 are kept in the first receiving grooves 6101 and the second receiving grooves 6102 to rotate when rolling along the first guide groove 6201 and the second guide groove 6202. The rolling units 617 are provided to avoid the impacts during the process of overcoming the static frictional forces so that the operation is smooth.

Figure 53:
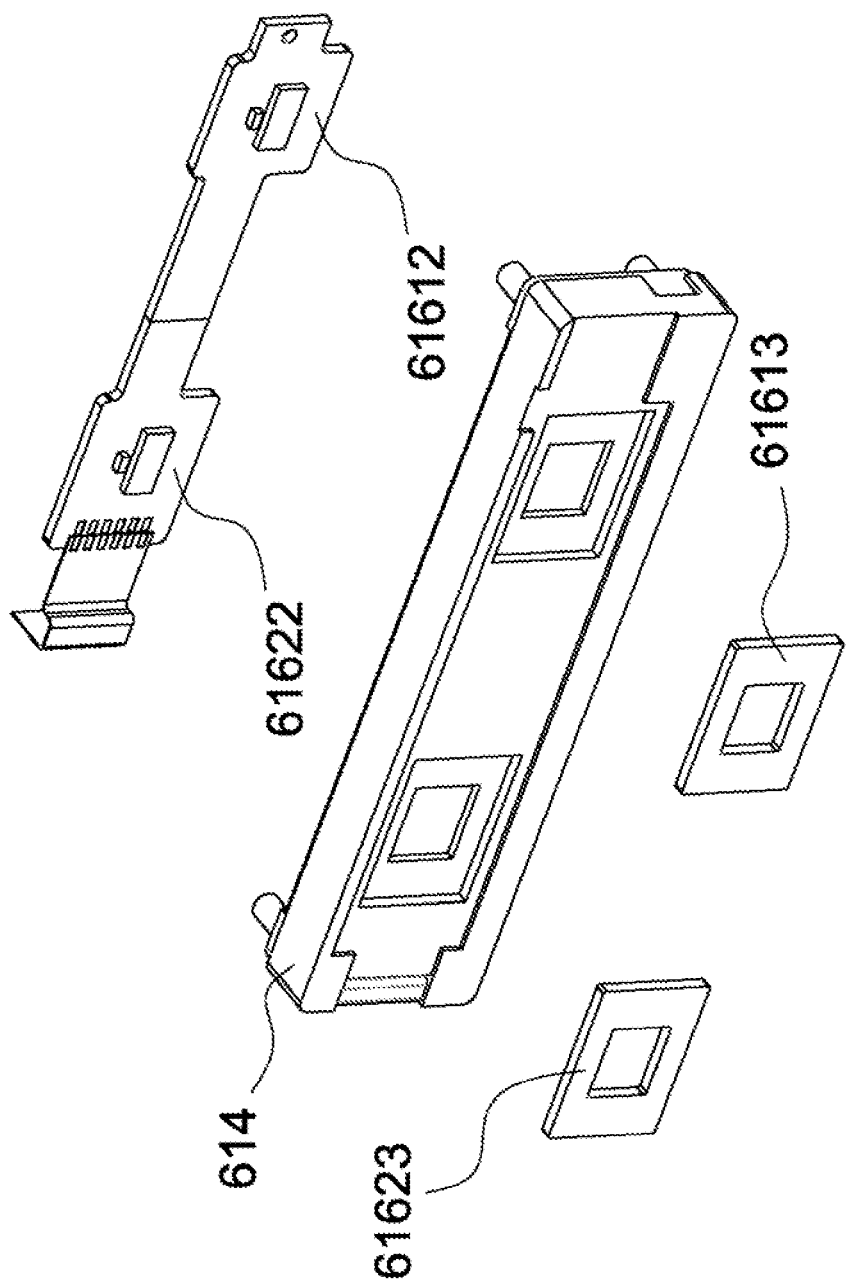
FIG. 53 is an exploded diagram showing the first driving unit of the voice coil motor in accordance with the twelfth embodiment of the invention.

Referring to FIGS. 48, 49 and 53, the first driving unit 616 includes a first driving assembly 6161 for driving the first reflecting module 611 and a second driving assembly 6162 for driving the second reflecting module 612.

The first driving assembly 6161 includes a first driving magnet 61611 and a first attracting yoke 61613. The first driving magnet 61611 is disposed on the rear over 614 while the first attracting yoke 61613 is disposed on the first carrier 6112. Alternatively, the first driving magnet 61611 is disposed on the first carrier 6112 while the first attracting yoke 61613 is disposed on the rear over 614. The second driving assembly 6162 includes a second driving magnet 61611 and a second attracting yoke 61613. The second driving magnet 61611 is disposed on the rear over 614 while the second attracting yoke 61613 is disposed on the second carrier 6122. Alternatively, the second driving magnet 61611 is disposed on the second carrier 6122 while the second attracting yoke 61613 is disposed on the rear over 614.

In this embodiment, the first driving magnet 61611 is disposed on a side of the first carrier 6112 and the side faces the rear cover 614. The second driving magnet 61621 is disposed on a side of the second carrier 6122 and the side faces the rear cover 614. The first printed circuit unit 61612, the first attracting yoke 61613, the second printed circuit unit 61622 and the second attracting yoke 61623 are disposed on the rear cover 614. The first driving magnet 61611 and the first attracting yoke 61613 attract each other. The second driving magnet 61621 and the second attracting yoke 61623 attract each other. Therefore, the first carrier 6112 and the second carrier 6122 are propped against the first mount 615 to ensure that the first reflecting assembly 6111 and the second reflecting assembly 6121 are perpendicular to the optical path.

In this embodiment, the first printed circuit unit 61612 and the second printed circuit unit 61622 are integrally formed as a continuous-unity piece. However, the invention is not limited thereto. The first printed circuit unit 61612 and the second printed circuit unit 61622 can be two separated pieces.

The first printed circuit unit 61612 includes a first coil and a first circuit board. The first coil is printed on a surface of the first circuit board wherein the surface faces the first driving magnet 61611. The second printed circuit unit 61622 includes a second coil and a second circuit board. The second coil is printed on a surface of the second circuit board wherein the surface faces the second driving magnet 61621. Specifically, the first coil of the first printed circuit unit 61612 and the second coil of the second printed circuit unit 61622 are provided with power to generate magnetic fields. The first driving magnet 61611 and the second driving magnet 61621 are pushed by electromagnetic forces so as to drive the first carrier 6112 and the second carrier 6122 to move along the first guide groove 6201 and the second guide groove 6202 in the same direction or in opposite directions. Thus, a lens device provided with the voice coil motor 61 can perform the auto focusing operation and compensation for hand wobbling.

The first printed circuit unit 61612 further includes a first driving chip and a first chip cooler. The first coil is printed on a surface of the first circuit board wherein the surface faces the first driving magnet 61611. The first driving chip and the first chip cooler are disposed on the other surface of the first circuit board. The second printed circuit unit 61622 further includes a second driving chip and a second chip cooler. The second coil is printed on a surface of the second circuit board wherein the surface faces the second driving magnet 61621. The second driving chip and the second chip cooler are disposed on the other surface of the second circuit board.

FIGS. 54-57 depict the thirteenth embodiment, which differs from the twelfth embodiment in that the second light path turning module 62 includes a third reflecting part 621 for receiving and reflecting the object-side light beam, a third carrier 622 for carrying the third reflecting part 621, a second mount 623 for mounting the third carrier 622, and a second driving unit 624 for driving the third carrier 622 to rotate. The third carrier 622 is rotatable with respect to the second mount 623 through a shaft 625. The third cater 622 is firmly connected to the shaft 625. The two ends of the shaft 625 are connected to the second mount 623.

The third reflecting part 621 may be a prism, a reflecting prism, a reflecting mirror or the like.

Figure 55:
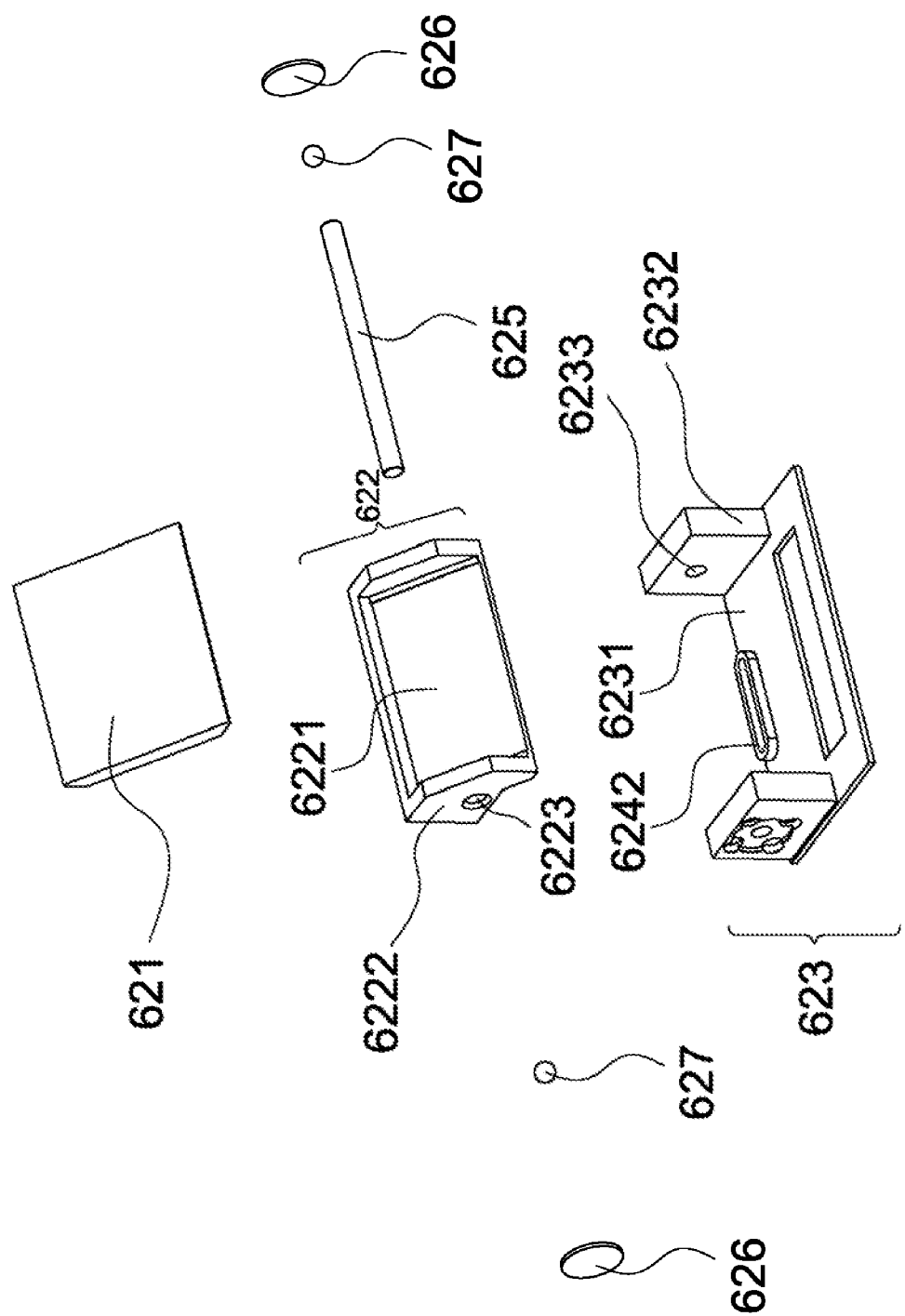
FIG. 55 is an exploded diagram showing the second light path turning module in accordance with a first technical solution of the thirteenth embodiment of the invention.

Referring to FIG. 55, the third carrier 622 includes an inclined board 6221. The inclined board 6221 has a surface facing upwards and the third reflecting part 621 is mounted on the surface. The third carrier 622 further includes two side boards 6222 disposed on both sides of the inclined board 6221. Each of the side boards 6222 is provided with a fixing hole 6223. The two ends of the shaft 625 are penetrated through the fixing holes 6223, firmly fitted, and protruded therefrom.

Referring to FIG. 55, the second mount 623 includes a bottom board 6231 and two support boards 6232 extending upwards from the bottom board 6231. The third carrier 622 is disposed between the two support boards 6232. Each of the support boards 6232 is provided with a shaft hole 6233 corresponding to the fixing hole 6223. The two ends of the shaft 625 are penetrated through the shaft holes 6233 in such a way that the shaft 625 is rotatable with respect to the support boards 6232.

Figure 54:
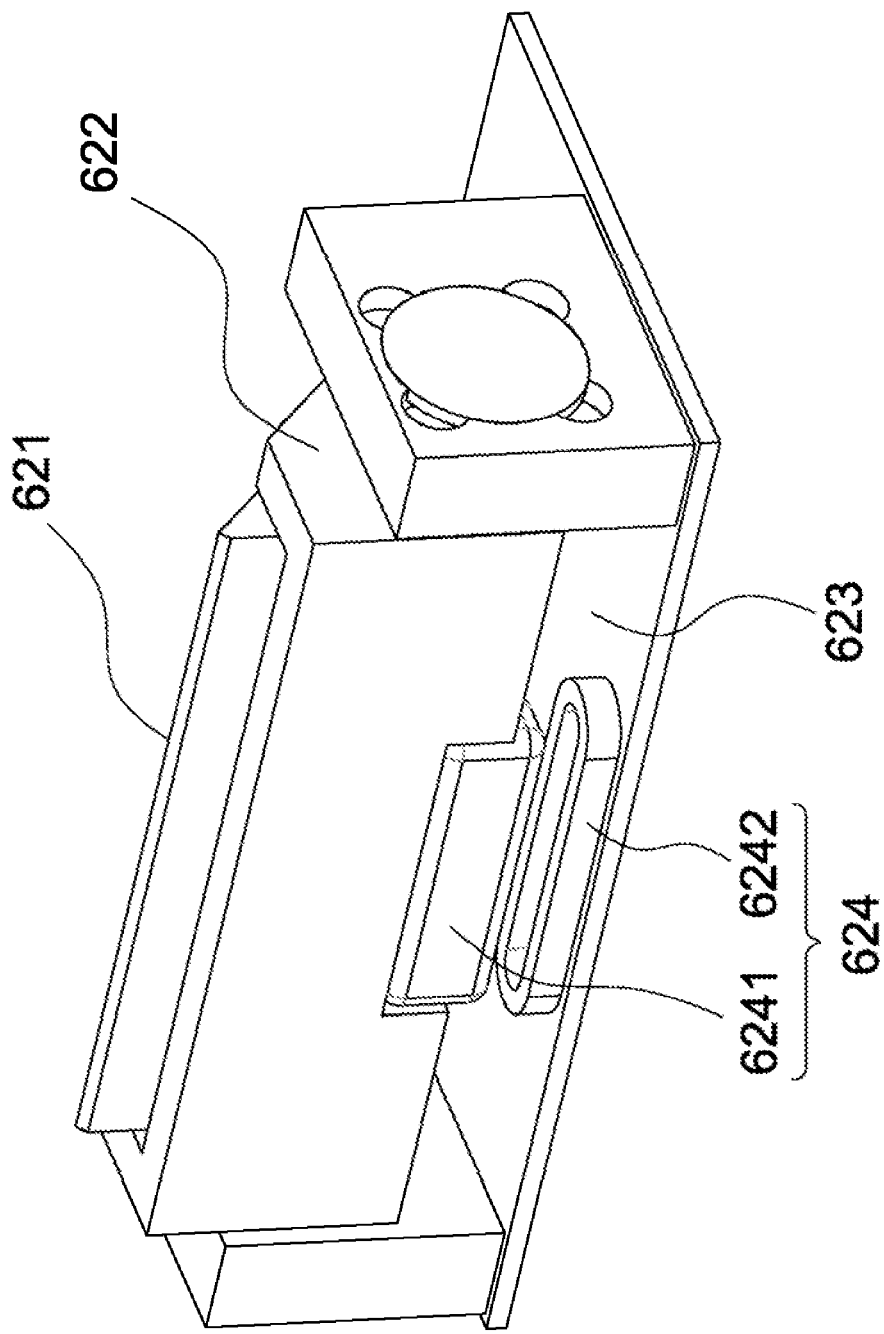
FIG. 54 is a schematic diagram showing the second light path turning module in accordance with a thirteenth embodiment of the invention.
Figure 56:
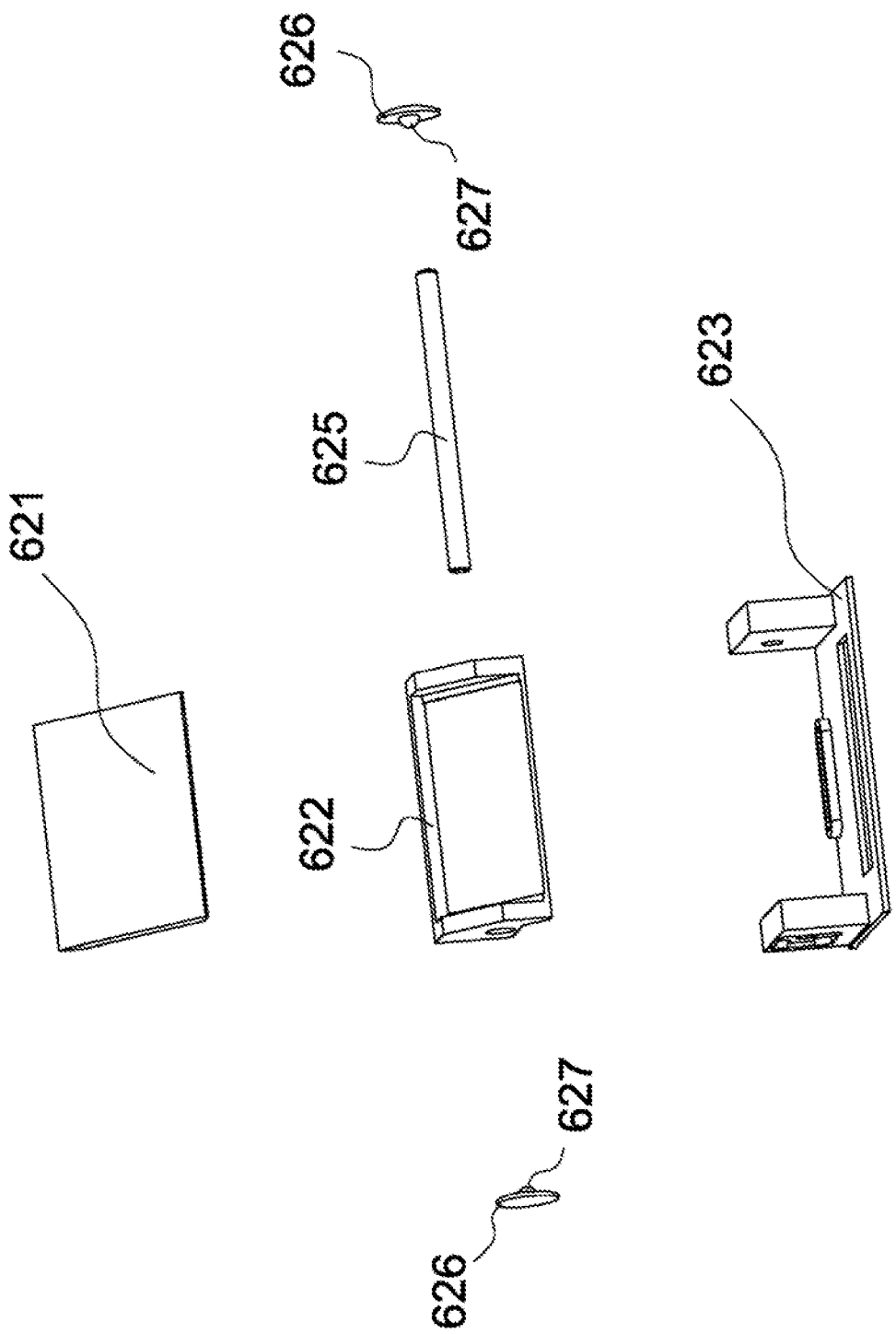
FIG. 56 is an exploded diagram showing the second light path turning module in accordance with a second technical solution of the thirteenth embodiment of the invention.
Figure 57:
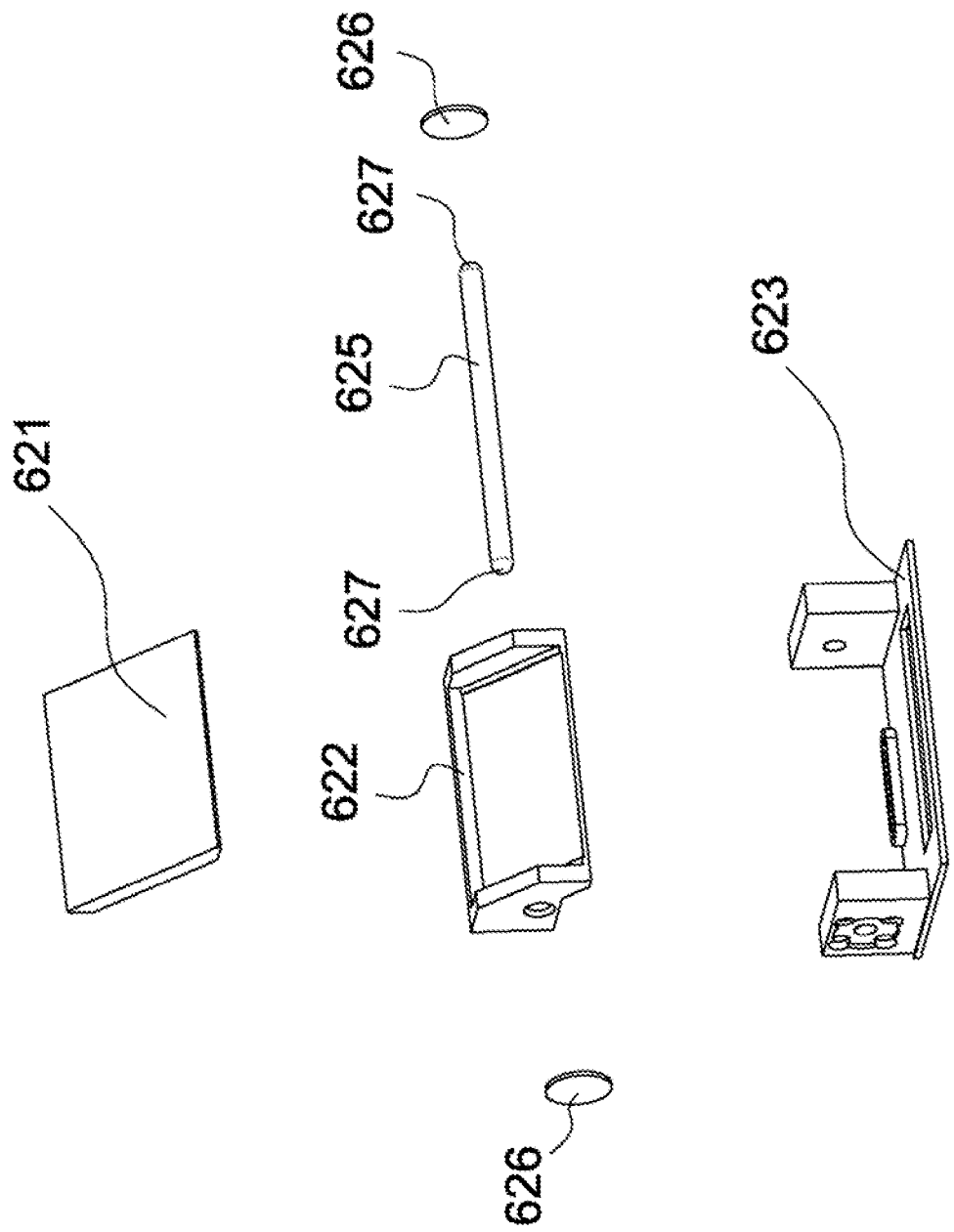
FIG. 57 is an exploded diagram showing the second light path turning module in accordance with a third technical solution of the thirteenth embodiment of the invention.

Referring to FIGS. 54 and 55, the second driving unit 624 includes a third driving magnet 6241 and a third coil 6242. The third driving magnet 6241 is disposed on a side of the bottom board 6231 of the second mount 623 wherein the side faces the third carrier 622, while the third coil 6242 is disposed on the third carrier 622 at a location corresponding to where the third driving magnet 6241 is disposed. Alternatively, the third coil 6242 is disposed on a side of the bottom board 6231 of the second mount 623 wherein the side faces the third carrier 622, while the third driving magnet 6241 is disposed on the third carrier 622 at a location corresponding to where the third driving magnet 6241 is disposed. As shown in FIGS. 55-57, for example, the third coil 6242 is disposed on a side of the bottom board 6231 of the second mount 623 wherein the side faces the third carrier 622, while the third driving magnet 6241 is disposed on the third carrier 622. In this embodiment, as shown in FIG. 54, the third driving magnet 6241 is L-shaped and covers a corner of the third carrier 622 wherein the corner is near the third coil 6242.

After power is provided for the third coil 6242, a force is generated between the third coil 6242 and the third driving magnet 6241 to rotate the third carrier 622 backward and forwards within an angle about the shaft 625.

Two backstay elements 626 are provided at both ends of the shaft 625 and fixed to the support boards 6232 for supporting the shaft 625. The backstay elements 626 are shaped like slabs. The ends of the shaft 625 have flat surfaces. The backstay elements 626 are fixed to the outer surfaces of the support boards 6232. A resistance-reducing structure 627 is disposed between an end of the shaft 625 and a backstay element 626 for reducing the frictional forces during rotation of the shaft 625.

Referring to FIG. 55 in some embodiments, the resistance-reducing structure 627 is a ball-shaped structure independent from the shaft 625 and the backstay element 626. Specifically, the ends of the shaft 625 have flat surfaces. The backstay elements 626 are slab-shaped. The flat surface of an end of the shaft 625 and the surface of a backstay element 626 are respectively propped against both sides of a resistance-reducing structure 627. The flat surface of the other end of the shaft 625 and the surface of the other backstay element 626 are respectively propped against both sides of the other resistance-reducing structure 627.

Referring to FIG. 56, in some other embodiments, the resistance-reducing structure 627 is a hemispherical structure protruding from the backstay element 626 towards the shaft 625. The two end surfaces of the shaft 625 are flat, wherein one end surface is propped against the resistance-reducing structure 627 of the backstay element 626, and the other end surface is propped against the resistance-reducing structure 627 of the other backstay element 626.

Referring to FIG. 57, in some other embodiments, each end of the shaft 625 has a resistance-reducing structure 627 formed thereon. The resistance-reducing structure 627 is a round head portion. The backstay element 626 is planar. In FIG. 57, two backstays 626 are respectively propped against two resistance-reducing structures 627 at two ends of the shaft 625.

According to the above design, the resistance-reducing structures 627 are provided between the two ends of the shaft 625 and the backstay elements 626 so that the frictional forces during rotation of the shaft 625 can be reduced.

Figure 58:
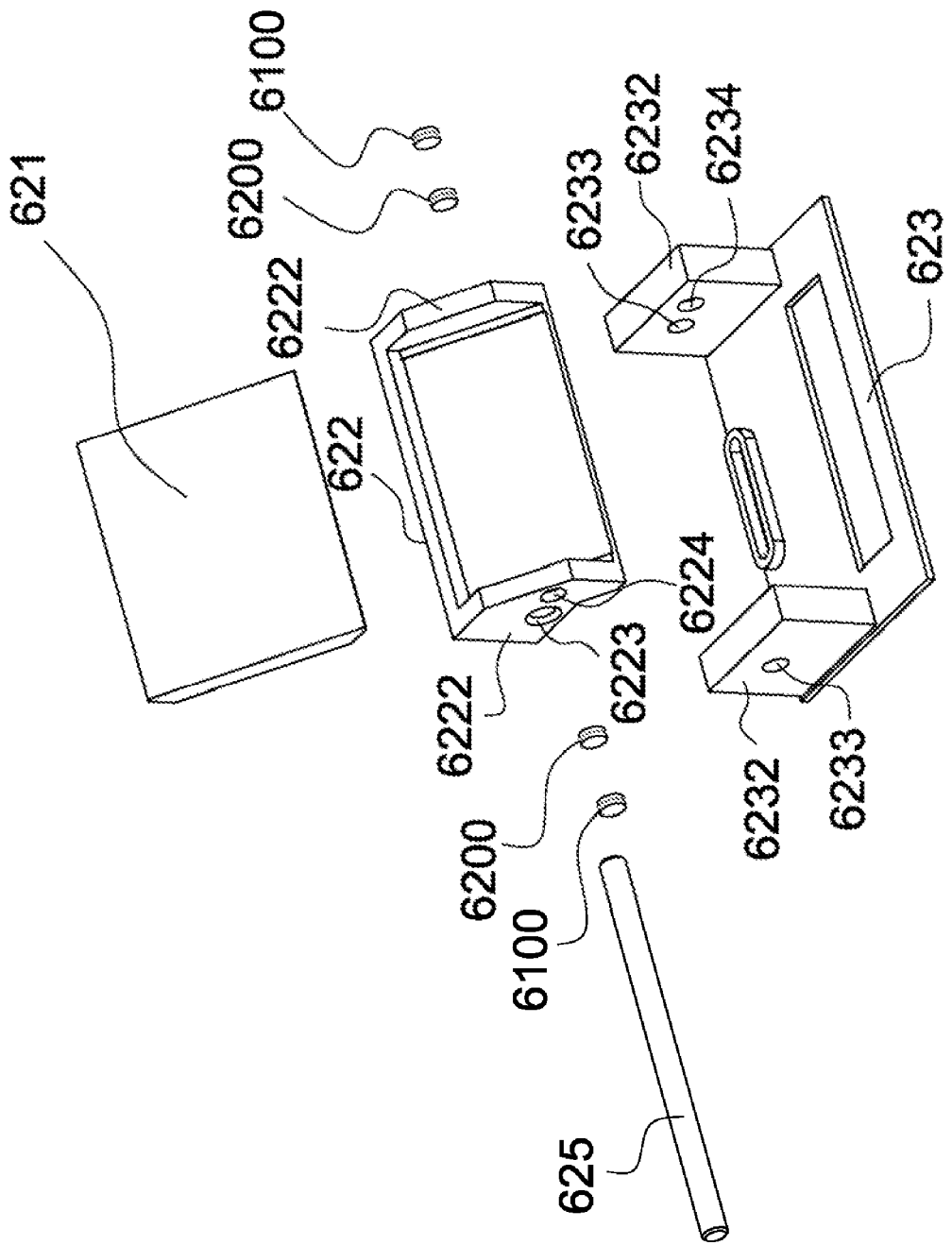
FIG. 58 is an exploded diagram showing the second light path turning module in accordance with a first technical solution of a fourteenth embodiment of the invention.
Figure 59:
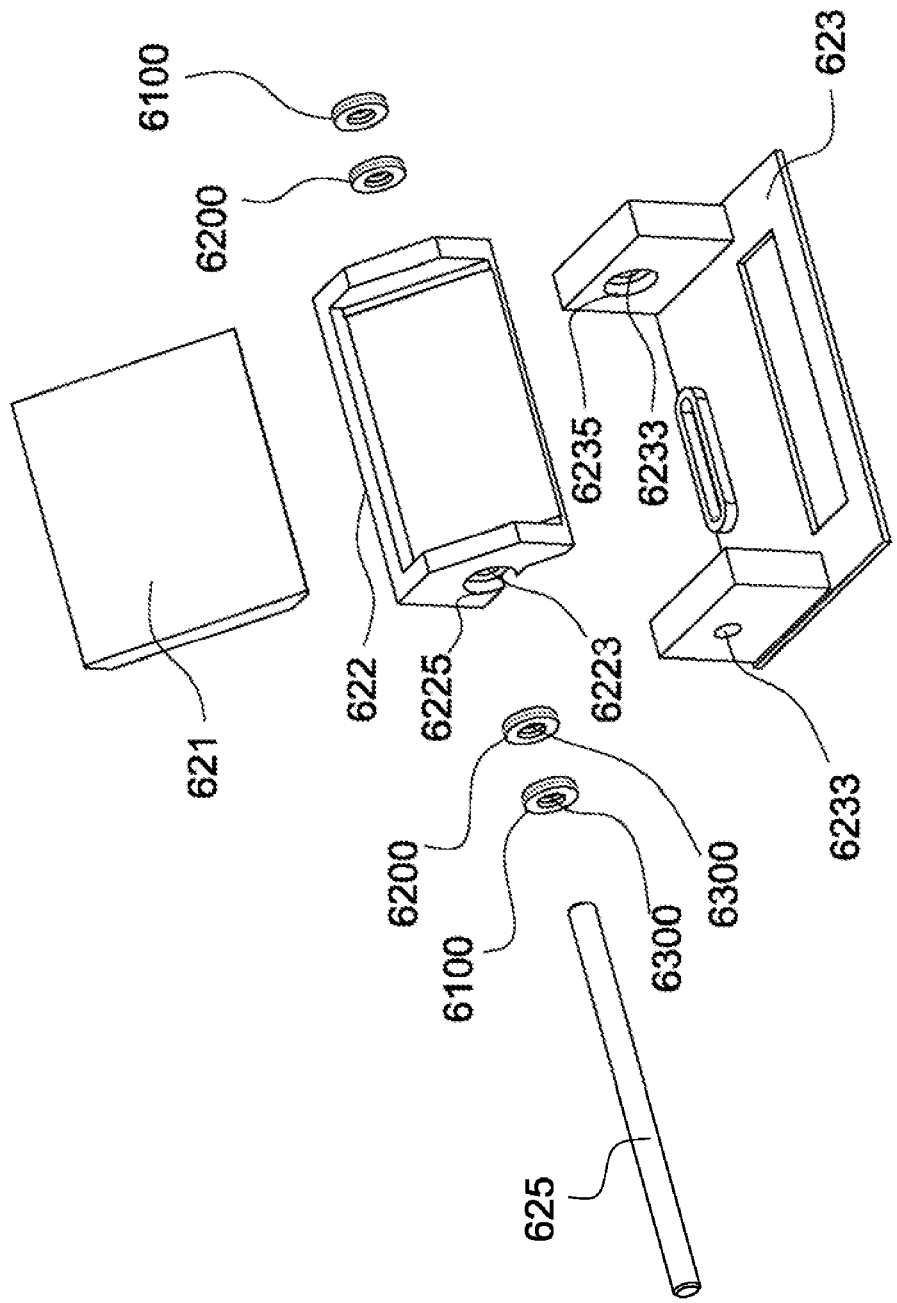
FIG. 59 is an exploded diagram showing the second light path turning module in accordance with a second technical solution of the fourteenth embodiment of the invention.

FIGS. 58 and 59 depict the fourteenth embodiment, which differs from the thirteenth embodiment in that at least two pairs of magnet elements are respectively provided on the two support boards 6232 and the side boards 6222 of the third carrier 622. Each pair of the magnet elements includes a first magnet 6100 and a second magnet 6200. The first magnet 6100 and the second magnet 6200 are arranged with the same magnetic poles facing each other. That is, the south magnetic pole of the first magnet 6100 is disposed to face the south magnetic pole of the second magnet 6100, or the north magnetic pole of the first magnet 6100 is disposed to face the north magnetic pole of the second magnet 6100.

By way of the repulsion of a pair of magnet element between the third carrier 622 and the second mount 623, the axial runout of the third carrier 622 during rotation about the shaft 625 in undesired directions (e.g. leftwards or rightwards) can be prevented, the optical image stabilization (OIS) can be accurately performed, and the third carrier 622 can be held on the second mount 623.

Referring to FIG. 58, in some embodiment, each support board 6232 of the second mount 623 has a first hole 6234 on a side thereof wherein the side of the support board 6232 faces the third carrier 622. The first magnet 6100 is fitted into the first hole 6234. The third carrier 622 has a second hole 6224 on each side thereof and the second hole 6224 is disposed at a location corresponding to where the first hole 6234 is disposed. The second magnet 6200 is fitted into the second hole 6224. The first hole 6234 is formed on the support board 6232 and is independent from the shaft hole 6233. Similarly, the second hole 6224 is formed on the side board 6222 of the third carrier 622 and is independent from the shaft hole 6233.

Referring to FIG. 59, in some embodiment, a first counterbore 6235 is formed around the shaft hole 6233 on a side of each support board 6232 which faces the third carrier 622. The first counterbore 6235 is not a through hole while the shaft hole 6233 is a through hole. The shaft hole 6233 is formed at the center of the first counterbore 6235. The first counterbore 6235 may be circular, triangular, rectangular, or in any closed shape. The first magnet 6100 is fitted into the first counterbore 6235. The first magnet 6100 is provided with a through hole 6300 allowing a penetration of the shaft 625. A second counterbore 6225 is formed around the fixing hole 6233 on a side of the third carrier 622 which faces the support board 6232. The second counterbore 6225 is not a through hole while the fixing hole 6223 is a through hole. The fixing hole 6223 is formed at the center of the second counterbore 6225. The second magnet 6200 is fitted into the second counterbore 6225. The second magnet 6200 is provided with a through hole 6300 allowing a penetration of the shaft 625.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens device, comprising:
a first lens module comprises plurality of lenses;
an image sensor;
a first reflecting module comprising a first reflecting part and a first carrier;
a second reflecting module comprising a second reflecting part and a second carrier;
a rolling unit; and
a first mount;
wherein the first reflecting part and the second reflecting part are configured to form a first light path turning module;
wherein the first light path turning module is configured to transmit a light beam passing through the first lens module to the image sensor by exactly three or four reflections;
wherein the first light path turning module comprises three or four reflecting surfaces on which the reflections occur;
wherein all the reflecting surfaces are plane surfaces;
wherein the first reflecting part is disposed on the first carrier;
wherein the second reflecting part is disposed on the second carrier;
wherein the rolling unit comprises a roller;
wherein either the first carrier or the first mount has a first receiving groove for positioning the roller, the first carrier further has a first guide groove extending in a direction of movement of the first carrier when the first mount has the first receiving groove, or the first mount further has the first guide groove extending in the direction of movement of the first carrier when the first carrier has the first receiving groove;
wherein either the second carrier or the first mount has a second receiving groove for positioning the roller, the second carrier further has a second guide groove extending in a direction of movement of the second carrier and corresponding to the second receiving groove when the first mount has the second receiving groove, or the first mount further has the second guide groove extending in the direction of movement of the second carrier and corresponding to the second receiving groove when the second carrier has the second receiving groove.

2. A lens device as claimed in claim 1, wherein the first light path turning module consists of the first reflecting part and the second reflecting part reflecting the light beam three times.

3. The lens device as claimed in claim 1, further comprising a third reflecting part, wherein:
the first lens module has an optical axis oriented in a first direction;
the third reflecting part is configured together with the first reflecting part and the second reflecting part to form the first light path turning module;
the first reflecting part is configured to receive and reflect the light beam passing through the first lens module;
the first reflecting part is disposed between the first lens module and the image sensor and is movable in the first direction;
the second reflecting part is configured to reflect the light beam coming from the first reflecting part;
the second reflecting part is disposed between the first lens module and the image sensor and is movable along with the first reflecting part in same or opposite direction;
the third reflecting part is configured to reflect the light beam, coming from the first lens module, to the first reflecting part;
the third reflecting part is disposed between the first lens module and the image sensor.

4. The lens device as claimed in claim 3, wherein:
the second reflecting part is disposed opposite to the first reflecting part in the first direction;
the third reflecting part reflects the light beam from the first lens module to the first reflecting part and reflects the light beam from the second reflecting part to the image sensor.

5. The lens device as claimed in claim 4, wherein:
the first reflecting part has a first reflecting surface and the second reflecting part has a second reflecting surface;
the first reflecting surface is at 45° from the first direction, the first reflecting surface and the second reflecting surface are perpendicular to each other, the first reflecting surface and the second reflecting surface are disposed opposite to each other in the first direction;
the third reflecting part has a third reflecting surface and a fourth reflecting surface, the third reflecting surface is disposed opposite to the first lens module in the first direction and opposite to the first reflecting surface in a third direction, the fourth reflecting surface is disposed opposite to the second reflecting surface in the third direction;
the third reflecting surface is parallel to the first reflecting surface and the fourth reflecting surface is parallel to the second reflecting surface.

6. The lens device as claimed in claim 1, wherein:
the first lens module has an optical axis oriented in a first direction;
the first reflecting part comprises a first reflecting cathetus surface, a second reflecting cathetus surface, and a first hypotenuse surface;
the second reflecting part comprises a third reflecting cathetus surface, a fourth reflecting cathetus surface, and a second hypotenuse surface;
a light beam passes through the first lens module, is reflected on the third reflecting cathetus surface of the second reflecting part, enters the first reflecting part through the first hypotenuse surface, is reflected on the first reflecting cathetus surface, is reflected on the second reflecting cathetus surface, leaves the first reflecting part through the first hypotenuse surface, and is reflected on the fourth reflecting cathetus surface of the second reflecting part to form an image on the image sensor.

7. The lens device as claimed in claim 6, wherein:
the second reflecting part can move along the first direction parallel to the second hypotenuse surface; and/or
the second reflecting part can move perpendicular to the second hypotenuse surface.

8. The lens device as claimed in claim 6, wherein:
the first reflecting part can move along the first direction parallel to the first hypotenuse surface; and/or the first reflecting part can move perpendicular to the first hypotenuse surface.

9. The lens device as claimed in claim 1, wherein:
the first reflecting part is disposed between the first lens module and the image sensor;
the first reflecting part comprises a first reflecting cathetus surface, a second reflecting cathetus surface and a first hypotenuse surface;
the second reflecting part is disposed between the first reflecting part and the first lens module;
the second reflecting part comprises a third reflecting cathetus surface, a fourth reflecting cathetus surface and a second hypotenuse surface;
the second reflecting part is configured to move parallel to the second hypotenuse surface for compensation for hand wobbling;
the second reflecting part is configured to move perpendicular to the second hypotenuse surface for adjustment of focal length of the lens device.

10. The lens device as claimed in claim 1, wherein:
the first reflecting part is a first prism unit;
the first prism unit comprises a first surface, a second surface and a third surface;
the light beam enters the first prism unit through the first surface, is totally reflected in the first prism unit at least three times, and leaves the first prism unit from the second surface and perpendicular to the second surface;
the first surface is perpendicular to an optical axis of the first lens module;
the first surface meets the second surface at a first angle ranged from 42.75° to 47.25°;
the second surface meets the third surface at a second angle ranged from 64.125° to 70.875';
the first surface meets the third surface at a third angle ranged from 64.125° to 70.875°.

11. The lens device as claimed in claim 1, wherein:
the first reflecting part is a first prism unit and the second reflecting part is a second prism unit;
the first prism unit comprises a first surface, a second surface and a third surface;
the second prism unit comprises a fourth surface, a fifth surface and a sixth surface;
the fourth surface is disposed opposite to the first lens module;
the fifth surface and the first surface are spaced and disposed opposite to each other;
the third surface is coated with a reflecting film and is inclined towards the lens module;
the light beam passes through the second prism unit and then the first prism unit, is totally reflected in the first prism unit, and leaves the first prism unit from the second surface and perpendicular to the second surface;
the second surface meets the third surface at a first angle ranged from 85.5° to 94.5°;
the first surface meets the second surface at a second angle ranged from 47.5° to 52.5°;
the first surface meets the third surface at a third angle ranged from 38° to 42°;
the fourth surface meets the fifth surface at a fourth angle ranged from 28.5° to 31.5';
the fifth surface meets the sixth surface at a fifth angle ranged from 57° to 63°.

12. A lens device, comprising:
a first lens module;
an image sensor; and
a first light path turning module configured to transmit a light beam passing through the first lens module to the image sensor by exactly three reflections;
wherein the first light path turning module consists of a first reflecting part and a second reflecting part;
wherein the light beam propagates along an optical path;
wherein, along the optical path, no optical element is disposed between the first reflecting part and the second reflecting part;
wherein the second reflecting part comprises a second hypotenuse surface;
wherein the second reflecting part is configured to move parallel to the second hypotenuse surface for compensation for hand wobbling;
wherein the second reflecting part is further configured to move perpendicular to the second hypotenuse surface for adjustment of focal length of the lens device.

13. A lens device as claimed in claim 12, wherein all surfaces of the first light path turning module through which the light beam passes are plane surfaces.

14. A lens device, comprising:
a first lens module;
an image sensor; and
a first light path turning module configured to transmit a light beam passing through the first lens module to the image sensor by exactly three or four reflections;
wherein the first light path turning module comprises a first reflecting part and a second reflecting part;
wherein the first reflecting part comprises a first reflecting cathetus surface, a second reflecting cathetus surface, and a first hypotenuse surface;
wherein the second reflecting part comprises a third reflecting cathetus surface, a fourth reflecting cathetus surface, and a second hypotenuse surface.

* * * * *